United States Patent
Enomoto et al.

(10) Patent No.: US 7,532,588 B2
(45) Date of Patent: May 12, 2009

(54) NETWORK SYSTEM, SPANNING TREE CONFIGURATION METHOD AND CONFIGURATION PROGRAM, AND SPANNING TREE CONFIGURATION NODE

(75) Inventors: Nobuyuki Enomoto, Tokyo (JP); Masaki Umayabashi, Tokyo (JP); Youichi Hidaka, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 824 days.

(21) Appl. No.: 10/642,203

(22) Filed: Aug. 18, 2003

(65) Prior Publication Data

US 2004/0160904 A1    Aug. 19, 2004

(30) Foreign Application Priority Data

Feb. 19, 2003  (JP)  ............................. 2003-041794

(51) Int. Cl.
  *H04L 12/28* (2006.01)
(52) U.S. Cl. ..................... 370/256; 370/258; 709/224
(58) Field of Classification Search ................. 370/216, 370/254–258; 709/223, 224
  See application file for complete search history.

(56) References Cited

U.S. PATENT DOCUMENTS

| | | | | |
|---|---|---|---|---|
| 4,644,532 A * | 2/1987 | George et al. | ............... | 370/255 |
| 5,535,195 A * | 7/1996 | Lee | ............... | 370/256 |
| 5,761,435 A * | 6/1998 | Fukuda et al. | ............... | 709/238 |
| 6,788,650 B2 * | 9/2004 | Chen et al. | ............... | 370/254 |
| 6,813,250 B1 * | 11/2004 | Fine et al. | ............... | 370/256 |
| 6,882,630 B1 * | 4/2005 | Seaman | ............... | 370/256 |
| 7,061,876 B2 * | 6/2006 | Ambe | ............... | 370/256 |
| 2002/0181412 A1 | 12/2002 | Shibasaki | | |
| 2003/0161275 A1 * | 8/2003 | Malhotra et al. | ............... | 370/256 |
| 2003/0165119 A1 * | 9/2003 | Hsu et al. | ............... | 370/258 |
| 2006/0092862 A1 * | 5/2006 | Benedetto et al. | ............... | 370/256 |

FOREIGN PATENT DOCUMENTS

| | | |
|---|---|---|
| JP | 2002-335259 | 11/2002 |
| JP | 2002-353998 | 12/2002 |
| JP | 2002-354001 | 12/2002 |

OTHER PUBLICATIONS

Youichi Hidaka, et al., Institute of Electronics, Information and Communication Engineers, society Meeting 2002, B-7-11 to B-7-13,"Proposal of Ethernet Architecture GOE (Global Optical Ethernet) for Future Generation", pp. 171-173.
Japanese Office Action dated Dec. 19, 2007 ( with partial English translation).
Korean Office Action dated Oct. 27, 2006 with English translation.
Chinese Office Action dated Dec. 5, 2008 with Partial English Translation.

* cited by examiner

*Primary Examiner*—Hassan Kizou
*Assistant Examiner*—Jeffrey M Rutkowski
(74) *Attorney, Agent, or Firm*—McGinn I.P. Law Group, PLLC

(57) ABSTRACT

A node of a spanning tree system operating on a network connecting a plurality of nodes, comprises two transfer units which determines an output destination port, based on the destination MAC address of an input frame, two tree managers which configures a spanning tree according to a spanning tree protocol, and a virtual port of connecting the tree manager and the transfer unit.

56 Claims, 31 Drawing Sheets

103 →

| DESTINATION MAC | OUTPUT PORT |
|---|---|
| 1A 12 26 4F 5G 08 | 111 |
| 30 34 7D 5B E8 FF | 116 |
| 58 DC FE 32 11 9A | 116 |
| BB 7C 67 28 09 12 | 112 |

1031, 1032

| DESTINATION MAC | OUTPUT PORT |
|---|---|
| 1A 12 26 4F 5G 08 | 111 |
| 30 34 7D 5B E8 FF | 113 |
| 58 DC FE 32 11 9A | 114 |
| BB 7C 67 28 09 12 | 116 |

| DESTINATION MAC | DESTINATION RPR NODE | RING ID | OUTPUT PORT | |
|---|---|---|---|---|
| 01 80 C2 00 00 00 | 1 2 R | Outer | 1 1 4 | PREVIOUSLY SET |
| 30 34 7D 5B E8 FF | 1 3 R | Inner | 1 1 3 | EXAMPLE |
| 58 DC FE 32 11 9A | 1 2 R | Outer | 1 1 4 | EXAMPLE |
| BB 7C 67 28 09 12 | 1 1 R | DELETE | 1 1 6 | EXAMPLE |

| DESTINATION IDENTIFIER TAG | OUTPUT PORT |
|---|---|
| 0 0 0 0 | 1 1 1 |
| 0 0 3 1 | 1 1 6 |
| 0 1 5 6 | 1 1 6 |
| 4 0 9 5 | 1 1 2 |

FIG. 28

| DESTINATION MAC | INSERTION TAG |
|---|---|
| 1A 12 26 4F 5G 08 | 0 0 0 0 |
| 22 00 00 00 00 22 | 0 0 3 1 |
| 58 DC FE 32 11 9A | 1 8 6 2 |
| BB 7C 67 28 09 12 | 4 0 9 5 |

NETWORK1

NETWORK2

NETWORK 3

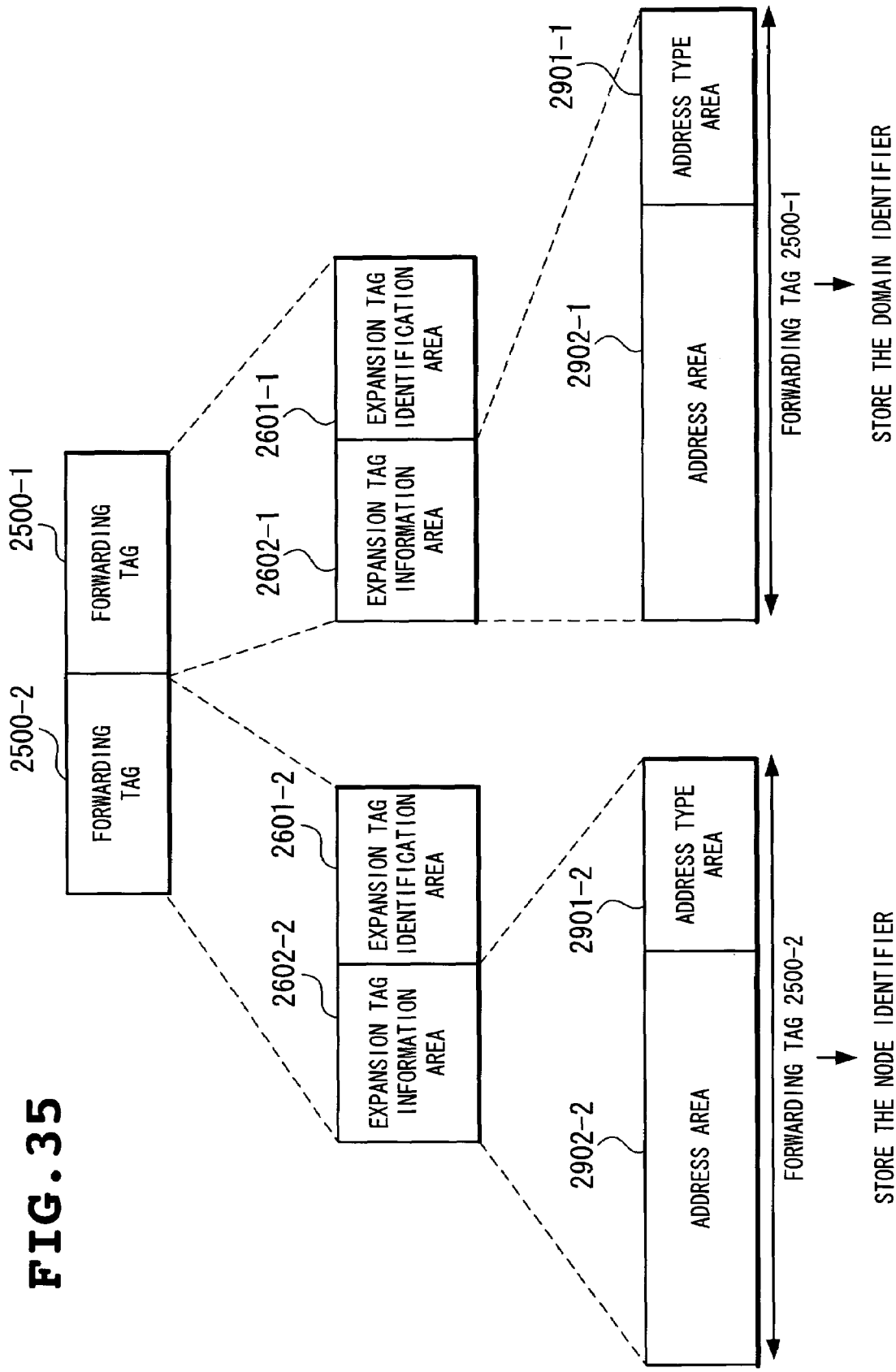

NETWORK SYSTEM, SPANNING TREE CONFIGURATION METHOD AND CONFIGURATION PROGRAM, AND SPANNING TREE CONFIGURATION NODE

BACKGROUNDS OF THE INVENTION

1. Field of the Invention

The present invention relates to a spanning tree system, and more particularly to a spanning tree system, a spanning tree configuration node, a spanning tree configuration method, and its program capable of connecting the trees without causing a loop of path, in dividing a spanning tree into domains.

2. Description of the Related Art

Hitherto, this kind of spanning tree is used to prevent from data loops, by forming such a tree link as assuming that a loop does not exist logically even in the case where a loop ring physically exists in a network.

As the conventional technique about the spanning tree, there exist the following examples.

For example, in the standard documents (non-patent article 1) issued by the IEEE, titled as "IEEE•Standard•802.1D (IEEE Std 802.1D), 1998", when a loop (ring) exists in a network, in order to prevent from data loops, a control method called a spanning tree is defined (hereinafter, referred to as the non-patent article 1), in which method the control information called as the Bridge Protocol Data Unit (BPDU) is exchanged between nodes, and one portion of the physical loop network is disabled, hence to form the logical tree topology.

Further, in the standard documents (non-patent article 2) issued by the IEEE, titled as "IEEE•Standard•802.1W (IEEE Std 802.1W), 2001", a control method called a high-speed spanning tree is defined (hereinafter, referred to as the non-patent article 2), in which the tree configuration in the conventional technique 1 is speeded up by expanding the exchange method of the control information, and further, a detour path can be set promptly at an occurrence of a failure, by previously setting the detour path.

The paper titled as "Institute of Electronics, Information and Communication Engineers, Society Meeting 2002, B-7-11 to B-7-13, Proposal of Ethernet Architecture GOE (Global Optical Ethernet) for Future Generation", describes a method of transferring the Ethernet frame, with an identification tag indicating the destination information and the like inserted into the Ethernet frame and with a forwarding table configured by using the spanning tree created in a multiphasic way (hereinafter, referred to as the non-patent article 3).

One example of the spanning trees configured in the non-patent articles 1 to 3 is shown in FIG. 29. The created spanning tree is indicated by the heavy line in FIG. 29. In this conventional spanning tree configured for a network, one spanning tree is configured on the whole network while the node 11 to the node 32 exchange the control frames (information) with each other.

The above conventional technique, however, has the following problems.

At first, in any convention technique, it takes a long time to configure the spanning tree.

In the technique of the non-patent article 1, although the spanning tree is configured by exchanging the control frame called BPDU frame, when performing a state transition, each node confirms arrival of a new BPDU frame and therefore, performs a state transition by using a timer. According as the number of the nodes to be accommodated in a network increases, it takes a longer time to configure the spanning tree.

The number of the BPDU frames exchanged between each node increases according to an increase in the number of the bridge nodes belonging to a network. Therefore, configuration of the spanning tree takes the longer time according to an increase in the size of the network.

The technique of the non-patent article 2 is identical to the conventional technique 1 in that the spanning tree is configured by exchange of the control frame called BPDU frame, and it, however, speeds up the state transition, by exchange of a confirmation frame called Proposal and Agreement. Therefore, compared with the non-patent article 1, the technique of the non-patent article 2 can shorten the configuration time of the spanning tree, but complicate the shape of the topology and therefore, it takes the longer time to configure the spanning tree, according to an increase in the number of the nodes to be accommodated into a network.

In the technique of the non-patent article 3, since the spanning tree configured by using the method of the non-patent article 2 is created in a multiphasic way, configuration of the spanning tree takes the longer time for the same reason as the non-patent article 2.

At second, in any conventional technique, there is such a problem that at occurrence of a failure, it affects a large area.

In the conventional technique of the non-patent article 1, in the case of changing the configuration of the spanning tree owing to a failure, the ports on the whole network are once closed and then the spanning tree has to be reconfigured.

In the conventional technique of the non-patent article 2, in the case of changing the configuration of the spanning tree owing to a failure, one of the network is locally stopped, the configuration is gradually changed, and then the spanning tree on the whole network is reconfigured. Therefore, even in a place distant from a failure, at last it is necessary to stop the network temporarily.

In the conventional technique of the non-patent article 3, since the spanning tree configured by using the method of the non-patent article 2 is created in a multiphasic way, there is such a problem that at occurrence of a failure, it affects a large area, owing to the same reason as the non-patent article 2.

In the above-mentioned conventional technique 1 to the conventional technique 3, since only one node that is a connecting point to connect the existing network can be provided, in order to prevent the spanning tree from being a loop shape, it is difficult to configure the spanning tree in every network.

SUMMARY OF THE INVENTION

A first object of the invention is to provide a spanning tree system, a spanning tree configuration node, a spanning tree configuration method, and a spanning tree configuration program capable of shorting the configuration time of the spanning tree.

A second object of the invention is to provide a spanning tree system, a spanning tree configuration node, a spanning tree configuration method, and a spanning tree configuration program capable of restricting the failure affecting area at occurrence of a failure.

According to the first aspect of the invention, a network system for setting a transfer path according to a spanning tree on a network connecting a plurality of nodes, wherein two different networks are connected by a partial network consisting of at least four nodes accommodating no terminal, and the node belonging to said partial network configures and manages a spanning tree for every other network adjacent to the self-partial network, according to a spanning tree protocol.

According to another aspect of the invention, a node forming a spanning tree on a network connecting a plurality of nodes, comprising the following steps of configuring a partial network which connects two different networks by, at least, four nodes accommodating no terminal; and configuring and managing a spanning tree for every other network adjacent to the self-partial network, according to a spanning tree protocol According to another aspect of the invention, a spanning tree configuration method of configuring a spanning tree on a network connecting a plurality of nodes, comprising the following steps of configuring a partial network which connects two different networks by, at least, four nodes accommodating no terminal; and configuring and managing a spanning tree for every other network adjacent to the self-partial network, according to a spanning tree protocol.

According to another aspect of the invention, a spanning tree configuration program of running on each node forming a spanning tree on a network connecting a plurality of nodes, comprising the following functions of configuring a partial network which connects two different networks by, at least, four nodes accommodating no terminal; and configuring and managing a spanning tree for every other network adjacent to the self-partial network, according to a spanning tree protocol.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 28 shows the structural example of a table 203, according to the fifth embodiment of the invention;

FIG. 35 is a view showing the configuration example of the forwarding tag in the hierarchical network of the invention.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Hereinafter, preferred embodiments of the invention will be described in detail with reference to the drawings.

In the following description, spanning tree protocol (IEEE802.1D) and high-speed spanning tree protocol (IEEE802.1W) are collectively referred to as a spanning tree.

Figure 1:
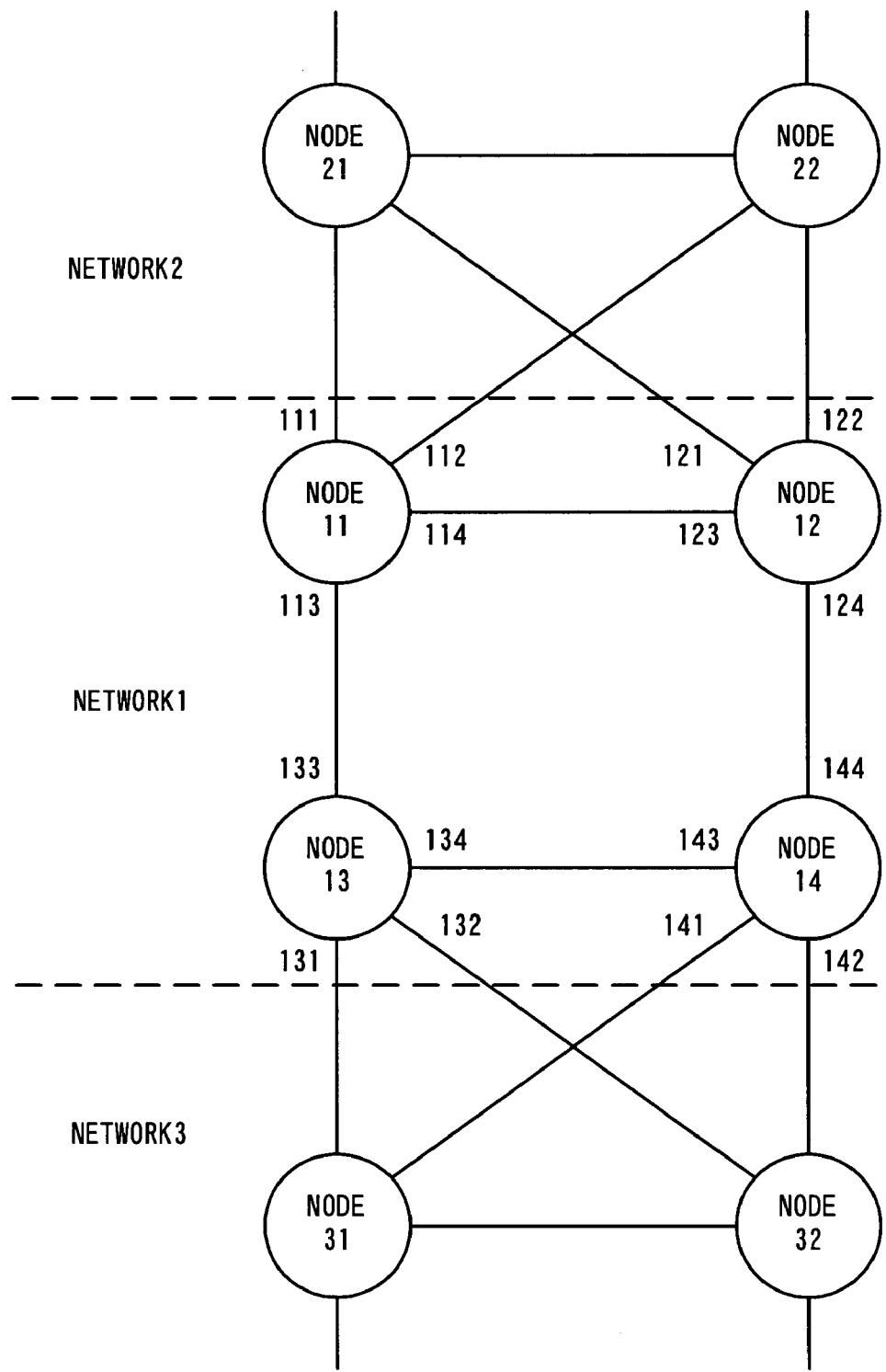
FIG. 1 is a block diagram showing a network configuration, according to a first embodiment of the invention.

FIG. 1 is a block diagram showing an example of the network configuration to which the invention is adopted. The network shown in the drawing consists of three partial networks 1, 2, and 3. Nodes 11 to 14 forming the network 1 of FIG. 1 is the nodes according to the invention, and nodes 21, 22, 31, and 32 are the conventional spanning tree-compatible nodes. FIG. 1 physically shows one network configuration, and the following two cases are considered as the situation of configuring the network as shown in FIG. 1.

In one case, an existing network connecting a plurality of nodes is divided into several partial networks by domain, and the nodes belonging to the partial network 1 are replaced with the nodes according to the invention, thereby configuring the network of FIG. 1.

In the other case, it is shown in the situation of connecting the existing networks with each other. This situation is described by using FIG. 1. When the network 2 and the network 3 are the existing networks, in order to connect the both, the nodes 11 to 14 are newly provided therebetween, to form the network 1 additionally, as shown in FIG. 1.

The invention can be adopted to both the situation of dividing the above existing network and replacing the nodes of one partial network with the nodes according to the invention and the situation of connecting the separately existing networks with each other by using the nodes according to the invention.

Although the description will be made based on the latter situation in the below, since the physical structure of the network shown in FIG. 1 is the same as in the former situation, the like operation can be performed also in the former situation.

The network 1 is a network for operating the protocol such as spanning tree or resilient packet ring (RPR) (hereinafter, referred to as a connection protocol), in order to mutually connect the network 2 and the network 3. The network 1 has four nodes: nodes 11 to 14.

The network 2 is the existing network for the operation of the spanning tree, and it is connected with the network 1 through the node 11 and the node 12. The network 2 has the node 21 and the node 22. The nodes 21 and 22 don't have to be the nodes according to the invention necessarily.

The network 3 is the existing network for the operation of the spanning tree, and it is connected with the network 1 through the node 13 and the node 14. The network 3 has the node 31 and the node 32. The nodes 31 and 32 don't have to be the nodes according to the invention necessarily.

The node 11 existing within the network 1 is a node including no terminal, and it comprises a tree manager (corresponding to a tree manager 104 of FIG. 2) for managing the spanning tree on the side of the existing network 2 and a manager (corresponding to a tree manager 108 of FIG. 2) for controlling the connection protocol of the spanning tree or the like of the network 1. The node 11 of the invention has the separate tree managers for controlling these two series of spanning trees respectively. The node 11 is physically connected to the node 21, the node 22, the node 12, and the node 13.

The node 12 of the invention existing within the network 1 is a node including no terminal, and it comprises the tree manager (corresponding to the tree manager 104 of FIG. 2) for managing the spanning tree on the side of the existing network 2 and the manager (corresponding to the tree manager 108 of FIG. 2) for controlling the connection protocol of the spanning tree or the like of the network 1. The node 12 is physically connected to the node 21, the node 22, the node 11, and the node 14.

The node 13 of the invention existing within the network 1 is a node including no terminal, and it comprises the tree manager (corresponding to the tree manager 104 of FIG. 2) for managing the spanning tree on the side of the existing network 3 and the manager (corresponding to the tree manager 108 of FIG. 2) for controlling the connection protocol of the spanning tree or the like of the network 1. The node 13 is physically connected to the node 11, the node 14, the node 31, and the node 32.

The node 14 of the invention existing within the network 1 is a node including no terminal, and it comprises the tree manager (corresponding to the tree manager 104 of FIG. 2) for managing the spanning tree on the side of the existing network 3 and the manager (corresponding to the tree manager 108 of FIG. 2) for controlling the connection protocol of the spanning tree or the like of the network 1. The node 14 is physically connected to the node 12, the node 13, the node 31, and the node 32.

In these ways, each of the nodes 12 to 14 has the separate tree managers for controlling the two series of spanning trees, similarly to the node 11.

The node 21 existing within the network 2 has only to comprise the tree manager (corresponding to the tree manager 104 of FIG. 2) for managing the spanning tree. The node 21 is physically connected with the node 22, the node 11, and the node 12.

The node 22 existing within the network 2 is the same as the node 21. The node 22 is physically connected with the node 21, the node 11, and the node 12.

The node 31 existing within the network 3 has only to comprise the tree manager (corresponding to the tree manager 104 of FIG. 2) for managing the spanning tree. The node 31 is physically connected with the node 32, the node 13, and the node 14.

The node 32 existing within the network 3 is the same as the node 31. The node 32 is physically connected with the node 31, the node 13, and the node 14.

Ports 111, 112, 121, and 122 belong to the nodes 11 and 12, for connecting the network 2.

Ports 113, 114, 123, 124, 133, 134, 143, and 144 belong to the nodes 11 to 14, for connecting the network 1. Ports 131, 132, 141, and 142 belong to the nodes 13 and 14, for connecting the network 3.

First Embodiment

Figure 2:
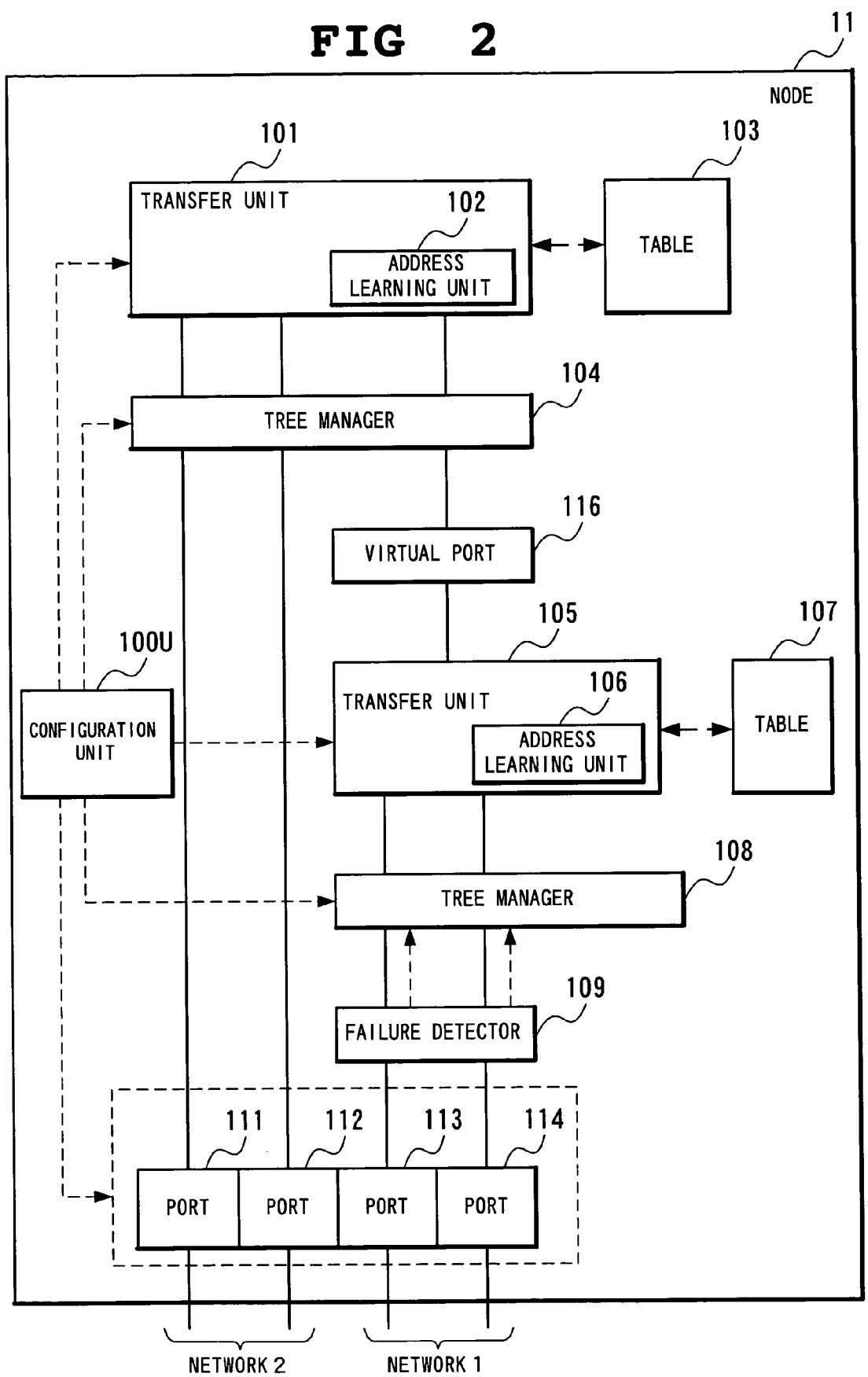
FIG. 2 is a block diagram showing the structure of a node 11, according to the first embodiment of the invention.

FIG. 2 is a block diagram showing the details of the structure of the node 11 in FIG. 1, according to a first embodiment.

In FIG. 2, a configuration unit 100U receives setting instructions as shown in the below (1) to (6), as the initial setting, by using a keyboard, a mouse, TELNET, WEB and the like. Based on the setting result of (1), each of the ports 111 to 114 is connected to the tree manager 104 for managing the spanning tree of the existing network or a failure detector 109; based on the setting results of (2) to (5), a transfer unit 101 and a transfer unit 105 are set; and based on the setting results of (5) and (6), the tree manager 104 and the tree manager 108 are also set.

(1) whether each port belongs to the network 1 or the network 2, (2) the node ID of a destination node (a neighbor node connected to both the network 1 and the network 2) in the case of transmitting the BPDU frames for the spanning tree configuration for the network 2, to the network 1, (3) the network to which the node (node 11) mainly belongs (the network 1 in FIG. 1), (4) whether the ports on the side of the network 2 are cut off or not at the double failure, This setting instruction is used for transmitting a root/node signal, for example, in the occurrence of the double failure described later.

(5) the ports to which the node set in (2) is connected, and (6) the cost of the port and link and the priority of the nodes, defined in the IEEE802.1D or the IEEE802.1W.

Each of the nodes 12, 13, and 14 of the network 1 has the same structure as the node 11 of FIG. 2. In this case, in the description of the above node 11, the ports 111 to 114 are changed to the own ports of the respective nodes, and the network 2 in the above description is as it is in the node 12, but it is changed to the network 3 in the nodes 13 and 14.

The transfer unit 101 transfers the input frame to an output port described in the table 103, with reference to the header information of the frame input from the tree manager 104. When there is no description of the output port in the table 103, the input frame is copied and transferred to the port other than the input port.

An address learning unit 102 writes the path information of the output port corresponding to the destination address into the table 103, based on the source address of the frame supplied to the transfer unit 101.

The table 103 is a table in which each output port corresponding to each destination MAC address is described. Writing into the table 103 is performed by the address learning unit 102, and the path information described in the table 103 is read out by the transfer unit 101.

The tree manager 104 has the following three functions of:

(1) transferring a frame to the transfer unit 101 or discarding it, in order to transfer the frame input from the ports 111 and 112 and a virtual port 116 along the path on the spanning tree, (2) transferring a frame to the ports 111 and 112 and the virtual port 116 or discarding it, in order to transfer the frame input from the transfer unit 101 along the path on the spanning tree, and (3) transmitting and receiving the BPDU frame to and from the ports 111 and 112 and the virtual port 116, for the spanning tree configuration, and then configuring the spanning tree for the network 2, while controlling port blocking units (1045 to 1047 in FIG. 4) within the tree manager 104, by use of the spanning tree protocol according to the command described in the BPDU frame.

The transfer unit 105 transfers a frame to the output port described in a table 107, with reference to the header information of the frame input from the tree manager 108. When there is no description of the output port in the table 107, the input frame is copied and transferred to the port other than the input port.

The address learning unit 106 writes the path information about each output port corresponding to each destination address into the table 107, based on the source address of the frame supplied to the transfer unit 105.

The table 107 is a table in which each output port corresponding to each destination MAC address is described. Writing into the table is performed by the address learning unit 106, and the path information described in the table 107 is read out by the transfer unit 105.

The tree manager 108 has the following four functions of:

(1) transferring a frame to the transfer unit 105 or discarding it, in order to transfer the frame input from the ports 113 and 114 along the path on the spanning tree, (2) transferring a frame to the ports 113 and 114 or discarding it, in order to transfer the frame input from the transfer unit 105 along the path on the spanning tree, (3) transmitting and receiving the BPDU frame to and from the ports 113 and 114, for the spanning tree configuration, and then, configuring the spanning tree for the network 1, while controlling the port blocking units (1045 and 1046 in FIG. 4) within the tree manager 108, by use of the spanning tree protocol according to the command described in the BPDU frame, and (4) speeding up the failure detection in the spanning tree, upon receipt of a failure signal from the failure detector 109.

The failure detector 109 periodically transmits keep alive frames to the port 113 and the port 114 at predetermined time intervals. Further, it receives the keep alive frames from the port 113 and the port 114 and when the arrival interval of the keep alive frames is beyond the predetermined time interval, it issues a failure signal to the tree manager 108.

The virtual port 116 is an internal port of the node 11 and relays the transmission and reception of the frame between the tree manager 104 and the transfer unit 105.

The virtual port belongs to the network 1, and each node having the tree manager for the spanning tree of the existing network 2 has the same number of the virtual ports as the number of the other neighbor nodes and "the nodes belonging to the network 1 and having the tree managers for the spanning tree of the network 2". As for the node 11 (in FIG. 2), the neighbor node satisfying this condition is only the node 12, and therefore, the virtual port is only one.

Similarly, each node belonging to the network 1 and having the tree manager for the spanning tree of the existing network 3 has the same number of the virtual ports as the number of the other neighbor nodes and "the nodes belonging to the network 1 and having the tree managers for the spanning tree of the network 3".

Accordingly, each of the node 11 and the node 13 in FIG. 1 has the only one virtual port 116.

Figures 3, 4:
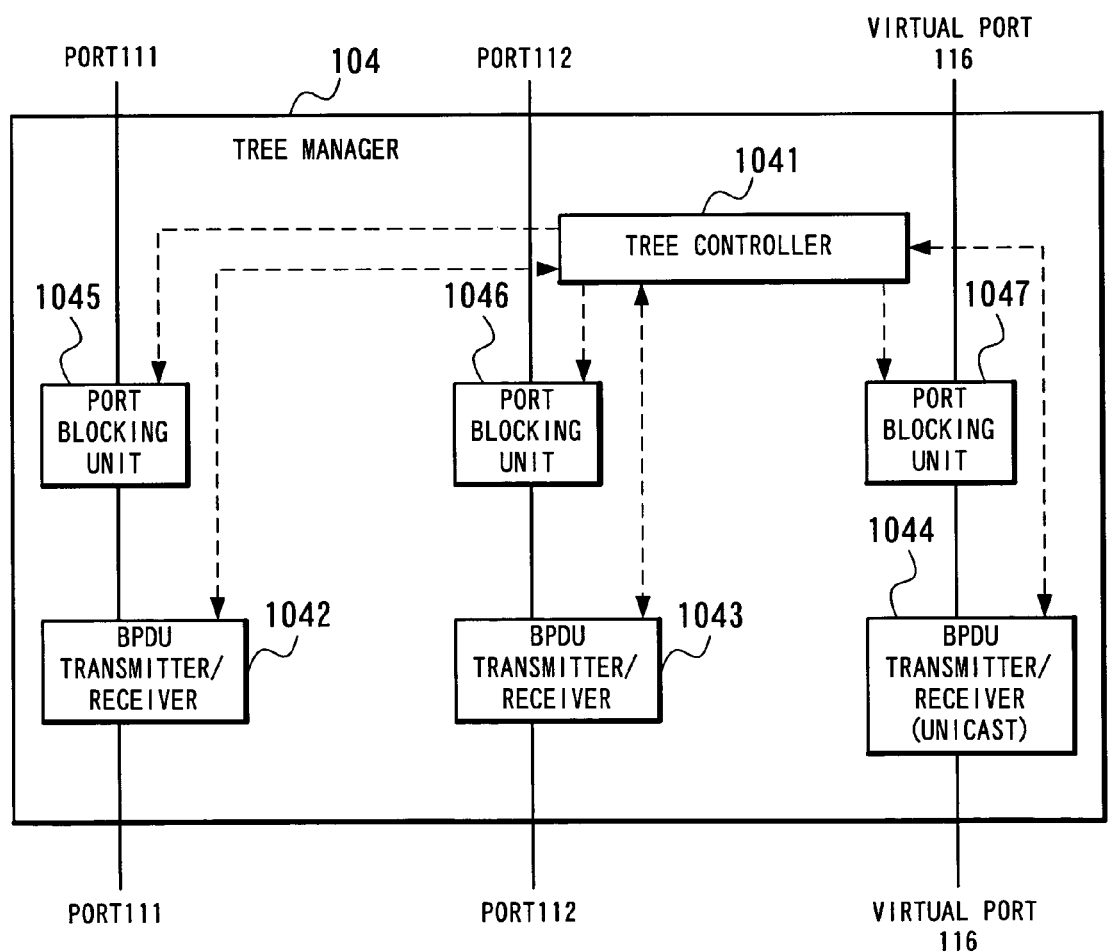
FIG. 3 shows the structural example of a table 103, according to the first embodiment of the invention.
FIG. 4 is a block diagram showing the structure of a tree manager 104, according to the first embodiment of the invention.

FIG. 3 is a view indicating the details of the structure of the table 103 of FIG. 2.

The destination MAC 1031 is a field for a retrieval key when the transfer unit 101 retrieves an output port, where each MAC address is described.

The output port 1032 is a field for describing each output port ID corresponding to each destination MAC 1031. In this field, one or several port IDs and virtual port IDs are described. For example, when the destination MAC address of the input frame is "1A 12 26 4F 5G 08", the transfer unit 101 controls so as to supply this frame to the output port 111.

FIG. 4 is a block diagram showing the details of the structure of the tree manager 104 of FIG. 2.

A tree controller 1041 opens and shuts the port 111, the port 112, and the virtual port 116, by using the port blocking units 1045 to 1047, in order to configure the logical network (spanning tree) so as to prevent from generation of a loop, according to the information of the BPDU frames received by the BPDU transmitter/receiver 1042 to the BPDU transmitter/receiver 1044.

The BPDU transmitter/receiver 1042 transmits and receives the BPDU frame defined by the spanning tree protocol. The BPDU transmitter/receiver 1042 performs the following operations of:

(1) confirming the destination MAC address of the frame input from the port 111, receiving the frame when the destination MAC address is the bridge group address (01-80-C2-00-00-00) that is the special address for BPDU and performing the spanning tree configuration processing, in cooperation with the tree controller 1041, (2) regarding that there has been the input of the data frame and transferring the frame to the port blocking unit 1045 when the destination MAC address of the frame input from the port 111 is not the bridge group address, (3) creating the BPDU frame and transmitting it to the port 111 when being requested to transmit the BPDU frame by the tree controller 1041, and (4) transferring the frame input from the port blocking unit 1045 to the port 111 as it is without adding any processing.

The BPDU transmitter/receiver 1043 performs the same operations as the above-mentioned BPDU transmitter/receiver 1042.

The BPDU transmitter/receiver 1044 performs the following operations of:

(1) confirming the destination MAC address of a frame input from the virtual port 116, receiving the frame when the destination MAC address is the bridge group address (01-80-C2-00-00-00) that is the special address for BPDU, and performing the spanning tree configuration processing, in cooperation with the tree controller 1041, (2) confirming the contents of the frame even when the destination MAC address of a frame input from the virtual port 116 is not the bridge group address, and receiving the frame and performing the spanning tree configuration processing, in cooperation with the tree controller 1041 when it is the BPDU frame, (3) transferring the frame to the port blocking unit 1047 when the destination MAC address of a frame input from the virtual port 116 is neither the bridge group address nor the BPDU frame address, (4) transferring a frame input from the port blocking unit 1047 to the virtual port 116 without adding any processing to the frame, and (5) creating the BPDU frame, with the MAC address of the node previously set in the initial setting of (2), not the bridge group address, as the destination address in the destination MAC of the BPDU frame to be transmitted and transmitting it to the virtual port 116, because of being connected to the virtual port 116, when being requested to transfer the BPDU frame by the tree controller 1041.

As for the operation of this (5), for example, the BPDU transmitter/receiver 1044 of the node 11 specifies the MAC address of the node 12 as the destination and the BPDU transmitter/receiver 1044 of the node 12 specifies the MAC address of the node 11 as the destination. According to this, it is possible to configure the spanning tree for the network 2 and the spanning tree for the network 1 separately. Similarly, the BPDU transmitter/receiver 1044 of the node 13 specifies the MAC address of the node 14 and the BPDU transmitter/receiver 1044 of the node 14 specifies the MAC address of the node 13. This operation is performed by only the BPDU transmitter/receiver connected to the virtual port and the BPDU transmitter/receiver connected to the usual port uses the bridge group address for the destination MAC.

The port blocking unit 1045 opens and shuts the port, upon receipt of the instruction from the tree controller 1041.

The port blocking unit 1045 transfers the frame input from the BPDU transmitter/receiver 1042 to the transfer unit 101, when receiving the instruction to open the port from the tree controller 1041, and it transfers the frame input from the transfer unit 101 to the BPDU transmitter/receiver 1042.

When receiving the instruction to shut the port in order to cut off the network logically, from the tree controller 1041, the port blocking unit 1045 discards all the frames input from the BPDU transmitter/receiver 1042 and the frames input from the transfer unit 101.

The port blocking units 1046 and 1047 perform the same operation as the port blocking unit 1045.

Figures 5, 6:
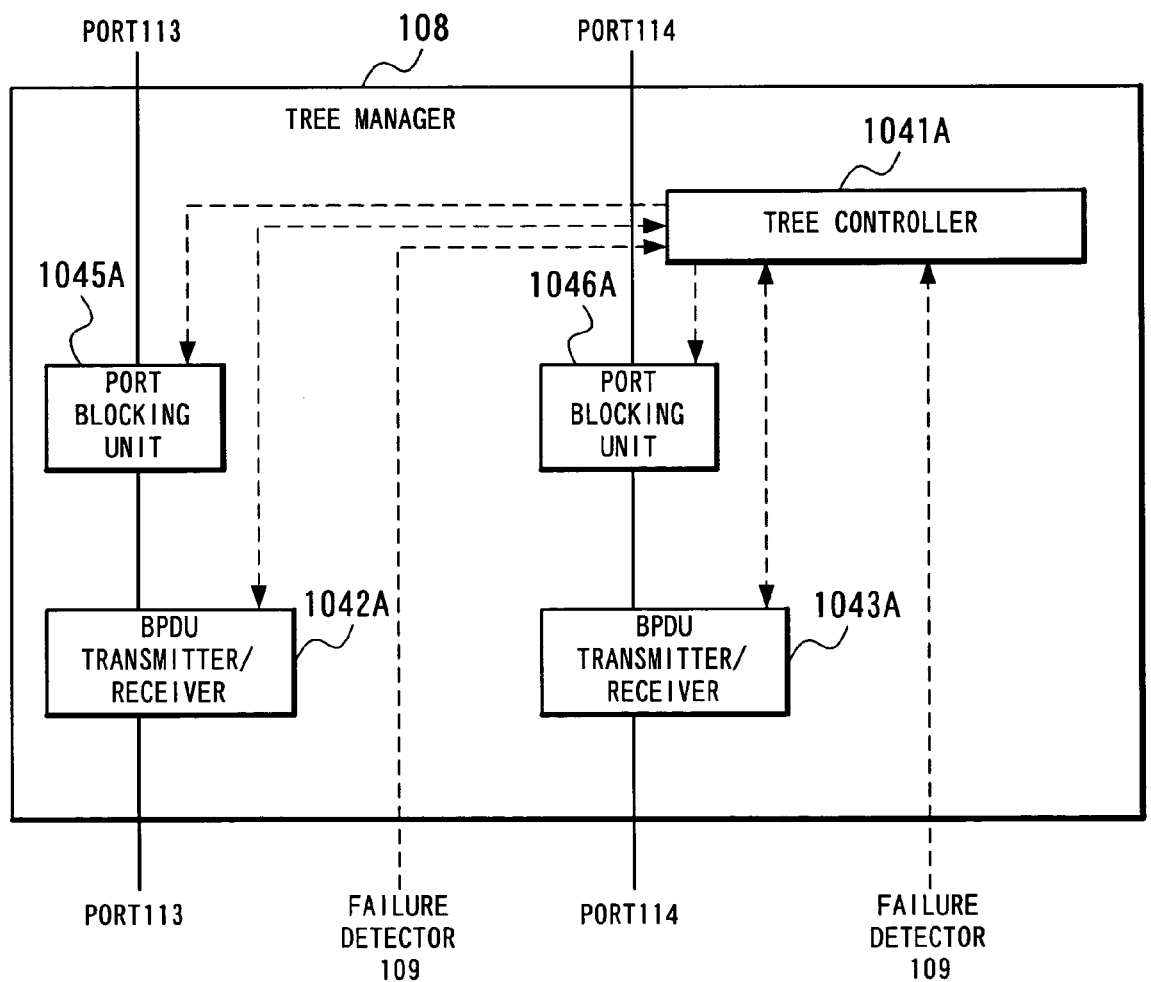
FIG. 5 shows the structural example of a table 107, according to the first embodiment of the invention.
FIG. 6 is a block diagram showing the structure of a tree manager 108, according to the first embodiment of the invention.

FIG. 5 is a view showing the details of the structural example of the table 107 in FIG. 2.

The destination MAC 1071 is a field for a retrieval key when the transfer unit 105 retrieves an output port, where the MAC addresses are described.

The output port 1072 is a field for describing each output port ID corresponding to each destination MAC 1071. In this field, one or several port IDs and the virtual port IDs are described.

FIG. 6 is a block diagram showing the details of the structure of the tree manager 108 in FIG. 2.

The tree controller 1041A opens and shuts the port 113 and the port 114 by using the port blocking unit 1045A and the port blocking unit 1046A, in order to configure the logical network (spanning tree) so as to prevent from generating a loop, according to the information of the BPDU frames received by the BPDU transmitter/receiver 1042A and the BPDU transmitter/receiver 1043A and the information from the failure detector 109.

The BPDU transmitter/receiver 1042A transmits and receives the BPDU frames defined by the spanning tree. Upon receipt of the frame from the port 113, the BPDU transmitter/receiver 1042A confirms the destination MAC address of the input frame, and when the destination MAC is the bridge group address (01-80-C2-00-00-00) that is the special address for the BPDU, it receives the frame and performs the spanning tree configuration processing in cooperation with the tree manager 1041A. When the destination MAC address of the input frame is not the bridge group address, it assumes that there has been the input of the data frame and transfers the frame to the port blocking unit 1045A.

The BPDU transmitter/receiver 1043A performs the same operation as the BPDU transmitter/receiver 1042A.

The port blocking unit 1045A opens and shuts the port upon receipt of the instruction from the tree controller 1041A.

The port blocking unit 1045A transfers the frame input from the BPDU transmitter/receiver 1042A to the transfer unit 105 when receiving the instruction to open the port from the tree controller 1041A, and further transfers the frame input from the transfer unit 105 to the BPDU transmitter/receiver 1042A.

The port blocking unit 1045A discards all the frames input from the BPDU transmitter/receiver 1042A and the frames input from the transfer unit 105, when receiving the instruction to shut the port in order to cut off the network logically, from the tree controller 1041A.

The port blocking unit 1046A performs the same operation as the port blocking unit 1045A.

Figure 7:
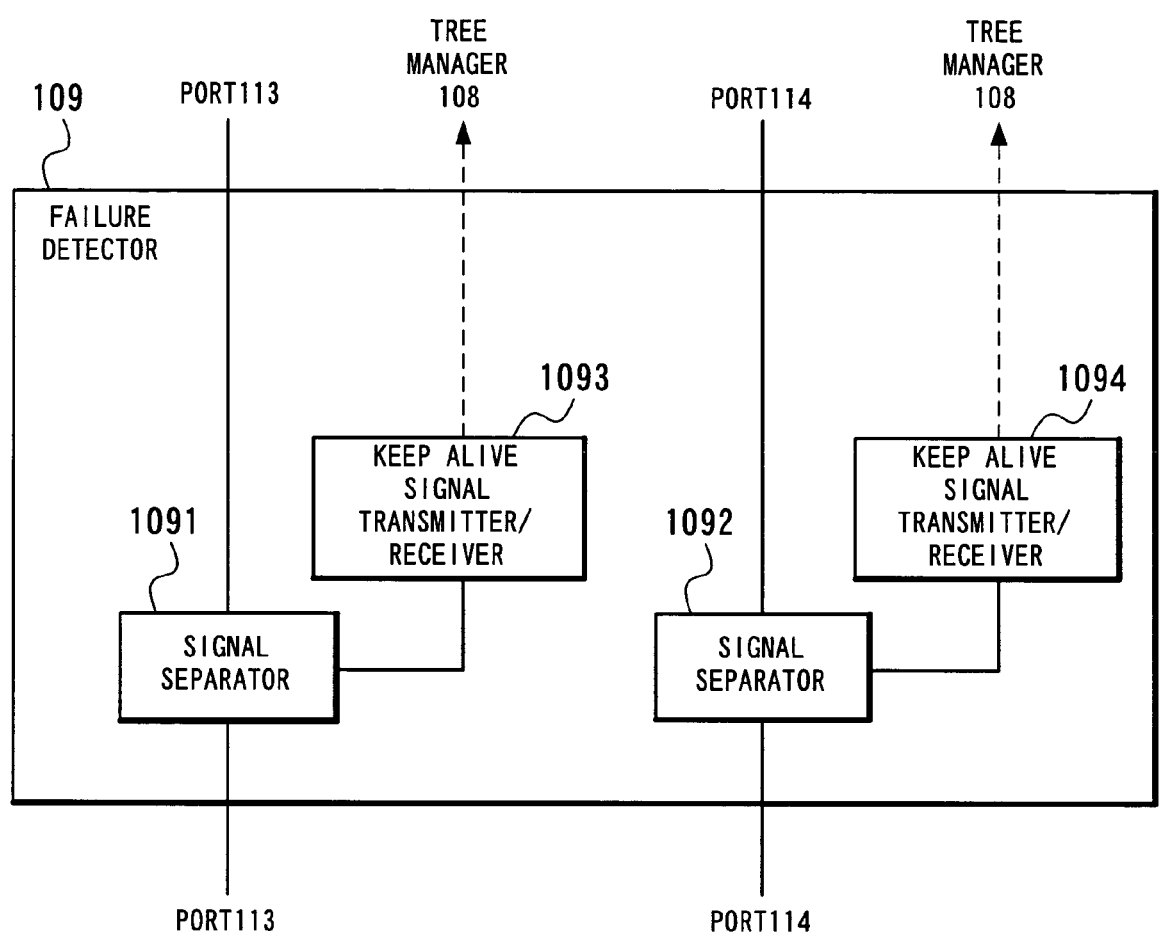
FIG. 7 is a block diagram showing the structure of a failure detector 109, according to the first embodiment of the invention.

FIG. 7 is a block diagram showing the details of the structure of the failure detector 109 in FIG. 2.

A signal separator 1091 transfers a keep alive signal input from the port 113 to the keep alive signal transmitter/receiver 1093 and transfers the signal other than the keep alive signal input from the port 113, to the tree manager 108 through the output of the port 113. Further, it transfers the keep alive signal transmitted from the keep alive signal transmitter/receiver 1093 to the port 113 and the signal input from the tree manager 108 to the port 113.

A signal separator 1092 performs the same operation as the signal separator 1091.

The keep alive signal transmitter/receiver 1093 transmits the keep alive signal to the signal separator 1091 at predetermined intervals, detects a failure from the arrival interval of the keep alive signal received by the signal separator 1091, and notifies the tree manager 108 of this effect.

A keep alive signal transmitter/receiver 1094 performs the same operation as the keep alive signal transmitter/receiver 1093.

OPERATION EXAMPLE 1 OF THE FIRST EMBODIMENT

Configure a Spanning Tree Without Blocking the Boundaries in the Topology of FIG. 1

The first operation example of this embodiment will be concretely described in detail with reference to FIG. 1, FIG. 30A, FIG. 30B, and FIG. 30C.

In the operation example, the operation enabling the configuration of a spanning tree and the data transfer, in a network consisting of the physical topology shown in FIG. 1, will be described.

Figure 30A:
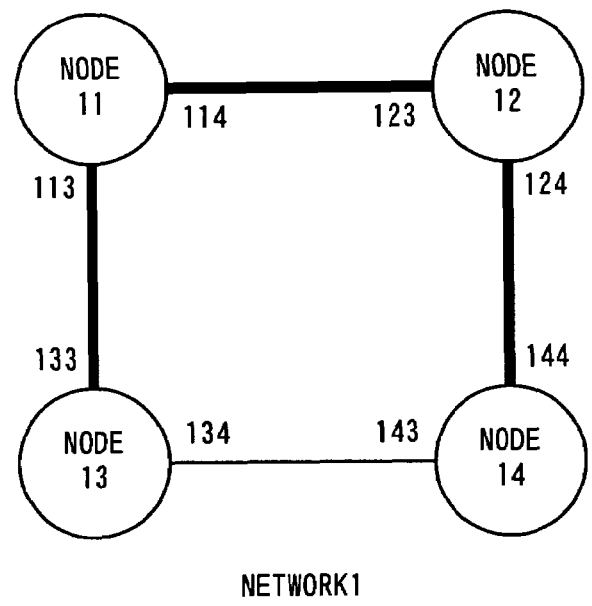
FIG. 30A is a block diagram showing an example of the network configuration and the spanning tree configuration of a network 1, according to the first embodiment of the invention.

In each of the nodes 11 to 14 belonging to the network 1, the tree manager 108 on the side of connection (on the side of the network 1) is operated, to configure a spanning tree for the network 1. At this point, the tree manager 104 on the side of the existing network (on the side of the network 2) is not operated yet. Since the tree manager 108 of the node 11 cannot recognize the ports 111 and 112, the network configuration recognized by the tree manager 108, namely, the configuration of the network 1 becomes as shown in FIG. 30A. The respective tree managers 108 of the nodes 11 to 14 configure the spanning tree for the network 1 while exchanging the BPDU frames. One example of the form of the spanning tree to be configured is shown by the heavy line of FIG. 30A. The form of the spanning tree is determined by the cost set in every link and port and the priority set in every node, according to the method described in the IEEE802.1D or the IEEE802.1W. Hereafter, the spanning tree configured here will be referred to as the tree of the network 1.

After the tree of the network 1 has got stable, the tree of the existing network 2 is configured. Getting stable means the state in which the BPDU frame is no longer supplied at the intervals shorter than the time intervals specified by the Hello Timer and the state in which the tree structure of the spanning tree no longer changes than a predetermined time.

In order to configure the tree of the network 2, the respective tree managers 104 of the node 11 and the node 12 and the respective tree managers of the nodes 21 and 22 and another node belonging to the network 2 are operated. The respective tree managers 104 of the node 11 and the node 12 and the respective tree managers of the nodes 21 and 22 and another node belonging to the network 2 configure the spanning tree of the network 2 while exchanging the BPDU frames. At this time, in the node 11, when transmitting the BPDU frame for the spanning tree configuration, the tree manager 104 of configuring the tree of the network 2 defines the MAC address of the node (the MAC address of the node 12 in this case) previously set according to the setting instruction of (2) of the configuration unit 100U, not the bridge group address, as the destination address, as for the BPDU frame transmitted to the side of the network 1, namely to the virtual port 116, of all the transmitted BPDU frames, and then transmits the above to the virtual port 116.

Similarly, the node 12 transmits to the virtual port 116, the BPDU frame to be transmitted to the network 1 side, namely to the virtual port 116, of the BPDU frames to be transmitted by the tree manager 104, with the MAC address of the node previously set by the setting instruction of (2) of the configuration unit 100U (the MAC address of the node 11 in this case), not the bridge group address, as the destination address.

According to the above processing, in the node 12, the BPDU frame transmitted to the network 1 side with the MAC address of the node 11, not the bridge group address, specified as the destination address, is handled in the same way as the data frame, in the network 1, and transferred to the node 11. The node 11 receives the BPDU frame at the port 113 or the port 114. Since the destination address of the received frame is not the bridge group address, the above frame passes through the BPDU transmitter/receiver 1043 within the tree manager 108 and arrives at the transfer unit 105. The transfer unit 105 recognizes it to be the frame destined for the self-node, it is transferred to the virtual port 116. The above frame goes through the virtual port 116 and arrives at the BPDU transmitter/receiver 1044 of the tree manager 104. Here, the BPDU transmitter/receiver 1044 receives the above frame, confirms its contents, finds that the above frame is the BPDU frame, and performs the spanning tree configuration processing for the network 2 in cooperation with the tree controller 1041.

At this time, the BPDU frame transmitted from the node 12 to the node 11 may be transferred through the node 14 and the node 13. Since the MAC address of the node 11 is stored in the destination of the BPDU frame, the node 13 and the node 14 do nothing with this frame. The node 11 receives the BPDU frame transferred through the node 14 and the node 13 at the port 113 and the processing thereafter is the same as the mentioned above.

Figure 30B:
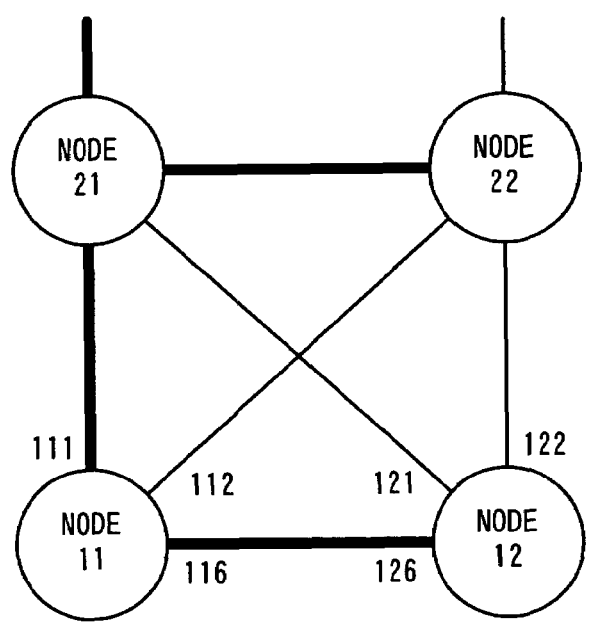
FIG. 30B is a block diagram showing an example of the network configuration and the spanning tree configuration of a network 2, according to the first embodiment of the invention.

According to the above operation example, at a time of the spanning tree configuration on the side of the network 2, viewed from the tree manager 104, it seems that there is always one adjacent link between the nodes 11 and 12, for the following reasons. The ports 113 and 114 cannot be recognized but only the virtual port 116 can be recognized from the viewpoint of the tree manager 104. Since the destination of the BPDU frame to be transmitted from the tree manager 104 to the virtual port 116 is replaced with the MAC address of the adjacent node (node 11 or 12), the nodes 13 and 14 cannot be recognized from the viewpoint of the tree manager 104. As a result, the network configuration recognized by the tree manager 104, namely, the configuration of the network 2 becomes as shown in FIG. 30B. One example of the spanning tree configure by this operation is shown by the heavy line of FIG. 30B. This is an example in which the node 21 becomes a root node of the tree of the network 2.

In order to prevent from generating a loop, it is necessary to set a link between the node 11 and the node 12 to be always a branch of the tree. In the case of using the usual spanning tree protocol, the link between the node 11 and the node 12 can be set to be a branch of the tree by minimizing the cost of the link between the node 11 and the node 12 viewed from the network 2, namely, the cost of the virtual port 116. As a method of making the tree manager 104 recognize that the above is the special link connected to the virtual port, an identifier such as a tag and a flag inserted into a frame can be used, besides using the above-mentioned cost, and any other method can be used as far as it can set the link between the node 11 and the node 12 to be a branch of the spanning tree.

Figure 30C:
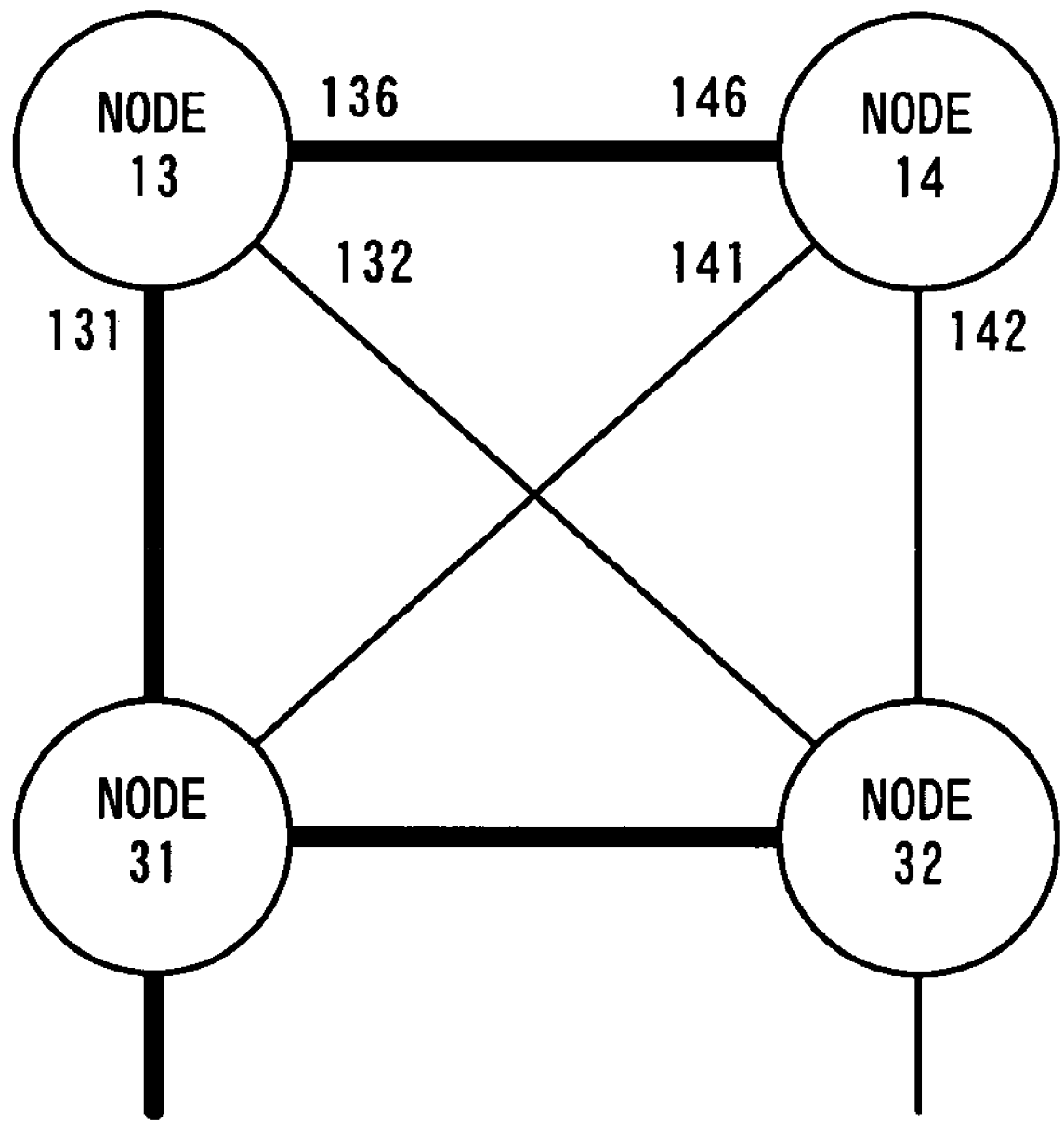
FIG. 30C is a block diagram showing an example of the network configuration and the spanning tree configuration of a network 3, according to the first embodiment of the invention.

The above operation will be similarly performed on the network 3. When the tree manager 104 of configuring the tree of the network 3 in the node 13 transmits the BPDU frame to the network 1, the node 13 transmits the BPDU frame with the MAC address of the node 14 attached to the destination MAC address to the side of the network 1 (the virtual port 116). The network configuration recognized by the tree managers 104 of the nodes 13 and 14, namely, the configuration of the network 3 becomes as shown in FIG. 30C. In this example, the spanning tree configured assuming that the node 31 is a root node of the tree of the network 3, from the viewpoint of the network 3, is shown by the heavy line.

Figure 8:
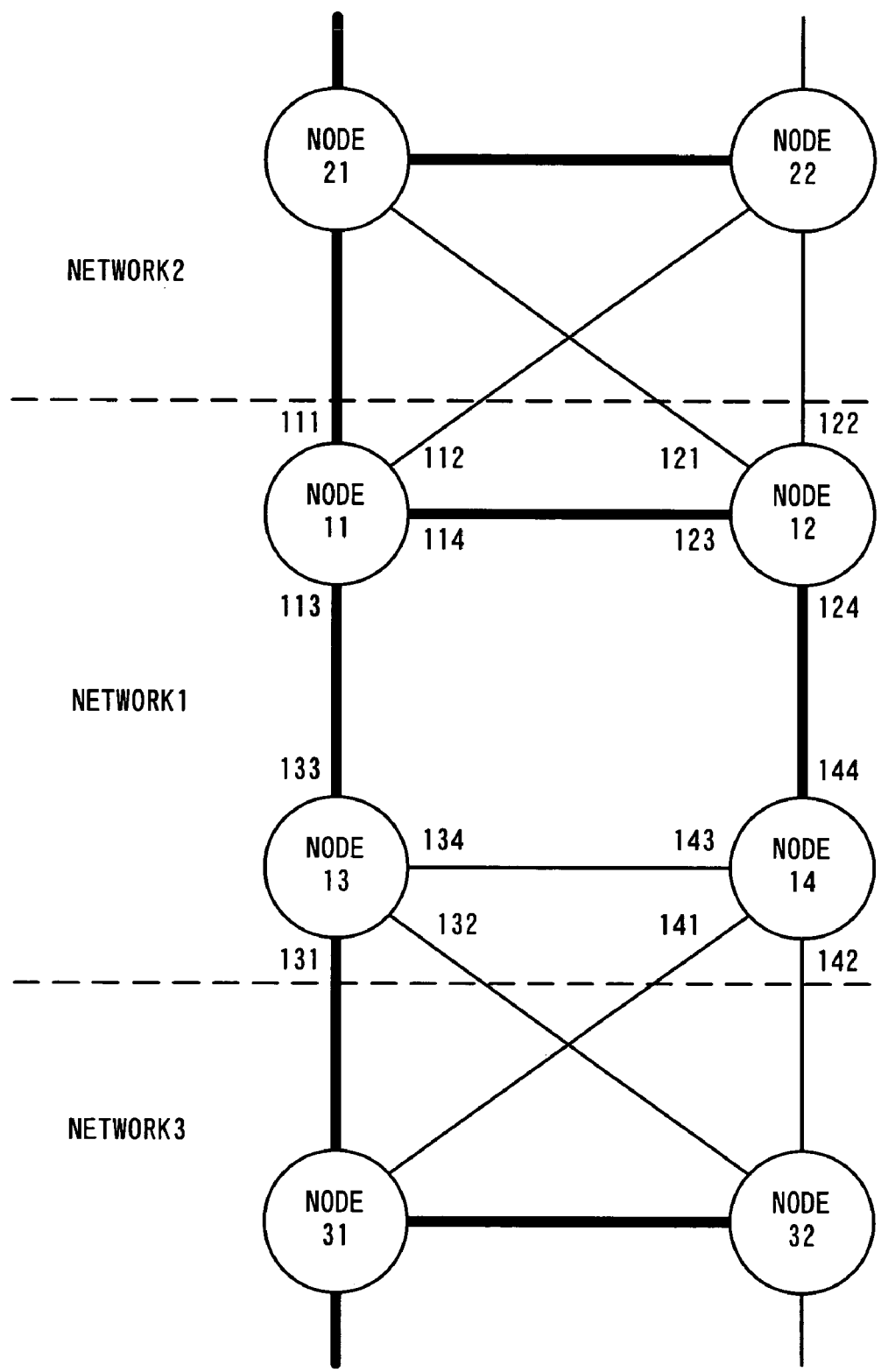
FIG. 8 is a block diagram showing an example of the spanning tree configuration, according to the first embodiment of the invention.

In the actual spanning tree, the node 13 and the node 14 are cut off from each other, as shown in FIG. 8. Viewed from the network 3, the node 13 and the node 14 seem to be connected with each other. This is because the adjacent nodes 13 and 14 seem to be one link in the network 3, and because the node 13 and the node 14 are connected with each other by a path of the node 13-11-12-14 by the network 1 in the actual spanning tree.

Similarly, when the node 14 transmits the BPDU frame from the tree manager 104 to the network 1 side (the virtual port 116), in order to configure the tree of the network 3, it transmits the above frame with the destination MAC address of the node 13 attached there.

Upon completion of the spanning tree configuration for the respective networks 1 to 3 according to the above operations, the logical topology of the network (spanning tree) converges into a form preventing from a loop. The example of the configuration of the completed tree is shown in FIG. 8. Since the tree configuration varies depending on the parameter such as a link cost and the like, it does not always become the tree configuration as shown in FIG. 8, in the network having the physical topology of FIG. 1. By flowing the data frame on the tree thus configured, in the same way as the usual network, it is possible to transfer the frame.

This frame transfer is performed by determining the output destination port with reference to the comparison between the destination address of the frame and the contents of the tables 103 and 107 in each node, in the same way as the general network. Although the contents of the tables 103 and 107 are determined based on the source addresses of the input frames in the address learning units 102 and 106, the node of the invention contains the virtual port 116 and the virtual port 116 may be written as the output port in the tables 103 and 107 in some cases. Accordingly, when the address learning units 102 and 106 of the invention learn the destination, in the case of the frame input from the virtual port, it is necessary to write the virtual port 116, not the port receiving the above frame, into the tables 103 and 107, as the output port corresponding to the source address of the above frame.

Even when one of the above three spanning trees is in an unstable state, packets never loop.

The node 21, the node 22, the node 31, and the node 32 have only to be the conventional spanning tree-compatible node and do not require any special operation.

OPERATION EXAMPLE 2 OF THE FIRST EMBODIMENT

Single Failure Occurrence in the Network 1

The second operation example in the first embodiment will be concretely described in detail with reference to FIG. 1, FIG. 2, FIG. 8, and FIG. 9.

In this operation example, the operation in the case of a failure occurring in one of the four links forming the network 1 will be described in the topology shown in FIG. 8. In this operation example, the description will be made assuming that a failure has occurred in a link between the node 11 and the node 12.

In the network shown in FIG. 1, assume that the tree of the configuration shown in FIG. 8 is configured according to the operation shown in the operation example 1 and that the tree is stable.

In this state, when a failure has occurred in the link between the node 11 and the node 12, keep alive frames which the failure detector 109 has been transmitting regularly at the short intervals does not arrive for a predetermined time and more, and therefore, the failure detector 109 transmits the failure detection signal to the tree manager 108.

Figure 9:
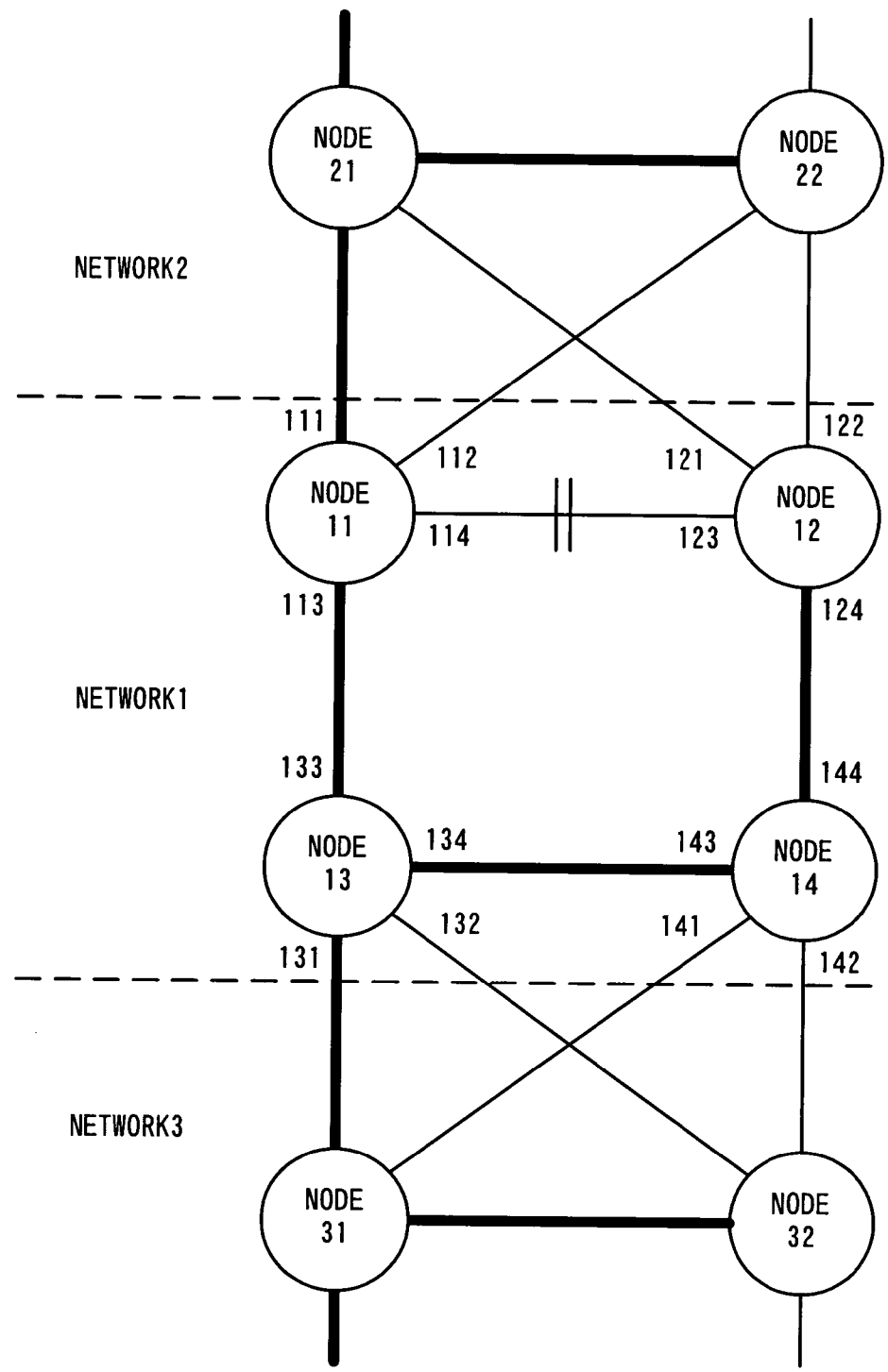
FIG. 9 is a block diagram showing an example of the spanning tree configuration at a single failure, according to the first embodiment of the invention.

The tree manager 108 reconfigures the tree within the network 1. This reconfiguration is performed at a high speed according to the high speed spanning tree algorithm operated by the tree manager 108. One example of the tree after the reconfiguration is shown in FIG. 9 (the shape of the tree varies depending on the cost of the node and link and the like).

According to the above reconfiguration, the BPDU frame of the tree of the network 2 to be transmitted to the tree manager 104 of the node 12 from the tree manager 104 of the node 11 and the BPDU frame of the tree of the network 2 to be transmitted to the tree manager 104 of the node 11 from the tree manager 104 of the node 12, which have been transferred by using the link directly connecting the node 11 and the node 12 before the reconfiguration, will be transferred by using the path connecting the node 11, the node 13, the node 14, and the node 12 sequentially.

The actual transfer path, however, is changed according to the reconfiguration. Viewed from the tree of the network 2, since there is no change found in the cost and the path, it never affects the spanning tree configuration of the network 2. This is because the BPDU frame of the tree of the network 2 is not processed by the respective tree managers 108 of the node 11 and the node 12 and in the nodes 13 and 14, but the port to transfer the frame to the network 1 side is always the virtual port 116 constantly, from the viewpoint of the tree of the network 2.

Although the frame is not transferred before completing the reconfiguration of the tree of the network 1, this period is very short and therefore, even if the BPDU frame of the tree of the network 2 should be transferred to the network 1 side and discarded before completion of the reconfiguration, it is not detected as a failure. This is, taking one example, because the tree manager on the side of the network 2 detects the missing of the continuous three frames as a failure, as for the BPDU frame to be transmitted generally in every two seconds, and the reconfiguration of the network 1 will be completed in about one second.

Similarly, since the respective tree managers 104 of the node 13 and the node 14, for managing the tree of the network 3, detect no change of the path caused by the reconfiguration of the network 1, it never affects the configuration of the network 3.

As mentioned above, even when a failure has occurred within the network 1, it never affects the network 2 and the network 3. Further, a loop never occurs in any place within the network, any time during the reconfiguration and before/after the reconfiguration of the network 1.

OPERATION EXAMPLE 3 OF THE FIRST EMBODIMENT

Single Failure Recovery In The Network 1

The third operation example in the first embodiment will be concretely described in detail with reference to FIG. 1, FIG. 2, FIG. 8, and FIG. 9.

In the operation example, the description will be made about the operation in the case of recovering a failure occurring in one of the four links forming the network 1, in the topology shown in FIG. 9. This operation example will be described assuming that a failure having occurred in the link between the node 11 and the node 12 is recovered.

In the network shown in FIG. 1, assume that the tree of the configuration as shown in FIG. 9 is formed according to the operation indicated by the operation example 2 and that the tree is stabilized.

In this state, when a link failure between the node 11 and the node 12 is recovered, keep alive frames will arrive at the failure detector 109 again within the specified time intervals. The failure detector 109 stops the failure detected signal supplied to the tree manager 108.

According to this, the tree manager 108 reconfigures the tree within the network 1. This reconfiguration is performed at a high speed according to the high speed spanning tree algorithm operated by the tree manager 108. The state of the tree after reconfiguration is shown in FIG. 8.

Owing to the reconfiguration, the BPDU frame of the tree of the network 2 to be transmitted from the tree manager 104 of the node 11 to the tree manager 104 of the node 12 and the BPDU frame of the tree of the network 2 to be transmitted from the tree manager 104 of the node 12 to the tree manager 104 of the node 11, which have been transferred by the path sequentially connecting the node 11, the node 13, the node 14, and the node 12 in this order before the reconfiguration, can be transferred by using a link connecting the node 11 and the node 12 directly.

Although the transfer path can be changed according to the reconfiguration, however, no change is found in the path and the cost and the like, from the viewpoint of the tree of the network 2 and therefore, it never affects the configuration of the network 2. This is because the BPDU frame of the tree of the network 2 is not processed by the respective tree managers 108 of the nodes 11 and 12 and by the node 13 and the node 14, and the port to transfer the frame to the network 1 side is always the virtual port 116 constantly, from the viewpoint of the tree of the network 2.

Though the frame is never transferred before completion of the reconfiguration of the tree of the network 1, this period is very short, and therefore, even if the BPDU frame of the tree of the network 2 should be transferred to the network 1 and discarded before completion of the reconfiguration, it will not be detected as a failure. This is, taking one example, because the tree manager of the network 2 side detects the missing of the continuous three frames as a failure, as for the BPDU frame to be transmitted generally in every two seconds, while the reconfiguration on the network 1 will be completed in about one second.

Similarly, since the respective tree managers 104 of the node 13 and the node 14, for managing the tree of the network 3, detect no change of the path caused by the reconfiguration of the network 1, it never affects the configuration of the network 3.

As mentioned above, even when a failure has occurred within the network 1, it never affects the network 2 and the network 3. Further, a loop never occurs in any place within the network, any time during the reconfiguration and before/after the reconfiguration of the network 1.

OPERATION EXAMPLE 4 OF THE FIRST EMBODIMENT

Configuration of the Spanning Tree by the Second Topology

Figure 10:
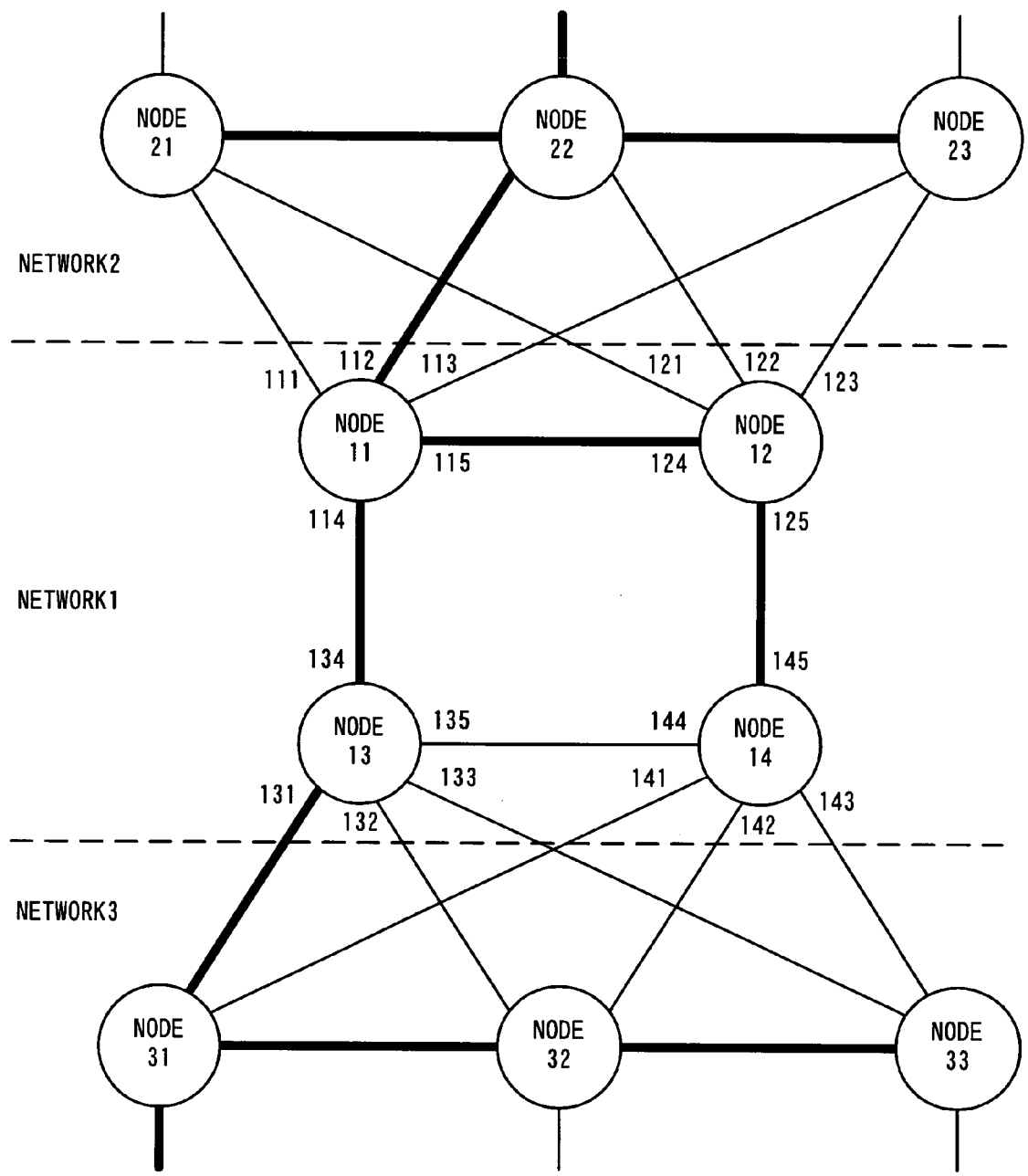
FIG. 10 is a block diagram showing the configuration of a network and spanning tree of a fourth operation example, according to the first embodiment of the invention.

The fourth operation example in the first embodiment will be concretely described in detail with reference to FIG. 10. The structure of the node of the invention in the fourth operation example is substantially the same as that in FIG. 2, but the number of the ports is different from that in FIG. 2.

The operation enabling the configuration of the spanning tree and the data transfer will be described in the topology shown in FIG. 10. In FIG. 10, the network 1 includes the nodes 11, 12, 13, and 14 of the invention, similarly to FIG. 1. The network 2 includes the nodes 21, 22, and 23, and the network 3 includes the nodes 31, 32, and 33. The nodes 21 to 23 and 31 to 33 do not have to be the node of the invention but may be the conventional spanning tree nodes.

In the node belong to the network 1, the tree manager 108 is used to configure the spanning tree of the network 1. At this point, the tree manager 104 is not operated yet. Thus, the BPDU frame is transmitted and received in the port 114 and the port 115, while the BPDU frame is not transmitted and received in the port 111 to the port 113. Hereafter, the spanning tree configured thus is referred to as the tree of the network 1. The operations up to here are the same as the operation example 1.

After the tree of the network 1 has got stable, the tree of the network 2 is configured. Getting stable means the state in which the BPDU frame is not supplied at the intervals shorter than the time intervals specified by the Hello Timer and the state in which the tree structure of the spanning tree no longer changes for a predetermined time and more.

The node 11 transmits the BPDU frame to be transmitted to the network 1, namely to the virtual port 116, of the BPDU frames to be transmitted by the tree manager 104 for configuring the tree of the network 2, with the destination MAC address previously set according to the setting instruction of (2) of the configuration unit 100U (in this case, the MAC address of the node 12), not the bridge group address, attached there.

Similarly, the node 12 transmits the BPDU frame to be transmitted to the network 1, namely to the virtual port 116, of the BPDU frames to be transmitted by the tree manager 104, with the destination MAC address previously set according to the setting instruction of (2) of the configuration unit 100U (the MAC address of the node 11 in this case), not the bridge group address, attached there.

The BPDU frame transmitted to the network 1, from the node 11, with the MAC address of the node 12, not the bridge group address, specified as the destination MAC address, is handled in the same way as the data frame in the network 1 and arrives at the node 12. The transfer path at this time may be via a link connecting the node 11 and the node 12 directly or via the node 13 and the node 14. This is because nothing is performed with the frame in the node 13 and the node 14 because the MAC address of the node 12 is stored in the destination of the BPDU frame.

Owing to the above operation, the space between the nodes 11 and 12 seems to be one adjacent link, from the viewpoint of the spanning tree on the network 2, namely, the respective tree managers 104 of the node 11 and the node 12. This is the same as the operation example 1.

It is necessary to set the link between the node 11 and the node 12 to be always a branch of the tree, in order to prevent from loop generation. Although as one method, there is the method of using the general spanning tree protocol by minimalizing the cost of the virtual port 116, the other method may be used.

The above operation will be performed similarly on the network 3. When the node 13 transmits the BPDU frame from the tree manager 104 of configuring the tree of the network 3 to the virtual port 116, the node 13 transmits the BPDU frame with the MAC address of the node 14 attached to the destination MAC address, to the network 1.

Similarly, when the node 14 transmits the BPDU frame from the tree manager 104 to the virtual port 116, in order to configure the tree of the network 3, it transmits the BPDU frame with the MAC address of the node 13 attached to the destination MAC address.

According to the above operations, when the spanning tree configuration for each network 1 to 3 is completed, the tree logical topology (spanning tree) converges into a shape capable of preventing a loop. The tree topology is represented by the heavy line in FIG. 10. It is possible to transfer the frame by flowing the data frame on thus configured tree, similarly to the general network.

Even when one of the above three spanning trees is in an unstable state, packets never loop.

The node 21, the node 22, the node 23, the node 31, the node 32, and the node 33 have only to be spanning tree compatible nodes, with no necessity of any other particular operation.

OPERATION EXAMPLE 5 OF THE FIRST EMBODIMENT

Configuration of the Spanning Tree in the Third Topology

The fifth operation example in the first embodiment will be concretely described in detail with reference to FIG. 11 and FIG. 12.

Figure 11:
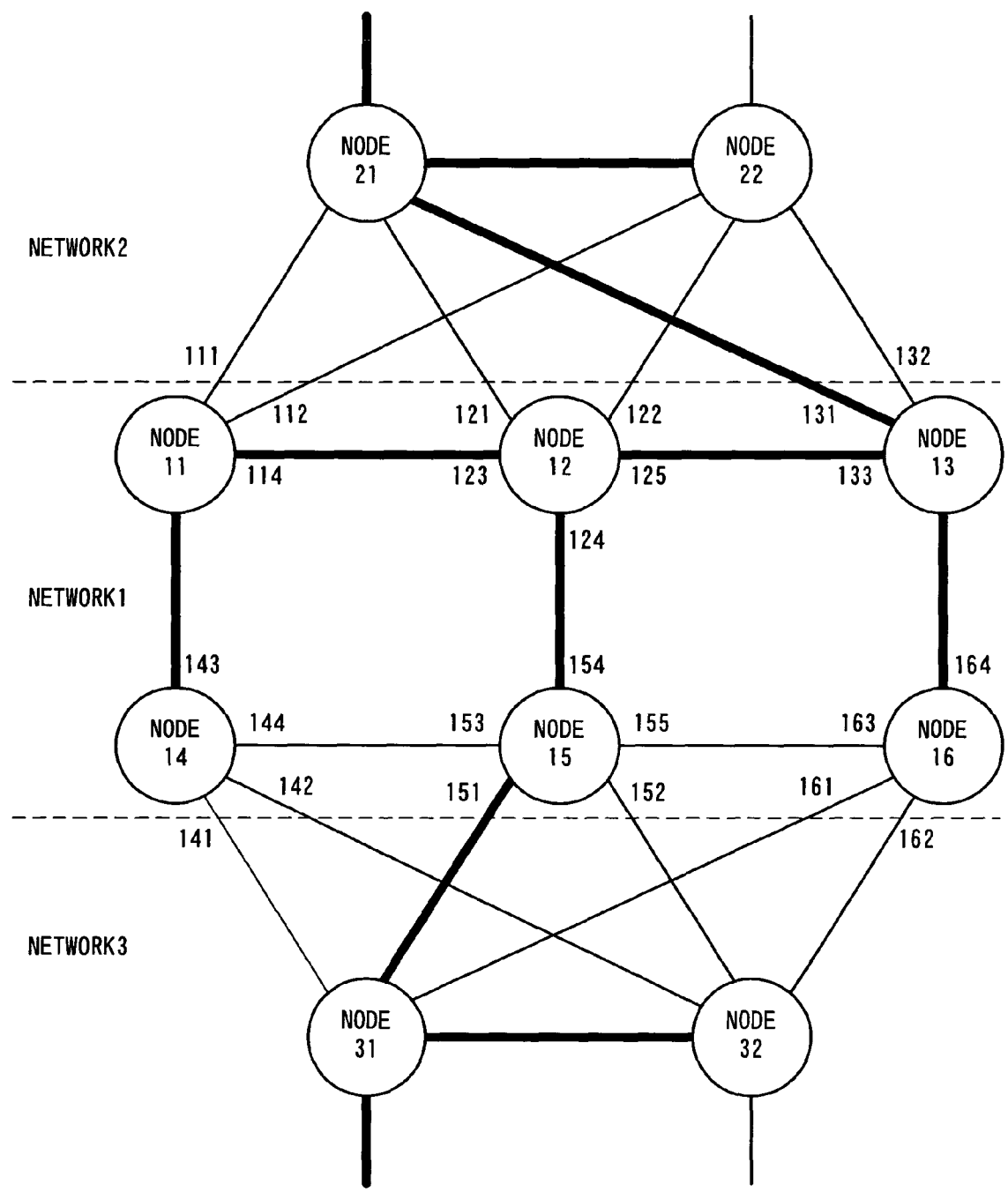
FIG. 11 is a block diagram showing the configuration of a network and spanning tree of a fifth operation example, according to the first embodiment of the invention.

With reference to FIG. 11, the node 15 and the node 16 are added to the network 1 in FIG. 1, in this operation example. As a result, the respective tree managers 104 in the nodes 11 to 13 manage the tree of the network 2 and the respective tree managers 104 in the nodes 14 to 16 manage the tree of the network 3.

Figure 12:
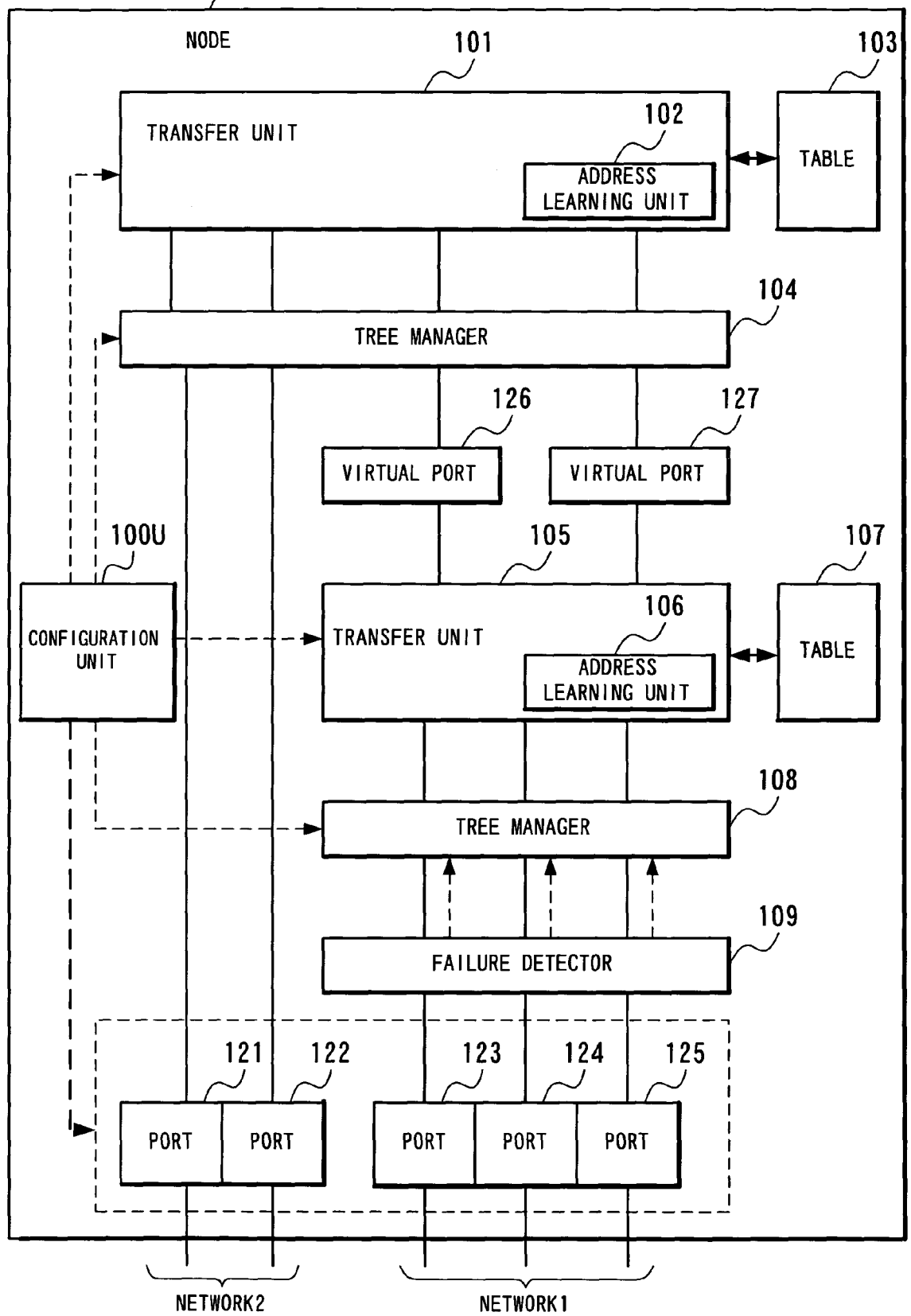
FIG. 12 is a block diagram showing the structure of the node 12 of the fifth operation example, according to the first embodiment of the invention.

FIG. 12 is a block diagram showing the structure of the node 12 in FIG. 11.

The node 12 shown in FIG. 12 is different from the node 11 shown in FIG. 2 in that a port 125 is added and that there are two virtual ports 126 and 127 in total.

In the node 12 belonging to the network 1 and having the tree manager for the tree of the network 2, the virtual port means the other adjacent node and there are the virtual ports for the number of "the nodes belonging to the network 1 and having the tree manager for the tree of the network 2". In this embodiment, since the node 11 and the node 13 correspond to "the other adjacent node and the node belong to the network 1 and having the tree manager for the tree of the network 2", from the viewpoint of the node 12, there exist two virtual ports in total; the virtual port 126 and the virtual port 127.

The virtual port 126 is a virtual port for connecting the transfer unit 105 with the tree manager 104 and a port for passing the BPDU frame (the BPDU frame with the MAC address of the node 12 attached to the destination) which has arrived at the node 12 through the port 123 or the port 124, from the tree manager 104 within the node 11. When a frame arrives here through the other port from the node 11, initial setting is performed so as to discard the frame by the tree manager and the transfer unit.

The virtual port 127 is a virtual port for connecting the transfer unit 105 with the tree manager 104 and a port for passing the BPDU frame (the BPDU frame with the MAC address of the node 12 attached to the destination) which has arrived at the node 12 through the port 124 or the port 125, from the tree manager 104 within the node 13.

This time, the operation enabling the configuration of the spanning tree and the data transfer in the topology shown in FIG. 11 will be described.

In the node belonging to the network 1, the tree manager 108 is used to configure the spanning tree of the network 1. At this point, the tree manager 104 is not operated yet. Thus, the BPDU frame is not transmitted to the network 2. Hereafter, the spanning tree thus configured is referred to as the tree of the network 1.

After the tree of the network 1 has got stable, the tree of the network 2 is configured. Getting stable means the state in which the BPDU frame is not supplied at the intervals shorter than the time intervals specified by the Hello Timer and the state in which the tree structure of the spanning tree no longer changes for the predetermined time and more.

The node 11 transmits the BPDU frame to be transmitted to the network 1, specifically to the network 1 through the port 113 or the port 114 via the virtual port, of the BPDU frames to be transmitted by the tree manager 104 configuring the tree of the network 2, with the destination MAC address previously set according to the setting instruction of (2) of the configuration unit 100U (in this case, the MAC address of the node 12), not the bridge group address, attached there.

The node 12 transmits the BPDU frame to be transmitted to the network 1, specifically to the network 1 by using one of the port 123 or the port 124 through the virtual port 126, of the BPDU frames to be transmitted by the tree manager 104, with the destination MAC address previously set according to the setting instruction of (2) of the configuration unit 100U (the MAC address of the node 11 in this case), not the bridge group address, attached there.

The node 12 transmits the BPDU frame to be transmitted to the network 1, specifically to the network 1 by using one of the port 124 or the port 125 through the virtual port 127, of the BPDU frames to be transmitted by the tree manager 104, with the destination MAC address previously set according to the setting instruction of (2) of the configuration unit 100U (the MAC address of the node 13 in this case), not the bridge group address, attached there.

The BPDU frame transmitted to the network 1, from the node 11, with the MAC address of the node 12, not the bridge group address, specified as the destination MAC address, is handled in the same way as the data frame within the network 1 and arrives at the node 12. The node 12 receives the BPDU frame at the port 123 or 124. Since the destination address of the received frame is not the bridge group address, the same frame passes through the BPDU transmitter/receiver 1043 within the tree manager 108 and arrives at the transfer unit 105. The transfer unit 105 recognizes that the above frame is a frame destined for the self-node from the node 11 and transfers it to the virtual port 126. The above frame passes through the virtual port 126 and arrives at the BPDU transmitter/receiver 1044 of the tree manager 104. The BPDU transmitter/receiver 1044 receives the above frame, confirms the contents of the frame and finds that it is the BPDU frame, and then performs the spanning tree processing for the network 2 in cooperation with the tree controller 1041.

Here, the BPDU frame transmitted from the node 11 to the node 12 may pass through the node 14 and the node 15. Since the MAC address of the node 12 is stored in the destination of the BPDU frame, nothing is performed with the frame in the node 14 and the node 15.

Similarly, the BPDU frame transmitted to the network 1, from the node 12, with the MAC address of the node 11, not the bridge group address, specified as the destination address, is handled and transferred in the same way as the data frame within the network 1 and arrives at the node 11. Accordingly, the BPDU frame is not processed even if passing through the node 15 and the node 14.

Similarly, the BPDU frame transmitted to the network 1, from the node 12, with the MAC address of the node 13, not the bridge group address, specified as the destination address, is handled and transferred in the same way as the data frame within the network 1 and arrives at the node 13. Accordingly, the BPDU frame is not processed even if passing through the node 15 and the node 16.

According to the above operations, at a time of the spanning tree configuration on the network 2, viewed from the respective tree managers 104 of the node 11 to the node 13, it seems that there are always one adjacent link between the nodes 11 and 12 and one adjacent link between the nodes 12 and 13.

The reason is as follows. The ports 123 to 125 cannot be recognized, but only the virtual ports 126 and 127 can be recognized from the viewpoint of the tree manager 104 of the node 12. Since the destination of the BPDU frame to be transmitted from the tree manager 104 to the virtual port 126 is replaced with the MAC address of the adjacent node (node 11), the nodes 14 to 16 cannot be recognized from the viewpoint of the tree manager 104.

In order to prevent from loop generation, it is necessary to set a link between the node 11 and the node 12 and a link between the node 12 and the node 13 to be always a branch of the tree. In the case of using the usual spanning tree protocol, the link between the node 11 and the node 12 and the link between the node 12 and the node 13 can be set to be a branch of the tree by minimalizing the cost between the node 11 and the node 12 and the cost between the node 12 and the node 13 viewed from the network 2.

As a method of making the tree manager 104 recognize that the above links are the special links connected to the virtual ports, an identifier such as a tag and a flag inserted into a frame can be used, besides using the above-mentioned cost, and any other method can be used as far as it can set the link between the node 11 and the node 12 and the link between the node 12 and the node 13 to be a branch of the spanning tree.

The above operation will be performed similarly as for the network 3. When the tree manager 104 of the node 14 configuring the tree of the network 3 transmits the BPDU frame to the network 1 through the port 143 or the port 144, the node 14 transmits the BPDU frame with the MAC address of the node 15 attached to the destination address to the network 1.

Similarly to the node 12, the node 15 transmits the BPDU frame to be transmitted to the network 1 by using one of the port 153 or the port 154 through the virtual port, of the BPDU frames to be transmitted by the tree manager 104, with the destination MAC address previously set (the MAC address of the node 14 in this case), not the bridge group address, attached there.

Similarly to the node 12, the node 15 transmits the BPDU frame to be transmitted to the network 1 by using one of the port 154 or the port 155 through the virtual port, of the BPDU frames to be transmitted by the tree manager 104, with the destination MAC address previously set (the MAC address of the node 16 in this case), not the bridge group address, attached there.

When finishing the spanning tree configuration for the respective networks 1 to 3 according to the above operations, the tree topology converges into a shape capable of preventing from a loop. The tree topology is represented by the heavy line in FIG. 11. It is possible to transfer the frame by flowing the data frame on thus configured tree, similarly to the general network.

Even when one of the above three spanning trees is in an unstable state, packets never loop.

The node 21, the node 22, the node 31, and the node 32 have only to be spanning tree compatible nodes, with no necessity of any other particular operation.

Effects of the First Embodiment

The effects of this embodiment will be described, next.

Hitherto, according as the shape of the topology becomes more complicated and the number of the nodes accommodated into a network is more increased, it takes the longer time to configure the spanning tree.

In the embodiment, however, by dividing the spanning tree into every domain (in every network), it is possible to shorten the configuration time of the spanning tree.

When changing the configuration of the spanning tree owing to a failure, the conventional technique changes the configuration gradually while stopping one of the network locally, and in order to reconfigure the whole network, it stops the network temporarily even in a place distant from the failure occurring position. This embodiment, however, can restrict the failure affecting area to a minimum by dividing the spanning tree into every domain.

Second Embodiment

Hereinafter, a second embodiment of the invention will be described in detail with reference to the drawings.

The second embodiment of the invention is different from the first embodiment in FIG. 2 in that the function of the tree manager 104 is further expanded as a tree manager 104A, the function of the failure detector 109 is further expanded as a failure detector 109A, and that a frame blocking unit 110 is added.

In the second embodiment, when the failure detector 109A detects a double failure, the frame blocking unit 110 cuts off the port in a node other than the root node, thereby preventing loop generation even in the multi-failure occurrence as well as in the single failure.

Figure 13:
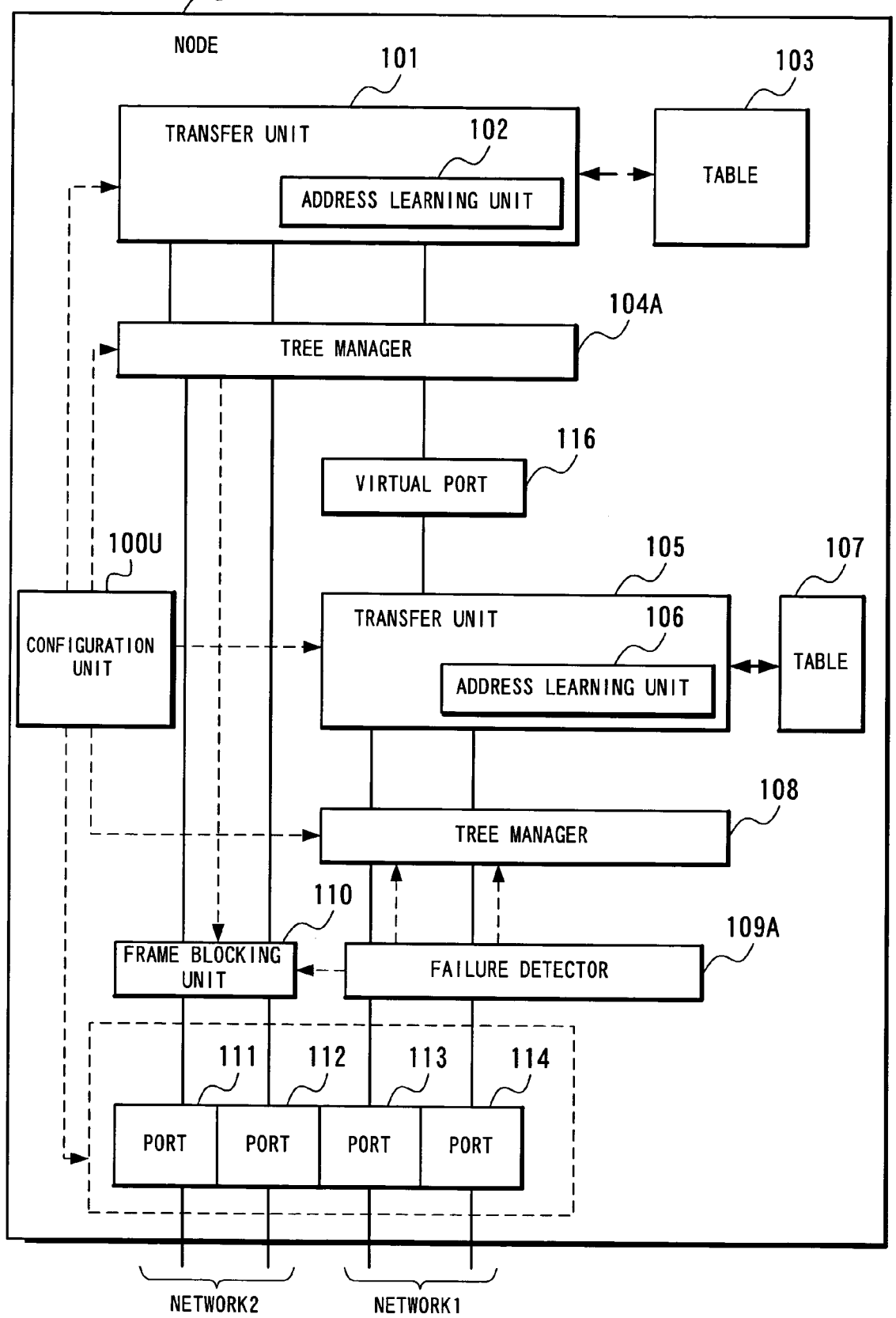
FIG. 13 is a block diagram showing the structure of the node 11, according to a second embodiment of the invention.

FIG. 13 is a block diagram showing the structure of the node 11 in FIG. 1, according to the second embodiment.

The tree manager 104A performs the operation of transmitting a root node signal to the frame blocking unit 110 in a state in which this node becomes the root node, in addition to the operations of the tree manager 104 in the first embodiment.

The failure detector 109A performs the following operations of:

(1) regularly transmitting keep alive frames to the port 113 and the port 114 in the predetermined short time intervals, (2) receiving the keep alive frames from the port 113 and the port 114 and issuing a failure signal to the tree manager 108 when the arrival intervals of the keep alive frames are beyond the predetermined time intervals, (3) writing the failure information (flag) detected on the side of the port 114 into a failure bit area within the keep alive frames transmitted from the side of the port 113 and transmitting the above information to the opposite node 13, (4) detecting a failure detected by the node 13, according to the failure bit area (flag) within the keep alive frames received on the side of the port 113, and (5) supplying a port blocking signal to the frame blocking unit 110 when the failure on the side of the port 114 in (3) and the failure detected by the node 13 in (4) simultaneously occur.

The frame blocking unit 110 performs the following operations of:

(1) transferring the frame input from the port 111 directly to the tree manager 104A and the frame input from the port 112 directly to the tree manager 104A, and transferring the frame supplied from the tree manager 104A toward the port 111 directly to the port 111 and the frame supplied from the tree manager 104A toward the port 112 directly to the port 112, in the case where a port blocking signal does not arrive here from the failure detector 109A (regardless of whether this node is the root node or not), (2) discarding all the frames entered into the frame blocking unit 110 from the port 111, the port 112, and the tree manger 104A and blocking the input and the output of the ports, in the case where a port blocking signal has arrived here from the failure detector 109A and this node is not the root node, (3) transferring the frame input from the port 111 directly to the tree manager 104A and the frame input from the port 112 directly to the tree manager 104A, similarly to the case of (1), and further transferring the frame supplied from the tree manager 104A toward the port 111 directly to the port 111 and the frame supplied from the tree manager 104A toward the port 112 directly to the port 112, in the case where a port blocking signal has arrived here from the failure detector 109A and this node is the root node.

Since the tree manger controls whether this node is the root node or not, the failure detector 109A can obtain the above information from the tree manager 104A.

Figure 14:
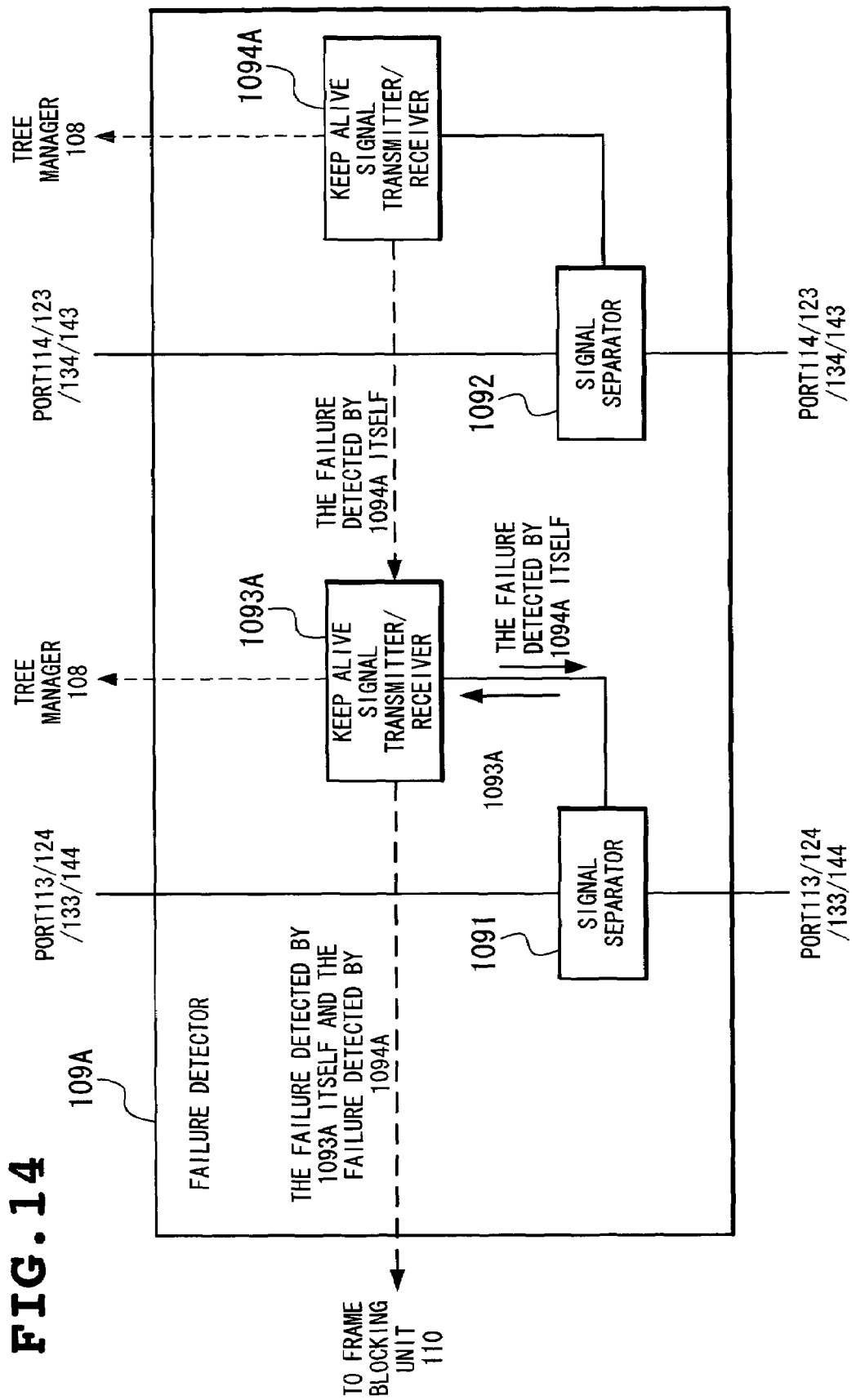
FIG. 14 is a block diagram showing the structure of a failure detector 109A, according to the second embodiment of the invention.

FIG. 14 is a block diagram showing the details of the structure of the failure detector 109A.

A keep alive signal transmitter/receiver 1093A performs the following operations of:

(1) transmitting a keep alive signal to a signal separator 1091 at predetermined time intervals, (2) detecting a failure from the arrival interval of the keep alive signal received by the signal separator 1091 and notifying it to the tree manager 108, (3) writing the failure information (flag) into a failure bit area within the keep alive signal described in (1) and transmitting the same signal to the opposite node 13 through the signal separator 1091 when the keep alive signal transmitter/receiver 1094A has detected a failure, (4) receiving the failure notice detected by the opposite node 13 according to the failure information (flag) of the failure bit area within the keep alive signal received through the signal separator 1091, and (5) supplying a port blocking signal to the frame blocking unit 110 when a failure on the side of the port 114 in (3) and a failure detected by the node 13 in (4) simultaneously occur.

The keep alive signal transmitter/receiver 1094A performs the following operations of:

(1) transmitting a keep alive signal to a signal separator 1092 at predetermined time intervals, (2) detecting a failure from the arrival intervals of the keep alive signal received by the signal separator 1092 and notifying it to the tree manager 108, and (3) notifying the keep alive signal transmitter/receiver 1093A of the failure detection when detecting a failure in (2).

OPERATION EXAMPLE 1 OF THE SECOND EMBODIMENT

Operation at a Time of Single Failure→Double Failure Occurrence

The operation example 1 of the second embodiment will be concretely described in detail with reference to FIG. 1, FIG. 9, FIG. 13, and FIG. 15.

In the operation example 2 in the first embodiment, the operation in the case where a single failure has occurred, has been described. In the second embodiment, the operation in the case of the double failure where a single failure has occurred and then another failure has occurred, will be described.

In the network shown in FIG. 1, assume that a failure occurs in a link between the node 11 and the node 12, the tree of the configuration shown in FIG. 9 is formed according to the operation having been described in the operation example 2 of the first embodiment, and the state of the tree is stable, the root node of the tree of the network 1 is the node 13, the root node of the tree of the network 2 is the node 11, and that the root node of the tree of the network 3 is the node 13.

One of the node 11 to the node 14 is set as the root node of the spanning tree in each of the network 1 to the network 3. In the network 1, when the node 11 or the node 13 is set as the root node, the node 11 is set to serve as the root node of the network 2 and the node 13 is set to serve as the root node of the network 3. In the network 1, when the node 12 or the node 14 is set as the root node, the node 12 is set to serve as the root node of the network 2 and the node 14 is set to serve as the root node of the network 3.

The failure detector 109A within the node 11 transmits the keep alive signal from the node 11 to the node 13 through the port 113, with the failure information (flag) indicating that a failure has been detected in the node 11 just after the occurrence of the failure attached to the above signal. Thus, the node 13 can recognize that a failure has occurred in the link between the node 11 and the node 12.

Further, the failure detector 109A within the node 12 transmits the keep alive signal from the node 12 to the node 14 through the port 124, with the failure information (flag) indicating that a failure has been detected in the node 12 just after the occurrence of the failure attached to the above signal. Thus, the node 14 can recognize that a failure has occurred in the link between the node 12 and the node 11.

When another failure occurs in the link between the node 13 and the node 14 in this state, since the keep alive frames which has been regularly transmitted from the port 134 of the node 13 and the port 143 of the node 14 at the short intervals will not arrive for the predetermined hour and more, the respective failure detectors 109A of the node 13 and the node 14 can know that a failure has occurred in the link between the node 13 and the node 14.

At this time, the failure detector 109A of the node 13 notifies the node 11 that a failure has occurred in the link between the node 13 and the node 14, according to the failure information (flag) within the keep alive signal transmitted toward the node 11. Since it has recognized that a failure has already occurred between the node 11 and the node 12, according to the failure information (flag) within the keep alive signal transmitted from the node 11, it recognizes the situation of the double failure by detecting a link failure between the node 13 and the node 14. Then, it issues the double failure detection notice to the frame blocking unit 110.

Although the frame blocking unit 110 receives the double failure detection signal from the failure detector 109A, the frame blocking unit 110 of the node 13 never cuts off the port 131 and the port 132 because the tree manager 104A is receiving the root node signal.

Similarly to the node 13, the failure detector 109A of the node 14 transmits the node 12 that a failure has occurred in the link between the node 13 and the node 14, according to the failure information (flag) within the keep alive signal transmitted toward the node 12. Since it has recognized that a failure has already occurred between the node 11 and the node 12, according to the failure information (flag) within the keep alive signal transmitted from the node 12, it recognizes the situation of the double failure by detecting a link failure between the node 14 and the node 13. Then, it issues the double failure detection notice (port blocking signal) to the frame blocking unit 110.

Since the frame blocking unit 110 of the node 14 has received the port blocking signal from the failure detector 109A, and has not received the root node signal from the tree manager 104, it cuts off the port 141 and the port 142 so to disable the frame from passing through between the respective ports 141 and 142 and the tree manager 104A.

The failure detector 109A of the node 11 detects the failure occurrence between the node 13 and the node 14 according to the failure information (flag) within the keep alive signal transmitted from the node 13. Since the failure detector 109A of the node 11 has already detected the link failure between the node 11 and the node 12, it recognizes the situation of the double failure and issues the port blocking signal to the frame blocking unit 110.

Although the frame blocking unit 110 of the node 11 receives the port blocking signal from the failure detector 109A, it never cuts off the port 111 and the port 112 because the tree manager 104 is receiving the root node signal.

The failure detector 109A of the node 12 detects the failure occurrence between the node 13 and the node 14, according to the failure information (flag) within the keep alive signal transmitted from the node 14. Since the failure detector 109A of the node 12 has already detected the link failure between the node 11 and the node 12, it recognizes the situation of the double failure and issues the port blocking signal to the frame blocking unit 110.

Since the frame blocking unit 110 of the node 12 has received the port blocking signal from the failure detector 109A but has not received the root node signal from the tree manager 104A, it is found that this node is not the root node. This agrees with the blocking condition of the port, and therefore, the frame blocking unit 110 cuts off the port 121 and the port 122 so to disable the frame from passing through the respective ports 141 and 142 and the tree manager 104A.

According to the above operations, the node 12 and the node 14 are cut off from the respective networks 1, 2, and 3. Accordingly, since each connection point of the networks 1 and 2 and the networks 1 and 3 becomes only one, a loop can be prevented from occurring across the network 1 to the network 3.

Figure 15:
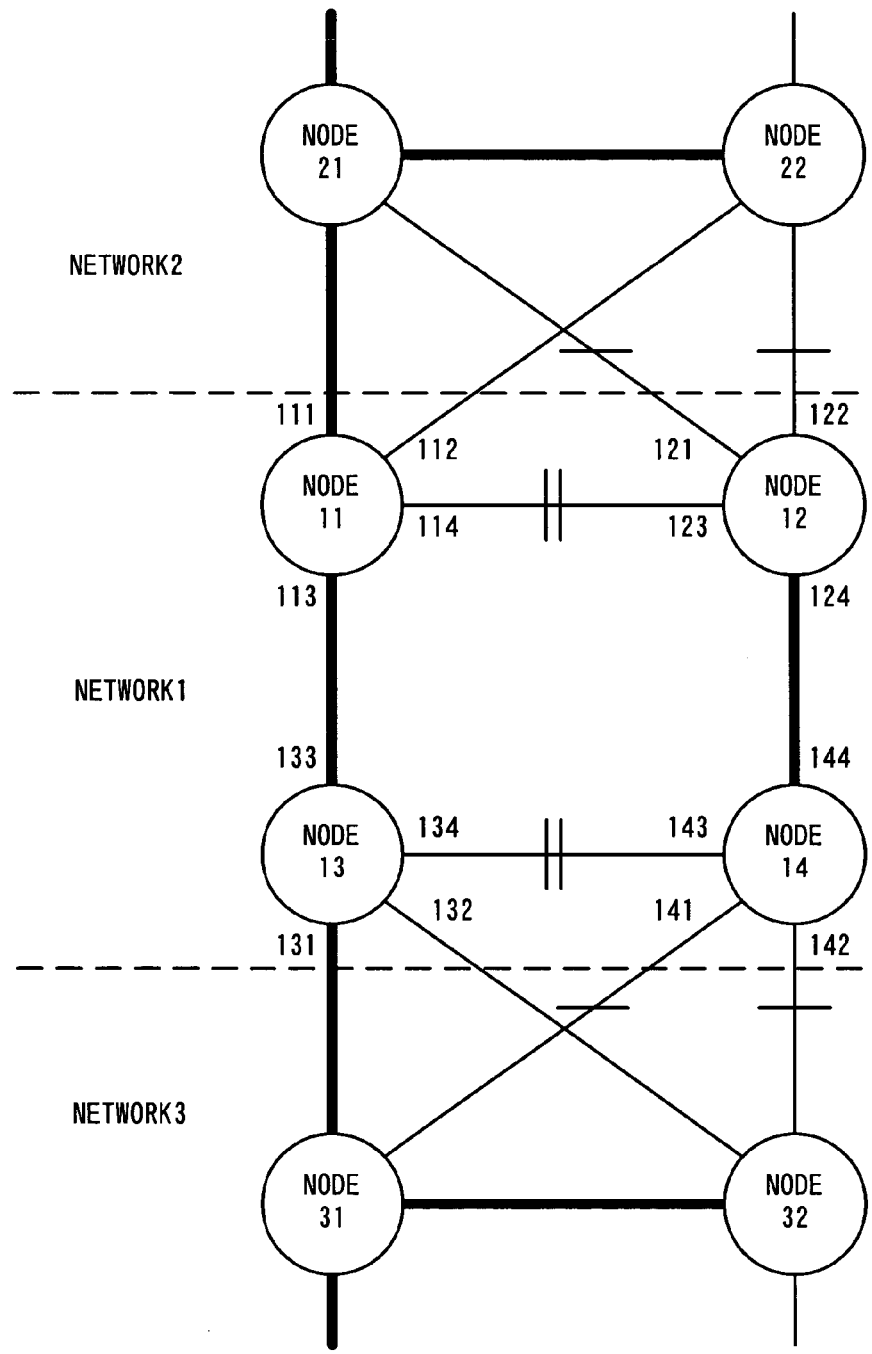
FIG. 15 is a block diagram showing an example of the spanning tree configuration at double failure, according to the second embodiment of the invention.

At this time, since the root node of each network is not changed, the data transfer continues without interruption, in the same way as before the occurrence of the failure. Viewed from the tree of the network 2, the node 12 seems as if it had a node failure and viewed from the tree of the network 3, also the node 14 seems as if it had a node failure. This situation is shown in FIG. 15.

In this state, the node 12 and the node 14 are cut off from the network 1 to the network 3 and the communication is disabled there. In the general use, however, a pair of the node 11 and the node 12, and a pair of the node 13 and the node 14 are positioned within the station of the relay station, and since they never accommodate the general subscribers directly, even if the node 12 and the node 14 are cut off from the networks like this example, there is no practical problem.

OPERATION EXAMPLE 2 OF THE SECOND EMBODIMENT

Operation at a Time of Recovering from the Single Failure→the Double Failure

The second operation example of the second embodiment will be concretely described in detail with reference to FIG. 1, FIG. 9, FIG. 13, and FIG. 15.

In the operation example 3 in the first embodiment, the operation in the case of recovering the single failure has been described. In this operation example, the operation in the case where after the occurrence of the double failure, one failure has been recovered, resulting in the state of the single failure, will be described.

In the network shown in FIG. 1, assume that two failures in total have occurred in the link between the node 11 and the node 12 and in the link between the node 13 and the node 14, the tree of the configuration shown in FIG. 15 is formed according to the operation having been described in the operation example 1 in the second embodiment, the state of the tree has got stable, the root node of the tree of the network 1 is the node 13, the root node of the tree of the network 2 is the node 11, and that the root node of the tree of the network 3 is the node 13.

One of the node 11 to the node 14 is set as the root node of the spanning tree in each of the networks 1 to 3. When the node 11 or the node 13 is set as the root node in the network 1, the node 11 is set to serve as the root node of the network 2 and the node 13 is set to serve as the root node of the network 3. When the node 12 or the node 14 is set as the root node in the network 1, the node 12 is set to serve as the root node of the network 2 and the node 14 is set to serve as the root node of the network 3.

The failure detector 109A within the node 11 transmits the keep alive signal from the node 11 to the node 13 through the port 113, with the failure information (flag) indicating that a failure has been detected in the node 11 just after the occurrence of the failure attached to the above signal. Thus, the node 13 can recognize that a failure has occurred in the link between the node 11 and the node 12.

Further, the failure detector 109A within the node 12 transmits the keep alive signal from the node 12 to the node 14 through the port 124, with the failure information (flag) indicating that a failure has been detected in the node 12 just after the occurrence of the failure attached to the above signal. Thus, the node 14 can recognize that a failure has occurred in the link between the node 12 and the node 11.

The failure detector 109A within the node 13 transmits the keep alive signal from the node 13 to the node 11 through the port 133, with the failure information (flag) indicating that a failure has been detected in the node 13 just after the occurrence of the failure attached to the above signal. Thus, the node 11 can recognize that a failure has occurred in the link between the node 13 and the node 14.

The failure detector 109A within the node 14 transmits the keep alive signal from the node 14 to the node 13 through the port 144, with the failure information (flag) indicating that a failure has been detected in the node 14 just after the occurrence of the failure attached to the above signal. Thus, the node 12 can recognize that a failure has occurred in the link between the node 14 and the node 13.

The node 12 and the node 14 detect the double failure and they are neither the root node of the network 2 nor the root node of the network 3. Therefore, the node 12 and the node 14 respectively cut off the ports 121 and 122 and the ports 141 and 142.

In this state, assume that the link failure between the node 13 and the node 14 is recovered.

Since each node keeps transmitting the keep alive frames at the regular intervals also during the failure occurrence, when the failure is recovered, the failure detector 109A of the node 13 turns to be able to receive the keep alive frames through the port 134 at the intervals shorter than the predetermined intervals and detects the failure recovery of the link between the node 13 and the node 14. The node 13 that is the root node notifies the node 11 that the link failure between the node 13 and the node 14 has been recovered, according to the failure information (flag) within the keep alive signal transmitted toward the node 11. Further, it releases the port blocking signal transmitted to the frame blocking unit 110 within this node and notifies the tree manager 108 of the failure recovery.

The failure detector 109A of the node 11 detects the failure recovery between the node 13 and the node 14, according to the failure information (flag) within the keep alive signal transmitted from the node 13. The failure detector 109A of the node 11 releases the port blocking signal transmitted to the frame blocking unit 110.

The failure detector 109A of the node 14 returns to be able to receive the keep alive frames through the port 143 at the intervals shorter than the predetermined intervals, therefore, detects the failure recovery of the link between the node 13 and the node 14, and notifies the tree manager 108 of the failure recovery. At this point, however, the node 14 that is not the root node keeps adding the information that it is still under the situation of the failure occurring, to the failure information (flag) within the keep alive signal transmitted toward the node 12, and keeps transmitting the port blocking signal to the frame blocking unit 110 within the self-node.

When enough time has elapsed since the failure detector 109A of the node 14 notified the tree manager 108 of the failure recovery, or when the failure detector 109A detects that the tree of the network 1 has got stable, according to the failure recovery notice from the tree manager 108, the failure detector 109A of the node 14 notifies the node 12 that the link failure between the node 13 and the node 14 has been recovered, according to the failure information (flag) within the keep alive signal transmitted toward the node 12, and releases the port blocking signal transmitted to the frame blocking unit 110 within this node.

The frame blocking unit 110 of the node 14 releases the blocking of the port 141 and the port 142 when the port blocking signal transmitted by the failure detector 109A is released, so to enable the passage of the frame between the respective ports 141 and 142 and the tree manager 104A.

The failure detector 109A of the node 12 detects the failure recovery between the node 13 and the node 14, according to the failure information (flag) within the keep alive signal transmitted from the node 14. The failure detector 109A of the node 12 releases the double failure detection notice (port blocking signal) transmitted to the frame blocking unit 110.

The frame blocking unit 110 of the node 12 releases the blocking of the port 121 and the port 122 when the port blocking signal transmitted by the failure detector 109A is released, so to enable the passage of the frame between the respective ports 121 and 122 and the tree manager 104A.

According to the above operations, the node 12 and the node 14 are added to the network 1 at first, the network 1 will have been stable, and then, the ports of the network 2 and the network 3 will be opened.

Thus, at the recovery time of the double failure, it is possible to connect the network 1 with the network 2 and the network 1 with the network 3 by the above redundant structure, while preventing from the loop generation. At this time, since each root node of the tree of each network does not change, the data transfer is continued without interruption, in the same way as before the occurrence of the failure. The tree configured as a result of the above operations is shown in FIG. 9.

Effects of the Second Embodiment

The effects of the second embodiment will be described, next.

Hitherto, according as the shape of the topology becomes more complicated and according as the number of the nodes accommodated in a network is more increased, it takes the longer time to configure the spanning tree.

In the embodiment, however, by dividing the spanning tree into every domain, it is possible to shorten the configuration time of the spanning tree.

When changing the configuration of the spanning tree owing to a failure, the conventional technique changes the configuration gradually while stopping one of the network locally, and in order to reconfigure the whole network, it stops the network temporarily even in a place distant from the failure occurring position. This embodiment, however, can restrict the failure affecting area to a minimum by dividing the spanning tree into every domain.

Further, according to the second embodiment, by blocking the port even in the node other than the root node, upon detection of the double failure, it is possible to completely prevent from the loop generation not only at the single failure but also at the multi-failure occurrence.

Third Embodiment

Hereinafter, a third embodiment of the invention will be described in detail with reference to the drawings. In the above first and second embodiments, the spanning tree is used for the logical link configuration of the network 1 of the connection portion, while in the third embodiment, the resilient packet ring (RPR) under consideration to the definition by the IEEE802.17 is used characteristically.

Figure 16:
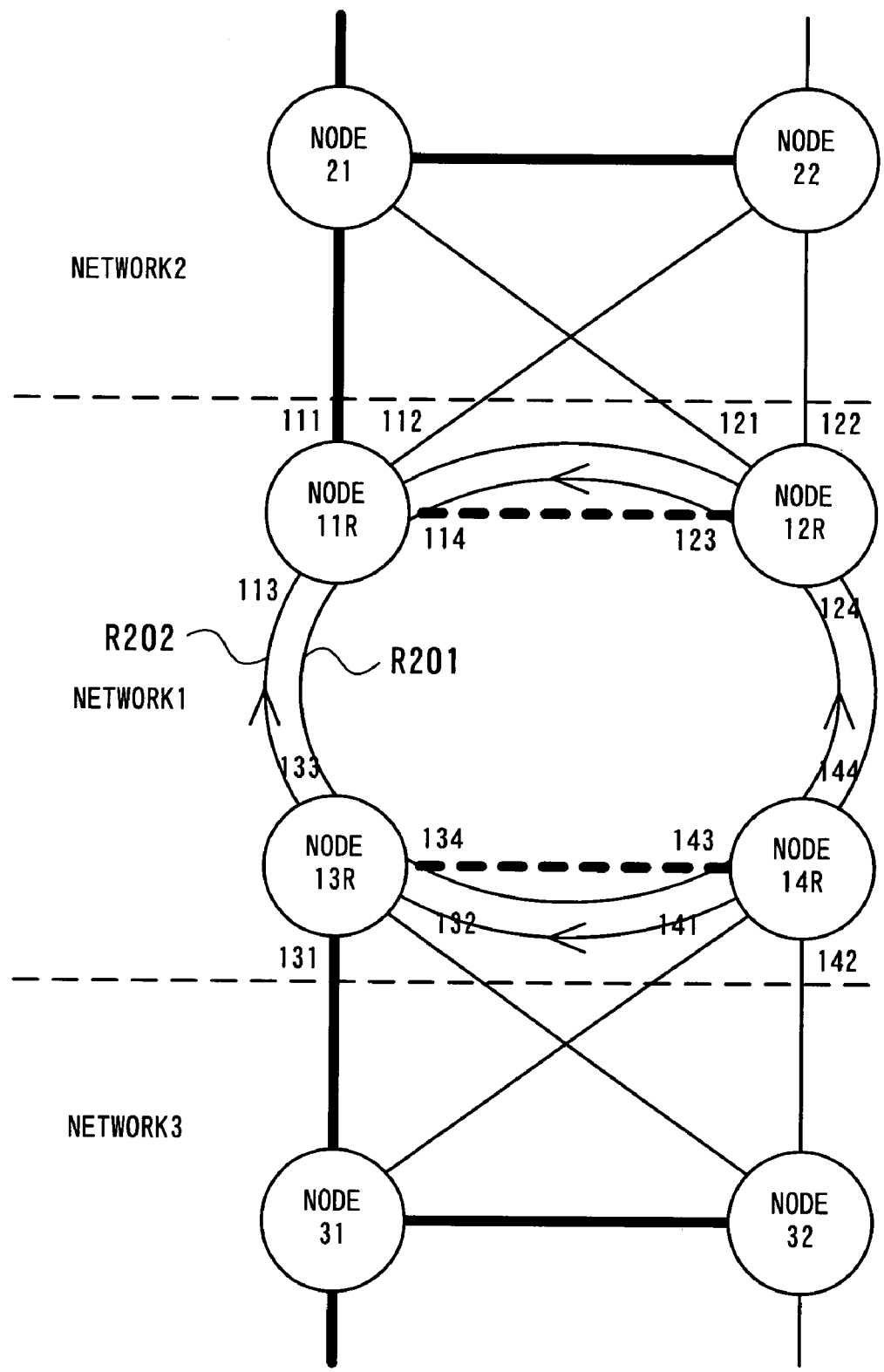
FIG. 16 is a block diagram showing an example of the network and spanning tree configuration, according to a third embodiment of the invention.

With reference to FIG. 16, the third embodiment of the invention is different from the above embodiments in that the network 1 of the first embodiment in the FIG. 1 is formed by the RPR and that the nodes 11 to 14 are respectively replaced with the RPR compatible nodes 11R to 14R.

Figure 17:
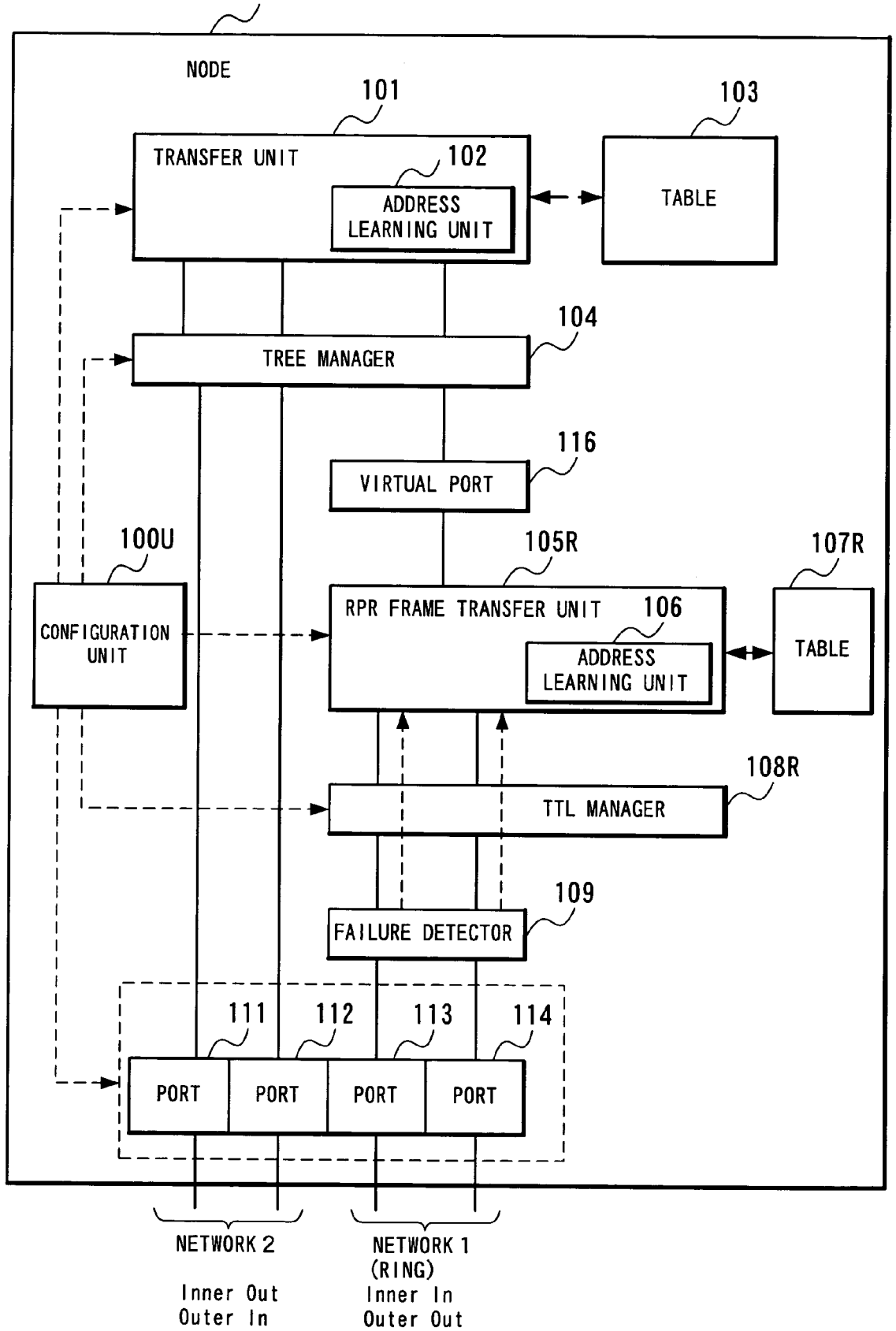
FIG. 17 is a block diagram showing the structure of a node 11R, according to the third embodiment of the invention.

FIG. 17 is a block diagram showing the structure of the node 11R in FIG. 16.

In FIG. 17, the configuration unit 100U of the node 11R receives the setting instructions as shown in the below (1) to (6), as the initial setting, by using a keyboard, a mouse, TELNET, WEB and the like. Based on the setting result of (1), the ports 111 to 114 are connected to the tree manager 104 for managing the spanning tree of the existing network or the failure detector 109; based on the setting results of (2) to (5), the transfer unit 101 and a RPR frame transfer unit 105R are set; and based on the setting results of (5) and (6), the tree manager 104 and a TTL (Time To Live) manager 108R are also set.

(1) whether each port belongs to the network 1 or the network 2, (2) the node ID of a destination node (a neighbor node connected to both the network 1 and the network 2) in the case of transmitting the BPDU frames for configuration of the spanning tree for the network 2, to the network 1, (3) the network to which the node (node 11R) mainly belongs (the network 1 in FIG. 16), (4) whether the ports on the side of the network 2 are cut off or not at the double failure, (5) the ports to which the node set in (2) is connected, and (6) the cost of the port and link and the priority of the nodes, defined in the IEEE802.1D or the IEEE802.1W Since the same component with the same reference number attached as the first embodiment has the identical structure and operation to the first embodiment, only a difference point will be described below.

The RPR frame transfer unit 105R performs the following operations of:

(1) adding the RPR header including the destination RPR node address and the ring ID for identifying an inner ring R201 or an outer ring R202, which are described in the table 107R, to the frame input from the virtual port 116, setting the initial value of the TTL, and transferring the above to the port 113 or the port 114 described in the table 107R, (2) transferring a frame to the port 113 only or the port 114 only when the frame is supplied from the virtual port 116, in the case where at least one of the destination MAC address, the destination RPR node, and the output destination port is missing in the table, (3) transferring a frame only to the virtual port 116 when the frame is supplied from the port on the side of the network 1, namely from the port 113 or the port 114, in the case where at least one of the destination MAC address, the destination RPR node, and the output destination port is missing in the table, (4) checking the destination RPR address of a frame input from the port 113 or the port 114: when the destination RPR address is this node (node 11), deleting the RPR header and transferring the frame to the virtual port 116, (5) checking the destination RPR address of a frame input from the port 113 or the port 114: when the destination RPR address is the other node than the node 11, supplying the frame through the same ring as the ring through which the frame has arrived, and more specifically, transferring to the port 114, the frame whose destination RPR address is other than this node and which has been input from the port 113, and transferring to the port 113, the frame having been input from the port 114, (6) checking the destination RPR address of the frame input from the port 113 or the port 114: when the destination RPR address is unclear, supplying the frame through the same ring as the ring where the frame has arrived, simultaneously copying the same frame, deleting the RPR header, and transferring it to the virtual port 116, (7) discarding the frame when receiving a frame whose source RPR node is this node from the port 113 or the port 114, and (8) preventing from a failure according to the wrapping method and the like, upon receipt of the failure detection information from the failure detector 109.

The table 107R includes each output port corresponding to each destination MAC address, and each destination node ID and ring ID described in the inserted RPR header. In the initial state, when the destination MAC is the bridge group address (01-80-C2-00-00-00) that is the special address for BPDU, the unit 105R specifies to transfer the frame to the adjacent node connected to the same network as this node (namely the network 1 and the network 2), that is, the node 12R.

In the same way as the above, in the node 12R, the destination RPR node of the bridge group address is set at the node 11R; in the node 13R, the destination RPR node of the bridge group address is set at the node 14R; and in the node 14R, the destination RPR node of the bridge group address is set at the node 13R, respectively.

The TTL manager 108R transfers the frame supplied from the failure detector 109 to the RPR frame transfer unit 105R and the frame supplied from the RPR frame transfer unit 105R to the failure detector 109 according to the TTL value, or discards the frame and further rewrites the TTL field at the passage of the frame.

The port 113 is a port for connecting the network 1, belonging to the node 11R. In this embodiment, the output of the inner ring R201 and the input of the outer ring R202 are connected to the port 113.

The port 114 is a port for connecting the network 1, belonging to the node 11R. In this embodiment, the input of the inner ring R201 and the output of the outer ring R202 are connected to the port 114.

Figures 18, 19:
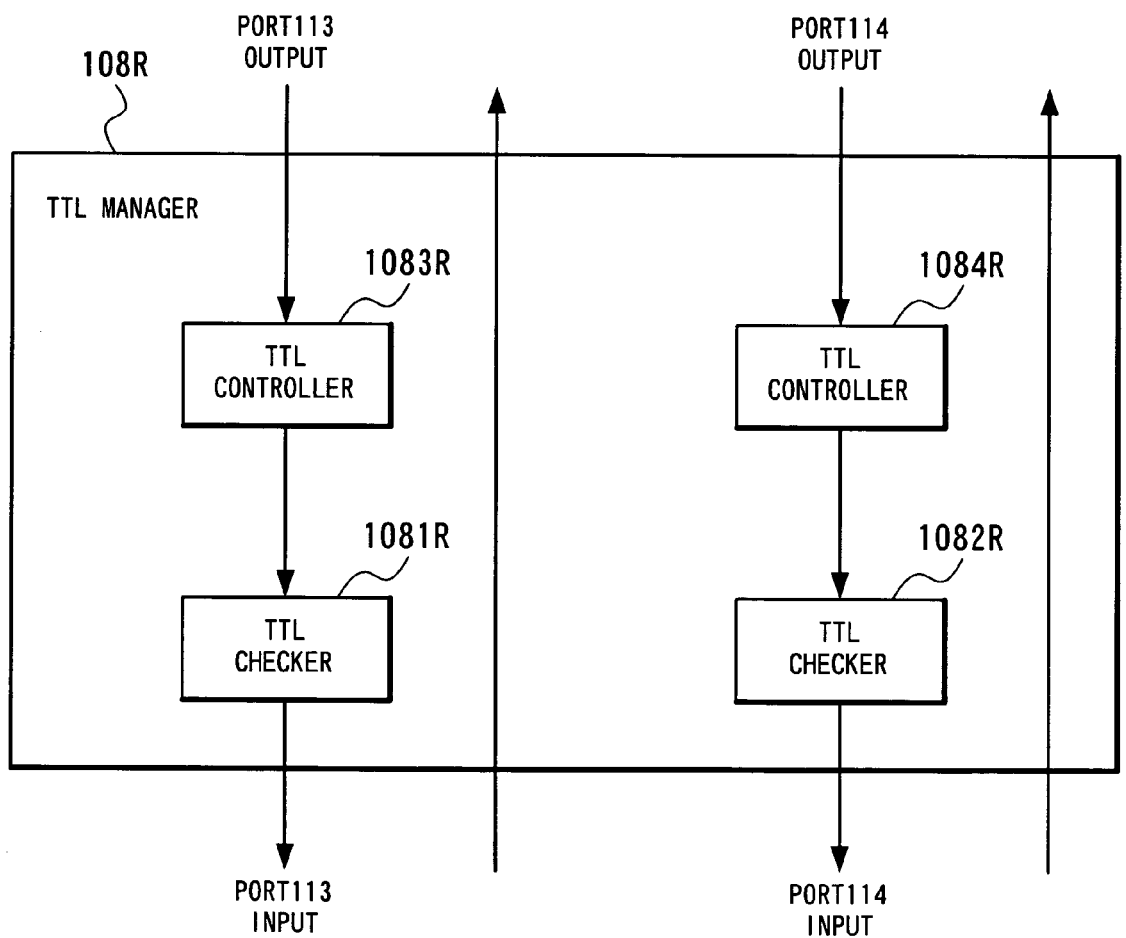
FIG. 18 shows the structural example of a table 107R, according to the third embodiment of the invention.
FIG. 19 is a block diagram showing the basic structure of a TTL manager 108R, according to the third embodiment of the invention.

FIG. 18 is a view showing the structural example of the table 107R in FIG. 17.

The destination RPR node 1071R contains one of the nodes 11R to 14R, which is near to the node having the MAC address indicated in the destination MAC 1071. Usually, the node that becomes the root node is set there. In the example of FIG. 16, since the node 11R and the node 13R become the root nodes, the destination RPR node of a node belonging to the network 2 is set at the node 11R and the destination RPR node of a node belonging to the network 3 is set at the node 13R. This field is set by the address learning unit 106 or manually.

The ring ID 1072R contains a ring to be used for arriving at a node described in the destination RPR node 107R. In the RPR, a pair of one-way rings is represented as the Inner Ring R201 and the Outer Ring R202. When a delete instruction is set in this field, the node deletes the RPR header attached to the input frame. When the input header includes no delete instruction, a new RPR header is added there.

FIG. 19 is a block diagram showing the structure of the TTL manager 108R in FIG. 17.

A TTL checker 1081R confirms the TTL field of a frame supplied from a TTL controller 1083R: when the TTL value is "0" and less, it discards the frame, while when the TTL value is "1" and more, it transfers the frame to the port 113 through the failure detector 109.

The TTL checker 1082R confirms the TTL field of a frame supplied from the TTL controller 1084R: when the TTL value is "0" and less, it discards the frame, while when the TTL value is "1" and more, it transfers the frame to the port 114 through the failure detector 109.

The TTL controller 1083R performs the subtraction of the TTL value set in the frame received from the RPR frame transfer unit 105R and transfers the frame to the TTL checker 1081R.

The TTL controller 1084R performs the subtraction of the TTL value set in the frame received from the RPR frame transfer unit 105R and transfers the frame to the TTL checker 1082R.

Figure 20:
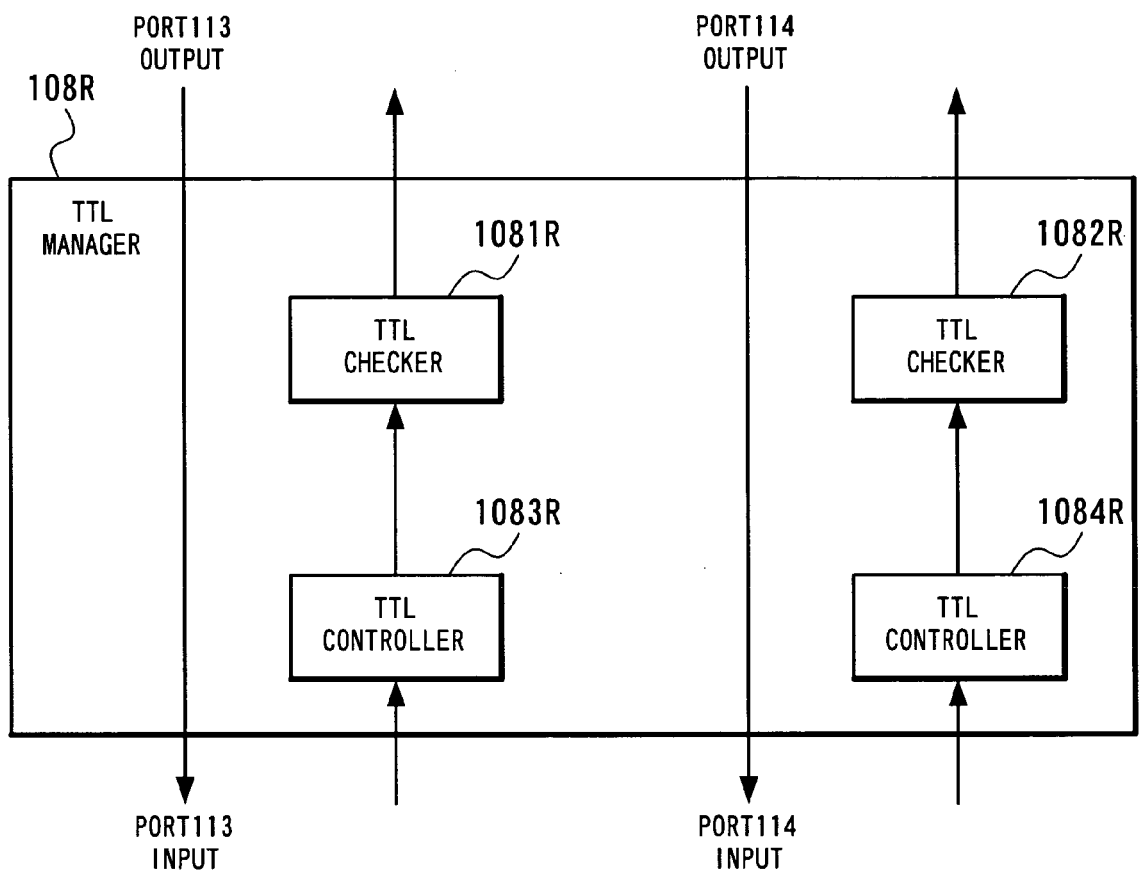
FIG. 20 is a block diagram showing another structure of the TTL manager 108R, according to the third embodiment of the invention.

FIG. 20 is a block diagram showing another structural example of the TTL manager 108R in FIG. 18.

The TTL checker 1081R confirms the TTL field of a frame supplied from the TTL controller 1083R: when the TTL value is "0" and less, it discards the frame, while when the TTL value is "1" and more, it transfers the frame to the RPR frame transfer unit 105R.

The TTL checker 1082R confirms the TTL field of a frame supplied from the TTL controller 1084R: when the TTL value is "0" and less, it discards the frame, while when the TTL value is "1" and more, it transfers the frame to the RPR frame transfer unit 105R.

The TTL controller 1083R performs the subtraction of the TTL value set in the frame received from the port 113 through the failure detector 109 and transfers the frame to the TTL checker 1081R.

The TTL controller 1084R performs the subtraction of the TTL value set in the frame received from the port 114 through the failure detector 109 and transfers the frame to the TTL checker 1082R.

OPERATION EXAMPLE 1 OF THE THIRD EMBODIMENT

Example of Spanning Tree Configuration by RPR (RPR is used for Connection)

With reference to FIG. 16, the operation of configuring the spanning tree in the network 2 and the network 3 and transferring a frame from the node 21 to the node 31, according to this embodiment, will be concretely described in detail.

The destination RPR address, the ring ID, and the output destination port in the case of receiving a frame whose destination MAC address is the bridge group address from the virtual port 116, are previously set by hand in the table 107R of each node within the network 1, namely each node of the node 11R to the node 14R.

Since the node 11R transmits a BPDU frame to be transmitted to the network 1, with the node 12R specified as the destination RPR node address, the BPDU frame arrives at the node 12R without being processed in the node 13R and the node 14R.

Even in each node of the node 12R to the node 14R, the BPDU frame is transferred, with the node connected to the same network as the self-node, specified as the destination.

From the viewpoint of the tree of the network 2, the link between the node 11R and the node 12R becomes a branch of the tree and from the viewpoint of the tree of the network 3, the link between the node 13R and the node 14R becomes a branch of the tree, although this is not described in FIG. 16.

The cost between the node 11R and the node 12R and the cost between the node 13R and the node 14R are respectively set small, and the cost between the node 11R and the node 21 and the cost between the node 11R and the node 22 are respectively set larger than the cost between the node 13R and the node 14R.

The node 11R is set as the root node in the network 2 and the node 13R is set as the root node in the network 3, and assume that the tree of the network 2 and the tree of the network 3 have got stable in the configuration shown in FIG. 16.

The case of transferring a frame from the node 21 to the node 31 will be described this time.

The node 21 transmits the frame with the MAC address of the node 31 attached to the destination MAC address, to the node 11R, according to the tree of the network 2.

Upon receipt of the frame whose destination MAC address is the node 31, from the node 21, the node 11R writes a description that the output destination port of the frame whose destination MAC address is 21 is the port 111, into the table 103, in collaboration with the address learning unit, and further writes a description that the output destination port of the frame whose destination MAC address is 21 is the virtual port 116, into the table 107R.

In a state where the learning unit has not learned enough, as a result of the search, since there is no entry for the MAC of the node 31 in the table 103 and the table 107R, the node 11R specifies the unclear destination RPR address and the Outer ring R202 as the ring ID to the received frame, and transmits the same frame from the port 114 to the node 12R.

Upon receipt of the frame of the unclear destination RPR address, from the node 11R, the node 12R copies the frame received from the node 11R, removes the RPR header, writes a description that the destination RPR address of the frame whose destination MAC address is 21 is 11R, into the table 107R, further writes a description that the output destination port of the frame whose destination MAC address is 21 is the virtual port 116, into the table 103, and then tries to transfer the frame to the port 121 and the port 122, but the frame will not flow because these ports are cut off by the spanning tree. Simultaneously, the node 12R transfers the frame received from the node 11R directly to the node 14R.

Upon receipt of the unclear destination RPR address, from the node 12R, the node 14R copies the frame received from the node 12R, removes the RPR header, writes a description that the destination RPR address of the frame whose destination MAC address is 21 is 11R, into the table 107R, further writes a description that the output destination port of the frame whose destination MAC address is 21 is the virtual port 116, into the table 103, and then tries to transfer the frame to the port 141 and the port 142, but the frame will not flow because these ports are cut off by the spanning tree. Simultaneously, the node 14R transfers the frame received from the node 12R directly to the node 13R.

Upon receipt of the unclear destination RPR address, from the node 14R, the node 13R copies the frame received from the node 14R, removes the RPR header, writes a description that the destination RPR address of the frame whose destination MAC address is 21 is 11R, into the table 107R, further writes a description that the output destination port of the frame whose destination MAC address is 21 is the virtual port 116, into the table 103, and then tries to transfer the frame to the port 131 and the port 132 through the virtual port of the self-node, but the frame is transferred only to the port 131 because the port 132 is cut off by the spanning tree. Simultaneously, the node 13R transfers the frame received from the node 14R directly to the node 11R.

Although the node 11R receives the frame of the unclear destination RPR address from the node 13R, since the source RPR node address of the frame is the self-node, it discards the frame.

The node 31 receives the frame whose destination MAC address agrees with the MAC address of the self-node, from the node 13R.

In the above way, the frame is transferred from the node 21 to the node 31.

OPERATION EXAMPLE 2 IN THE THIRD EMBODIMENT

Example of Spanning Tree Configuration by RPR (RPR is used for Connection)

With reference to FIG. 16, the operation of transferring a frame from the node 31 to the node 21, in the case where the MAC address of the node 21 is learned by the node 11R to the node 14R and the node 31, resulting from the frame transfer from the node 21 to the node 31, will be concretely described in detail, according to the third embodiment.

The node 31 retrieves the MAC address of the node 21 as a key, from the table 103. As a result, since the output destination port proves to be the virtual port 116, it transfers the frame to the virtual port 116. Simultaneously, the address learning unit 102 writes the MAC address of the input source and the port of the input source into the table 103.

The transfer unit 105R within the node 31 retrieves the MAC address of the node 21 as a key from the table 107R. As a result, since the output destination port proves to be the port 311 (the port to which the node 13R is connected), it transfers the frame to the port 311. Simultaneously, the address learning unit 106 writes the MAC address of the node 31 that is the MAC address of the input source and the virtual port 116 that is the port of the input source, into the table 107R.

Upon receipt of the frame from the port 131, the transfer unit 101 within the node 13R retrieves the MAC address of the node 21 as a key from the table 103. As a result, since the output destination port proves to be the virtual port 116, it transfers the frame to the virtual port 116. Simultaneously, the address learning unit 102 writes the MAC address of the node 31 that is the MAC address of the source and the port 131 that is the port of the input source, into the table 103.

The RPR frame transfer unit 105R within the node 13R receives the frame whose destination MAC is 21, through the virtual port 116 and retrieves the MAC address of the node 21 as a key from the table 107R. As a result, since the destination RPR address proves to be the node 11R, it attaches the RPR header with the node 11R set as the destination RPR address and transfers the frame to the port 133. Simultaneously, the address learning unit 106 writes the MAC address of the node 31 that is the MAC address of the source and the virtual port 116 that is the port of the input source, into the table 107R.

Upon receipt of the frame whose destination RPR address is 11R, from the port 113, the RPR frame transfer unit 105R within the node 11R deletes the RPR header because the frame can be judged to be destined for the self-node, and transfers the same frame to the virtual port 116. Simultaneously, the address learning unit 106 writes the MAC address of the node 31 that is the MAC address of the input source, the node 13R that is the RPR node of the input source, and the port 113 that is the port of the input source, into the table 107.

Upon receipt of the frame whose destination MAC address is 21, from the virtual port 116, the transfer unit 101 within the node 11R retrieves the table 103 and then transfers the same frame to the port 111. Simultaneously, the address learning unit 102 writes the MAC address of the node 31 that is the MAC address of the source and the virtual port 116 that is the port of the input source, into the table 103.

The node 21 receives the frame transmitted by the node 31 through the port 111 of the node 11R.

As mentioned above, a frame is transferred from the node 31 to the node 21.

Effects of the Third Embodiment

The effects of the third embodiment will be described, next.

Hitherto, according as the shape of the topology becomes more complicated and according as the number of the nodes accommodated in a network is more increased, it takes the longer time to configure the spanning tree.

In the embodiment, however, by dividing the spanning tree into every domain, it is possible to shorten the configuration time of the spanning tree.

When changing the configuration of the spanning tree owing to a failure, the conventional technique changes the configuration gradually while stopping one of the network locally, and, in order to reconfigure the whole network, it stops the network temporarily even in a place distant from the failure occurring position. This embodiment, however, can restrict the failure affecting area to a minimum by dividing the spanning tree into every domain.

Fourth Embodiment

Hereinafter, a fourth embodiment of the invention will be described in detail with reference to the drawings.

Figure 21:
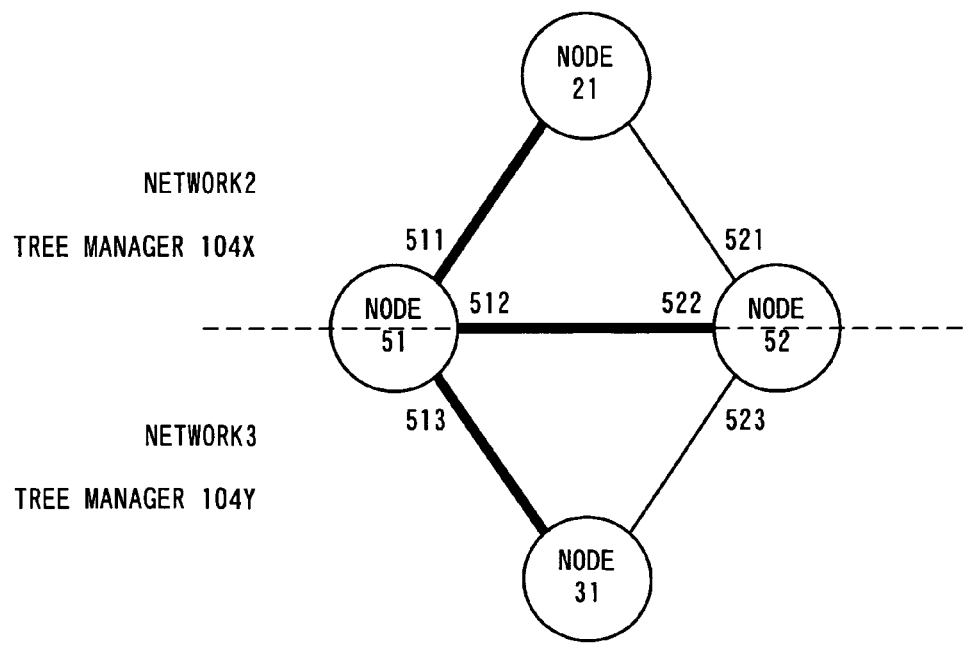
FIG. 21 is a block diagram showing an example of the network and spanning tree configuration, according to a fourth embodiment of the invention.

With reference to FIG. 21, the fourth embodiment of the invention is different from the above-mentioned embodiments in that the network 1 in FIG. 1 according to the first embodiment is formed by two nodes; a node 51 and a node 52.

Figure 22:
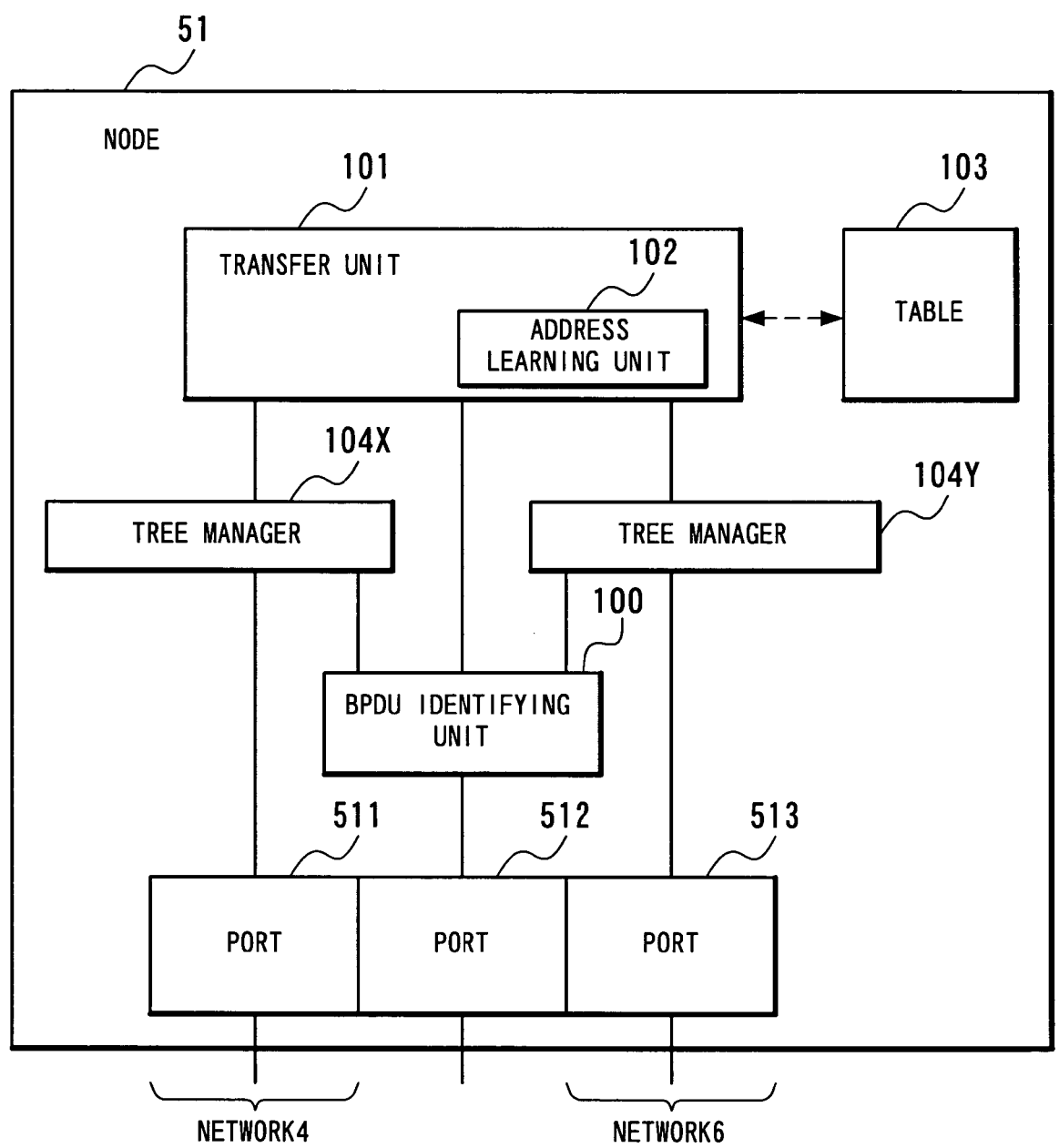
FIG. 22 is a block diagram showing the structure of a node 51, according to the fourth embodiment of the invention.

FIG. 22 is a block diagram showing the structure of the node 51 in FIG. 21.

The BPDU identifying unit 100 performs the following operations of:

(1) transferring a frame received from the transfer unit 101 directly to the port 512, (2) attaching the identifier indicating that it is the input from the tree manager 104X, to the frame received from the tree manager 104X and transferring it to the port 512, (3) attaching the identifier indicating that it is the input from the tree manager 104Y, to the frame received from the tree manager 104Y and transferring it to the port 512, (4) checking the frame received from the port 512 and when the identifier indicating that it is the input from the tree manager 104X is attached to the same frame, deleting the same identifier and transferring it to the tree manager 104X, (5) checking the frame received from the port 512 and when the identifier indicating that it is the input from the tree manager 104Y is attached to the same frame, deleting the same identifier and transferring it to the tree manger 104Y, and (6) checking the frame received from the port 512 and when there is no identifier attached by the BPDU identifying unit 100, transferring it to the transfer unit 101 directly.

The tree manager 104X has the following three functions of:

(1) upon receipt of a frame from the port 511 and the BPDU identifying unit 100, transferring it to the frame transfer unit 101 or discarding it according to the spanning tree protocol, (2) upon receipt of a frame from the transfer unit 101, transferring the frame to the port 511 and the BPDU identifying unit 100 or discarding it according to the spanning tree protocol, and (3) transmitting and receiving the BPDU frame for controlling the spanning tree.

A tree manager 104Y is a tree manager performing the same operation as the tree manager 104X in this embodiment.

Figure 23:
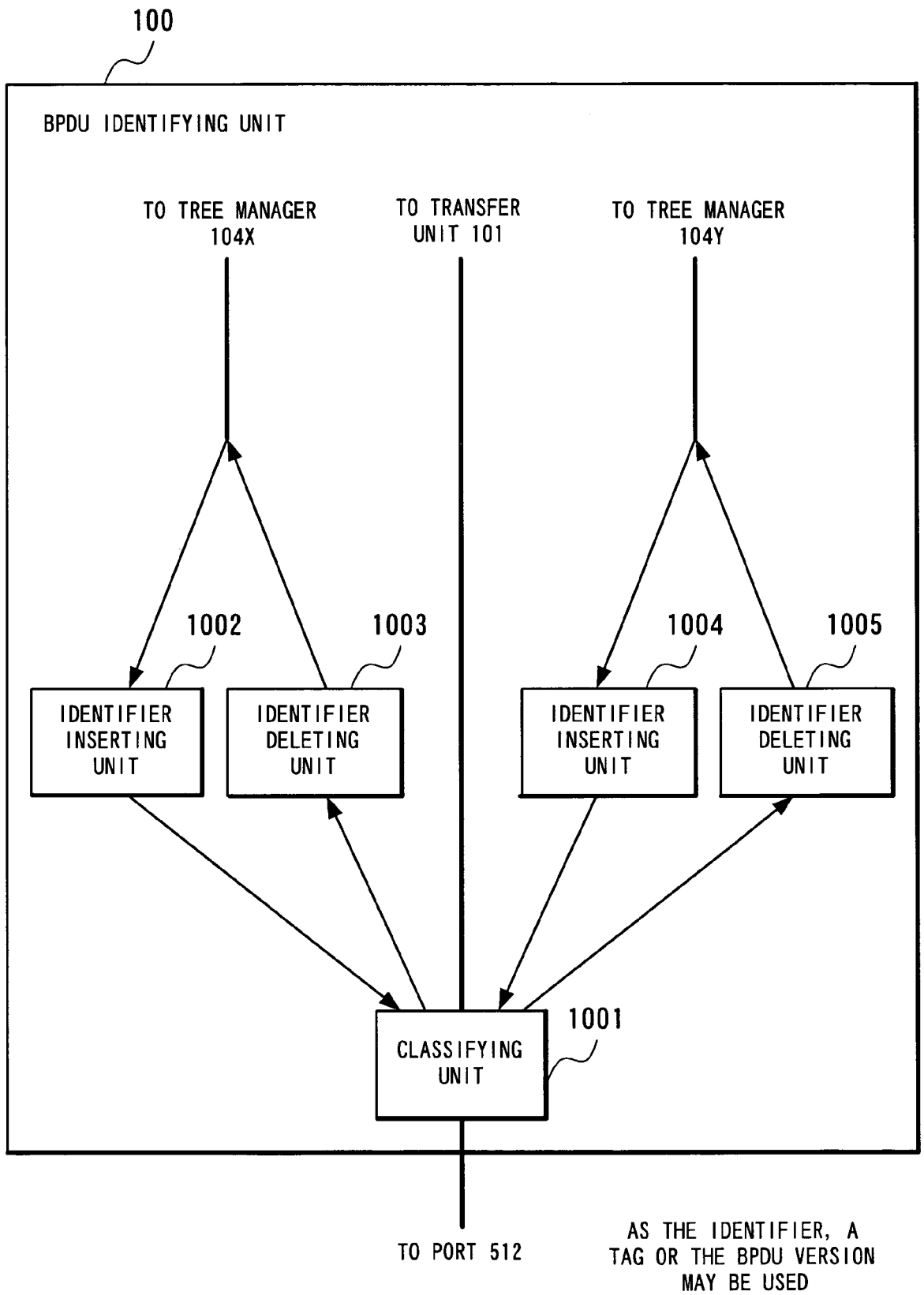
FIG. 23 is a block diagram showing the structure of a BPDU identifying unit 100, according to the fourth embodiment of the invention.

FIG. 23 is a block diagram showing the structure of the BPDU identifying unit 100 in FIG. 22.

A classifying unit 1001 checks the identifier of the frame received from the port 512 and transfers it to an identifier deleting unit 1003, an identifier deleting unit 1005, or the transfer unit 101. Further, it transfers the frame received from an identifier inserting unit 1002, an identifier inserting unit 1004, or the transfer unit 101, to the port 512 at a proper timing. Usually, only the BPDU frame is transferred to the identifier deleing units 1003 and 1005 and the other frame is transferred to the transfer unit 101.

The identifier inserting unit 1002 attaches the identifier indicating that it is the input from the tree manager 104X, to the frame received from the tree manager 104X, and transfers it to the classifying unit 1001.

The identifier deleting unit 1003 deletes the identifier attached to the frame received from the classifying unit 1001 and transfers the frame to the tree manager 104X.

The identifier inserting unit 1004 attaches the identifier indicating that it is the input from the tree manager 104Y, to the frame received from the tree manager 104Y and transfers it to the classifying unit 1001.

The identifier deleting unit 1005 deletes the identifier attached to the frame received from the classifying unit 1001 and transfers the frame to the tree manager 104Y.

OPERATION EXAMPLE OF THE FOURTH EMBODIMENT

Example of Spanning Tree Configuration

This time, with reference to FIG. 21, the operation of configuring the spanning tree in the network 2 and the network 3 and transferring a frame from the node 21 to the node 31, in the case where the node 51 becomes the root node, will be concretely described in detail, according to the fourth embodiment.

In a node belonging to the network 2, the spanning tree of the network 2 is configured by using the tree manager 104X. The BPDU frame transmitted from the tree manager 104X of the node 51 does not have the special identifier attached in the case of transmission through the port 511 toward the node 21, while it has the identifier attached, indicating that it has been transferred from the tree manager 104X, in the case of transmission through the port 512 toward the node 52.

When the identifier-attached BPDU frame, transmitted from the port 512 of the node 51, is received by the port 522 of the node 52, its identifier is confirmed and transferred to the tree manager 104X within the node 52.

The tree manager 104X of the node 52 exchanges the identifier-attached BPDU frames with the node 51 and exchanges the BPDU frames without identifier with the node 21.

At this time, in the link between the node 51 and the node 52 or in their ports, the cost is set smaller than any other port and link, so that the link between the node 51 and the node 52 can always become a branch of the tree.

When the BPDU frame exchange has been completed among the node 51, the node 52, and the node 21, the tree shown by the heavy line in FIG. 21 is configured.

In a node belonging to the network 3, the spanning tree of the network 3 is configured by using the tree manager 104Y. The BPDU frame transmitted from the tree manager 104Y of the node 51 does not have the special identifier attached in the case of transmission through the port 513 toward the node 31, while it has the identifier attached, indicating that it has been transferred from the tree manager 104Y, in the case of transmission through the port 512 toward the node 52.

When the identifier-attached BPDU frame, transmitted from the port 512 of the node 51, is received by the port 522 of the node 52, its identifier is confirmed and it is transferred to the tree manager 104Y within the node 52.

The tree manager 104Y of the node 52 exchanges the identifier-attached BPDU frames with the node 51 and exchanges the BPDU frames without identifier with the node 31.

At this time, in the link between the node 51 and the node 52 or in their ports, the cost is set smaller than any other port and link, so that the link between the node 51 and the node 52 can always become a branch of the tree.

When the BPDU frame exchange has been completed among the node 51, the node 52, and the node 31, the tree shown by the heavy line in FIG. 21 is configured.

According to the above operations, the spanning tree of the network 2, namely, the tree manager 104X, and the tree of the network 3, namely, the tree manager 104Y look like one link always adjacent between the nodes 51 and 52.

When the spanning trees for the network 2 and the network 3 have been completed according to the above operations, the topology of the network converges into a shape capable of preventing from loop generation.

The configuration example of the completed tree is shown by the heavy line in FIG. 21. Since the tree configuration shown in FIG. 21 varies according to the parameter, it doesn't always become the tree configuration shown in FIG. 21, in the network of the physical topology of FIG. 21. The same data frame as the usual network may flow on this tree, thereby performing the frame transfer.

Even when one of the two spanning trees is in an unstable state, packet will never loop.

The node 21 and the node 31 have only to be the conventional spanning tree-compatible node and they need no special operation.

Effects of the Fourth Embodiment

The effects of the embodiment will be described, next.

Hitherto, according as the shape of the topology becomes more complicated and the number of the nodes accommodated into a network is more increased, it takes the longer time to configure the spanning tree.

In the embodiment, however, by dividing the spanning tree into every domain, it is possible to shorten the configuration time of the spanning tree.

When changing the configuration of the spanning tree owing to a failure, the conventional technique changes the configuration gradually while stopping one of the network locally, and, in order to reconfigure the whole network, it stops the network temporarily even in a place distant from the failure occurring position. This embodiment, however, can restrict the failure affecting area to a minimum by dividing the spanning tree into every domain.

Fifth Embodiment

Hereinafter, a fifth embodiment of the invention will be described in detail with reference to the drawings.

The invention can be also applied to the network described in the non-patent article 3. Before describing its application to the network, the frame transfer in the network will be described by giving an example in FIG. 24. In the network described in FIG. 24, the reference marks 11G to 14G, 21G, 22G, 31G, and 32G show the nodes and terminals A and B are respectively connected to the nodes 21G and 31G.

In the case of the frame transmission from the terminal A to the terminal B in the network, at first, the terminal A transmits a frame with the MAC address of the terminal B inserted into the destination MAC address to the node 21G (edge node). Upon receipt of the frame, the node 21G inserts the node ID of the node 31G accommodating the terminal B, into the tag region of this frame and transfers this frame to the node 31G along the path on the spanning tree.

Figure 24:
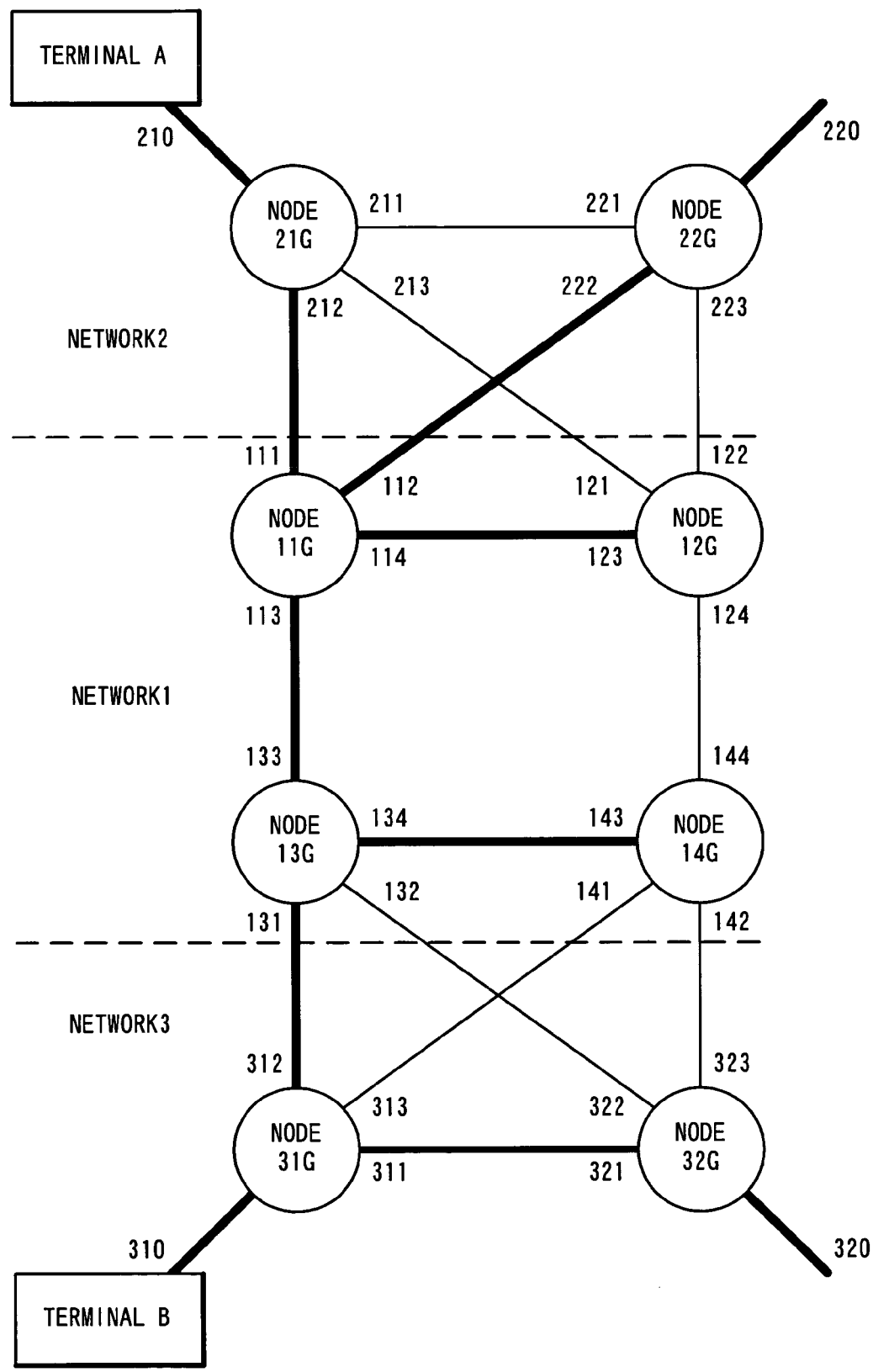
FIG. 24 is a block diagram showing an example of the network and spanning tree configuration, according to a fifth embodiment of the invention.

In order to do this transfer processing, each node transmits the frame to the corresponding port while referring to the forwarding table (a table in which the relationship between each destination node ID and each corresponding port number is defined) belonging to each node. When this frame arrives at the node 31G, the node 31G detects that the destination node ID written in the tag is this node. At this time, the node 31G checks the MAC address described in the destination MAC address of this frame, confirms that the destination is the terminal B, and transmits the frame to the port 310 to which the terminal B is connected. In the network of FIG. 24, a frame can be transferred between the terminals according to this procedure.

Figure 31:
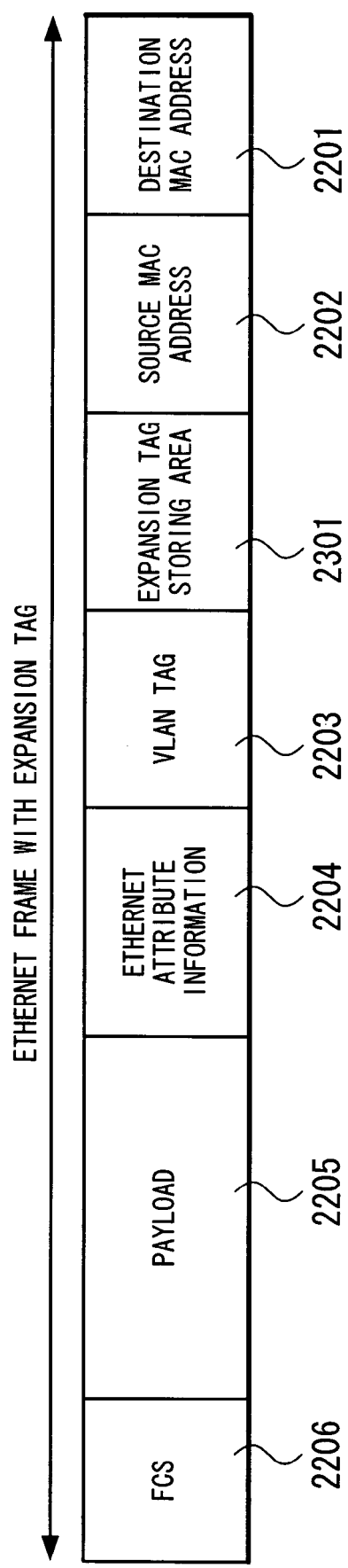
FIG. 31 is a view indicating the configuration example of the Ethernet frame with an expansion tag, according to the invention.

The tag region here may include the region of the VLAN (Virtual LAN) tag in the case where a frame is, for example, the Ethernet frame. It is also possible to provide with an expansion tag storing area 2301 like a frame shown in FIG. 31, and transfer the frame with the node ID inserted into this area. Even in the case of using the VLAN tag region 2203, and even in the case of using the expansion tag storing area 2301 as shown in FIG. 31, each node can determine the destination based on the information written into the next region to the "source MAC address" region 2202 in the frame.

As described in the first to the fourth embodiments, the following form can be adopted, besides the form of configuring one spanning tree as for one network. Namely, it is the form of creating the spanning trees, having the respective nodes as the root nodes, for the same number (multiphase) as the number of the nodes. In the latter form, the frame transfer is performed along the path on the spanning tree with the node accommodating the destination terminal as the root. Thus, the frame transfer on the shortest path is possible by transferring the frame by using various spanning trees different for every destination.

The embodiment for configuring the above-mentioned multiphase spanning tree will be described below in the network of FIG. 24.

With reference to FIG. 24, in the fifth embodiment of the invention, the node 11 to the node 32 in FIG. 1 of the first embodiment are respectively replaced with the node 11G to the node 32G, and further a link 210, a link 220, a link 310, and a link 320, that are the links for the client terminal accommodation, are respectively added to the node 21G, the node 22G, the node 31G, and the node 32G, differently from the above-mentioned embodiments.

The node 11G does not determine the output destination port by learning the MAC address, but it has a tag forwarding function for determining the output destination port with reference to the node ID inserted into the tag area of the frame as the edge node, differently from the node 11 in FIG. 1 and the other drawings. In the case of configuring the multiphase spanning tree, the tree manager is adopted to cope with the multiphase, which is also different from the above mentioned embodiments.

The node 21G does not determine the output destination port by learning the MAC address, but it performs the tag forwarding for determining the output destination port with reference to the node ID inserted into the tag area of the frame, differently from the node 21 in FIG. 1 and the other drawings. Since the node 21G accommodates a terminal, it transfers the frame after inserting the node ID indicating the destination node into the tag area of the frame received from the terminal, and deleting the tag from the tag-attached frame destined for the terminal flowing within the network 2.

The port 210 is a port to which the link connecting the terminal accommodated by the node 21G is connected. Only one terminal may be connected there or a plurality of terminals may be connected there through a hub and the like.

The port 220, the port 310, and the port 320 are the ports for connecting the respective terminals accommodated by the respective nodes 22G, 31G, and 32G, similarly to the port 210. Similarly, only one terminal may be connected there, or a plurality of terminals may be connected there through a hub and the like.

Figure 25:
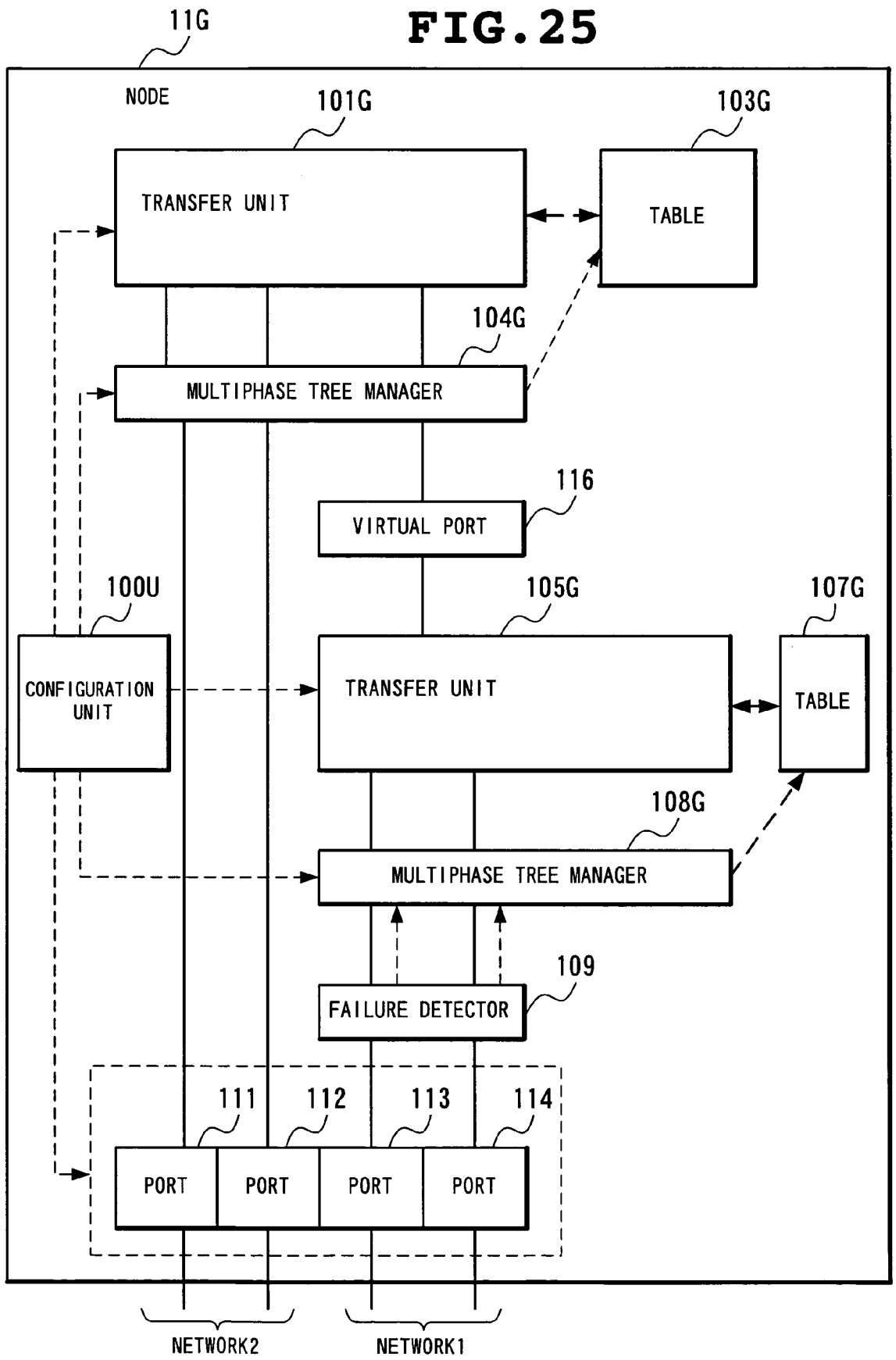
FIG. 25 is a block diagram showing the structure of a node 11G, according to the fifth embodiment of the invention.

FIG. 25 is a block diagram showing the structure of the node 11G in FIG. 24.

The transfer unit 101G transfers the frame to the port described in the table 103G, with reference to the header, the tag, and the other identification information of the frame received from the multiphase tree manager 104G. The description of this embodiment will be hereafter made in the case of using the node ID inserted into the tag area as the identification information.

The table 103G is a table where each output port corresponding to each identification tag (node ID) attached to the frames is described. Writing into the table is performed by the multiphase tree manager 104G and the information described in the table is read out by the transfer unit 101G.

The multiphase tree manager 104G performs the following operations of:

(1) identifying whether the frame received from the port 111, the port 112, or the virtual port 116 is a control frame called BPDU frame used for the spanning tree configuration defined by IEEE 802.1D or IEEE 802.1W: when it is not the BPDU frame, transferring the input frame directly to the transfer unit 101G, while when it is the BPDU frame, performing the processing necessary for the spanning tree configuration upon receipt of the above frame, (2) writing into the table 103G based on the configuration result of the spanning tree, (3) transferring the frame received from the transfer unit 101G directly to the port 111, the port 112, or the virtual port 116, and (4) performing the above operations (1) to (2) for every identification tag (node ID) attached to each frame: for example, creating 4096 kinds of spanning trees when the number of the identification tags (the number of the nodes) is 4096.

The transfer unit 105G transfers the frame to the port described in the table 107G, with reference to the header, tag, and the other identification information of the frame received from the multiphase tree manager 108G or the virtual port 116.

The table 107G is a table where each output port corresponding to each identification tag (node ID) attached to each frame is described. Writing into the table is performed by the multiphase tree manager 108G and the information described in the table is read out by the transfer unit 105G.

The multiphase tree manager 108G performs the following operations of:

(1) identifying whether the frame received from the port 113 or the port 114 is a control frame called BPDU frame used for the spanning tree configuration defined by IEEE 802.1D or IEEE 802.1W: when it is not the BPDU frame, transferring the input frame directly to the transfer unit 105G, while when it is the BPDU frame, performing the processing necessary for the spanning tree configuration upon receipt of the above frame, (2) writing into the table 107G based on the configuration result of the spanning tree, (3) transferring the frame received from the transfer unit 105G directly to the port 113 or the port 114, and (4) performing the above operations (1) to (2) for every identification tag (node ID) attached to each frame: for example, creating 4096 kinds of spanning trees when the number of the identification tags (the number of the nodes) is 4096.

Figures 26, 27:
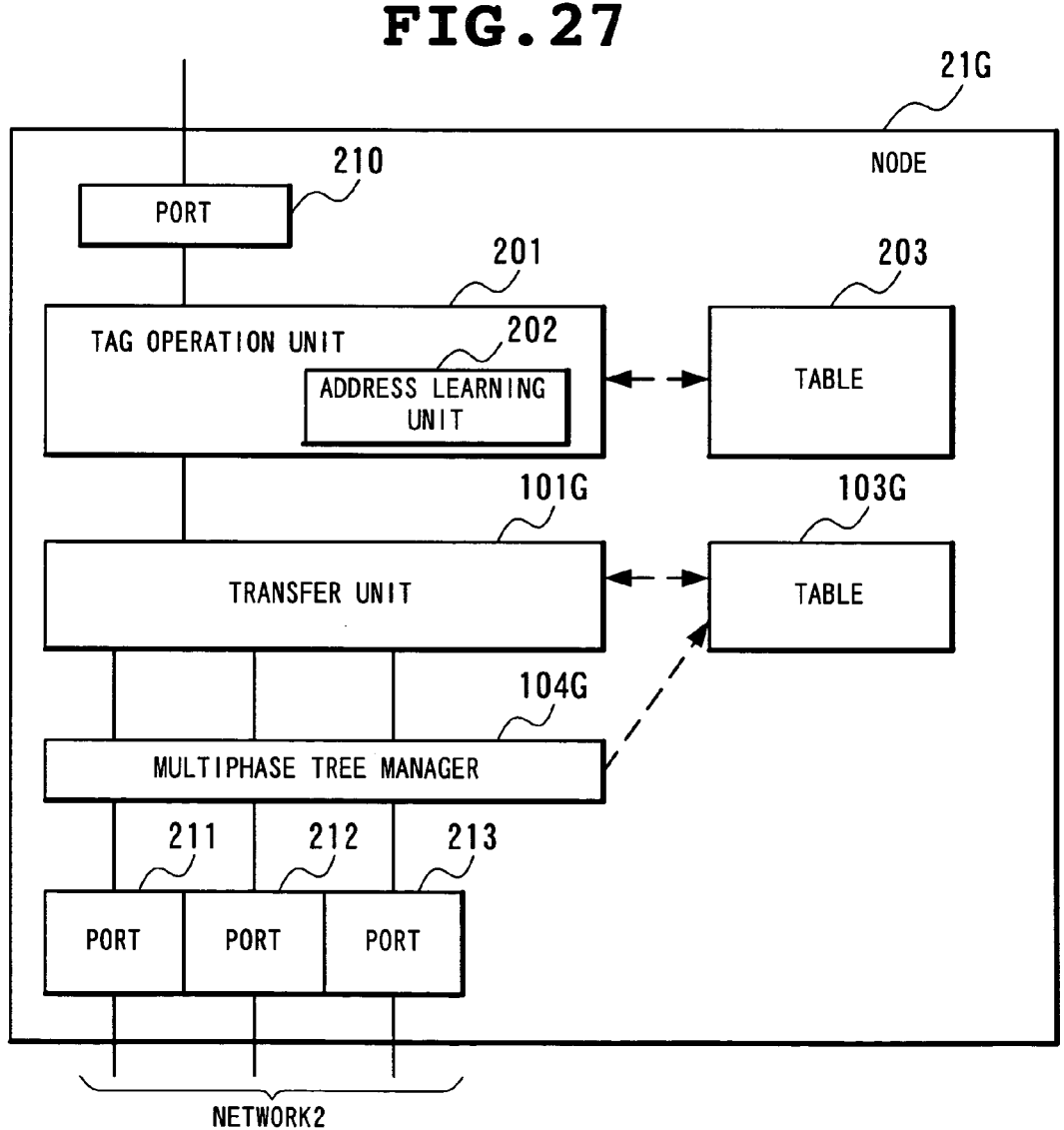
FIG. 26 shows the structural example of a table 103G, according to the fifth embodiment of the invention.
FIG. 27 is a block diagram showing the structure of the node 21G, according to the fifth embodiment of the invention.
Figure 29:
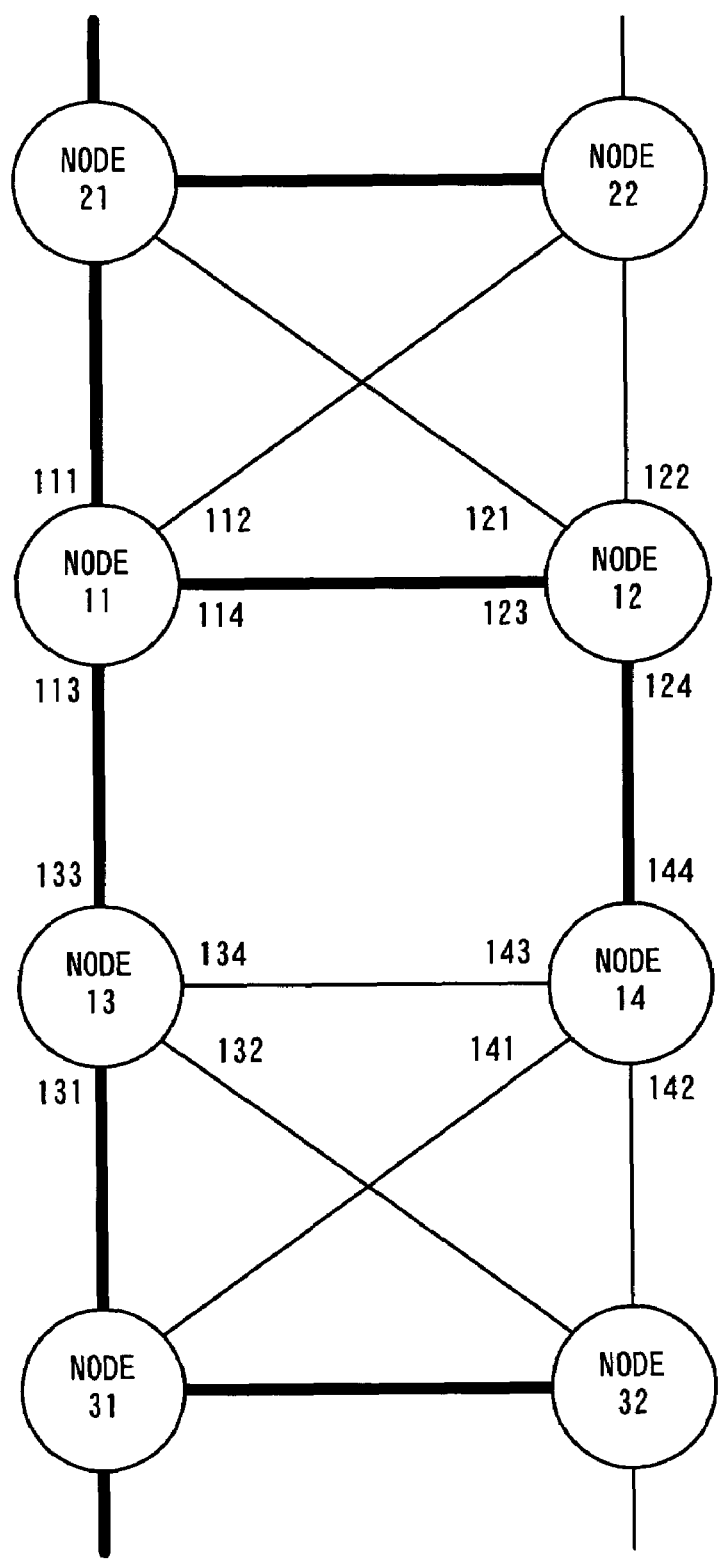
FIG. 29 is a block diagram showing an example of the spanning tree configuration, according to the conventional technique of the invention.

FIG. 26 shows the structure of the table 103G in FIG. 25.

The destination identification tag 1031G is a field that is used as the retrieval key when the transfer unit 101G searches for the output port, where the information described in the tag including the node ID, VLAN, ID, and the like is filled, correspondingly to the frame transfer method.

The output port 1032G is a field for describing the output destination port ID corresponding to the node ID and the like described in the destination identification tag 1031G field. One or a plurality of port IDs or a virtual port ID is described in this field.

The table 103G is created at a time of the spanning tree configuration.

FIG. 27 is a block diagram showing the structure of the node 21G in FIG. 24.

The tag operation unit 201 performs the following operations of:

(1) referring to the destination MAC address of the frame received from the port 210, retrieving a tag corresponding to the referred destination MAC address from the table 203, inserting the above into the frame, and transferring it to the transfer unit 101G, (2) deleting the tag from the frame received from the transfer unit 101G and transferring it to the port 210, (3) when it cannot obtain the tag corresponding to the destination MAC address, as a result of the above retrieval in the table 203, copying the frame, attaching each tag (0022, 0031, and 0032 in the example of FIG. 24) that this is destined for any other node than the self-node, existing on the network 2 and the network 3 (the node 22G, the node 31G, and the node 32G in the example of FIG. 24) and each source tag indicating the tag ID of the self-node (0021 in this case) to the above frame, hence to create the respective frames (a total of three frames in this case), and transferring them to the transfer unit 101G.

The address learning unit 202 checks the source MAC address and the source tag of the frame received from the transfer unit 101G, and respectively writes them into the destination MAC address field and the insertion tag field of the table 203.

The table 203 is a table where each insertion identification tag corresponding to each destination MAC address of the frames is described. As one example, the contents of the table 203 include a correspondence between the MAC address of the destination terminal of a frame and the ID of a node accommodating the destination terminal. The table is to be referred to when the edge node inserts the node ID into the tag area of the frame. This table can be created based on the information from a network management server, writing into the table is performed by the address learning unit 202, and the information described in the table is read out by the tag operation unit 201.

FIG. 28 is a view showing the format structure of the table 203 in FIG. 27.

The destination MAC 2031 is a field that is used as the retrieval key when the tag operation unit 201 searches for the identification tag to insert, where the MAC address is usually described.

The insertion tag 2032 is a field where each identification tag to be inserted correspondingly to each destination MAC 2031 is described. As one example, the insertion tag includes the ID of a node accommodating the destination terminal. One or a plurality of identification tags are described in this field.

OPERATION EXAMPLE OF THE FIFTH EMBODIMENT

Tag Forwarding

The operation of transferring the frame described in FIG. 31, from a terminal connected to the port 210 of the node 21G to a terminal (destination MAC address 22:00:00:00:00:22) connected to the link 310 of the node 31G (node ID: 0031), after configuring the spanning trees in the network 1 and the network 3, according to this embodiment, will be concretely described, with reference to FIG. 24 to FIG. 27.

The spanning tree for the number of the total nodes of the network 1 to the network 3 are configured at first in the network 1 and then the spanning trees for the same number of the above total nodes are configured respectively in the network 2 and the network 3.

As a result, in the respective network 1 to the network 3, the spanning trees for the number of the identifier tags (the number of the nodes) are configured in the respective network 1 to the network 3. Thus, a tree is configured in every network at a time of the spanning tree configuration. While, it is recognized that the spanning trees are configured on the whole network, at the frame transfer and then the frame transfer is performed as mentioned above. The respective spanning trees configured for the number of the nodes have the respective nodes as the root nodes. Assume that the spanning tree corresponding to the node ID: 0031 that is the identification tag of the destination node 31G is configured as shown by the heavy line of FIG. 24.

The terminal connected under the control of the node 21G transmits the frame whose destination MAC address is specified as 22:00:00:00:00:22 and this frame arrives at the node 21G through the port 210.

With reference to FIG. 27, upon receipt of the frame whose destination MAC address is specified at 22:00:00:00:00:22 through the port 210, the tag operation unit 201 of the node 21G retrieves the table 203 shown in FIG. 28, hence to obtain the node ID: 0031 that is the tag corresponding to the MAC address, inserts this ID into an expansion tag storing area of the frame, and transfers it to the transfer unit 101G.

The transfer unit 101G of the node 21G refers to the tag (node ID) attached to the frame and the table 103G shown in FIG. 26, obtains the port 212 as the output port, and transfers the frame to the port 212.

Concretely, with reference to FIG. 25, the multiphase tree manager 104G within the node 11G receives the frame of the destination tag 0031 and the destination MAC 22:00:00:00:00:22, transmitted from the node 21G, through the port 111. The frame is immediately transferred to the transfer unit 101G because it is not the BPDU frame.

The transfer unit 101G within the node 11G receives the frame from the multiphase tree manager 104G, retrieves the destination tag 0031 as a key from the table 103G, obtains the virtual port 116 as the output destination port, and transfers the frame to the virtual port 116.

The transfer unit 101G within the node 11G receives this frame through the virtual port 116, retrieves the destination tag 0031 as a key from the table 107G, obtains the port 113 as the output destination port, and transfers the frame to the port 113.

The multiphase tree manager 108G within the node 11G supplies the frame received from the transfer unit 105G directly to the port 113 through the failure detector 109.

With reference to FIG. 24, in the node 13G, the transfer unit 105G and the transfer unit 101G receive the frame transferred by the node 11G through the port 133, retrieve the output destination port of the frame with the destination tag 0031 as a key, and transfer it to the port 131, in the same way as the node 11G.

The node 31G receives the frame through the port 312, retrieves the table 103G with the destination tag 0031 as a key in the transfer unit 10G, and when recognizing that the frame is destined for the self-node, it deletes the tag in the tag operation unit 201 and supplies the frame through the port 310.

When the terminal of the MAC address 22:00:00:00:00:22 connected to the port 310 checks the destination MAC address when receiving the frame supplied from the port 310 of the node 31G and confirms that it is destined for the self-node and accepts it.

As mentioned above, it is possible to transfer a frame from the terminal connected to the port 210 of the node 21G to the terminal connected to the node 31G.

Effects of the Fifth Embodiment

The effects of the embodiment will be described, next.

Hitherto, according as the shape of the topology becomes more complicated and the number of the nodes accommodated into a network is more increased, it takes the longer time to configure the spanning tree.

In the embodiment, however, by dividing the spanning tree into every domain, it is possible to shorten the configuration time of the spanning tree.

When changing the configuration of the spanning tree owing to a failure, the conventional technique changes the configuration gradually while stopping one of the network locally, and, in order to reconfigure the whole network, it stops the network temporarily even in a place distant from the failure occurring position. This embodiment, however, can restrict the failure affecting area to a minimum by dividing the spanning tree into every domain.

It is needless to say that the functions of the respective means that are components of the node in the network according to the invention can be realized by the hardware, and a program for realizing the functions of the above-mentioned means may be loaded into a memory of a computer to control the computer, thereby realizing the above functions. This program is loaded from a magnetic disk, a semiconductor memory, or the other storing medium into the computer, to control the operations of the computer, thereby realizing the above-mentioned functions.

Sixth Embodiment

Hereinafter, a sixth embodiment will be described in detail with reference to the drawings.

The sixth embodiment is the form of applying the invention to a hierarchical network. Here, by way of example, the case of connecting the three networks described in FIG. 32 by the application of the invention will be described. As a wide area network 3201, for example, a wide area network connecting the cities is assumed and as local networks 3202 and 3203, a network of the size spread in the urban area is assumed.

Figure 32:
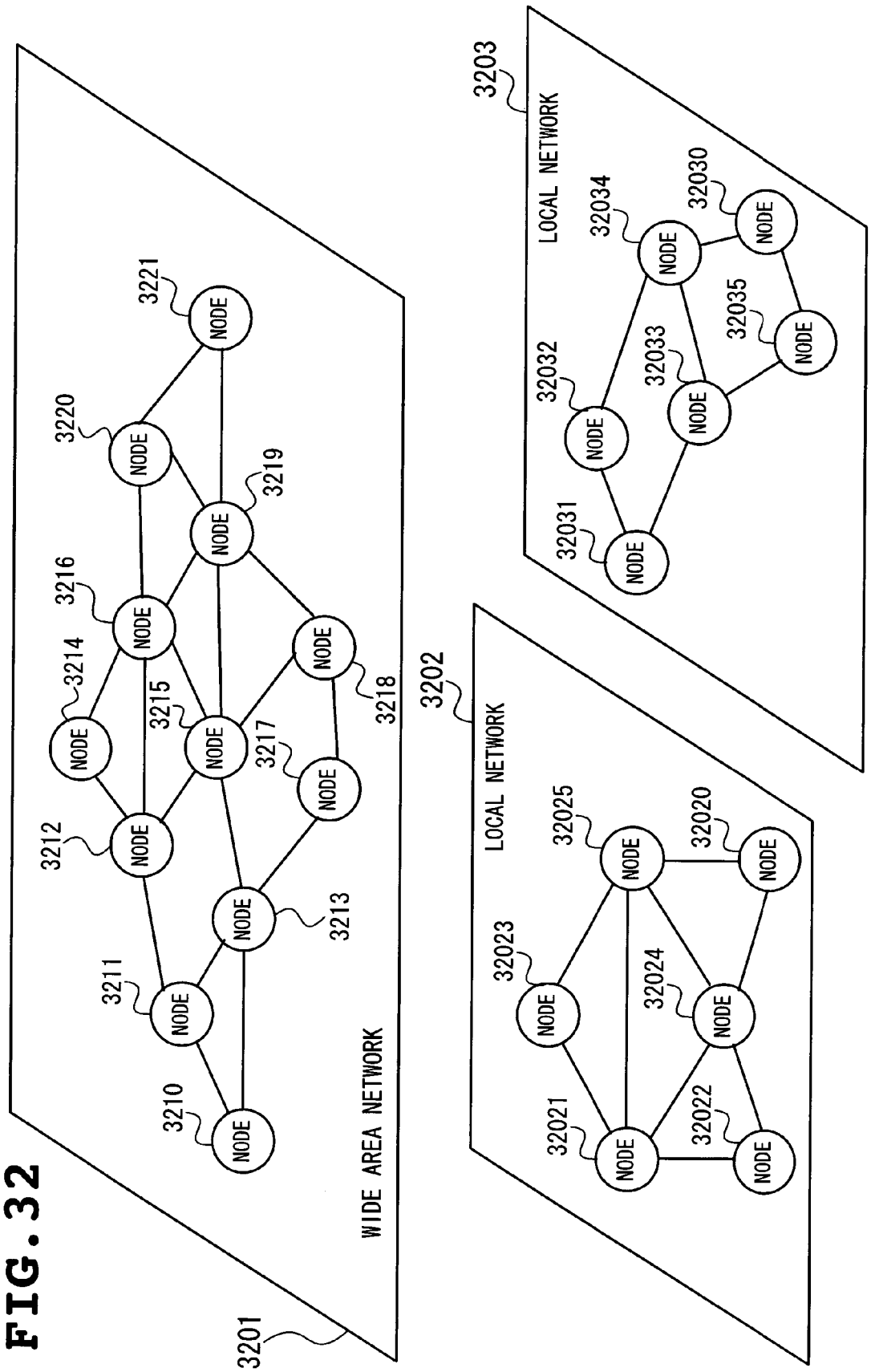
FIG. 32 is a view showing an example of three networks to be connected by application of the invention.

The wide area network 3201 is formed by the nodes 3210 to 3221, and the respective nodes are connected as shown in FIG. 32. The local network 3202 is formed by the nodes 32020 to 32025, the local network 3203 is formed by the nodes 32030 to 32035, and the respective nodes are connected as shown in FIG. 32. Assume that the local network 3202 and the local network 3203 respectively exist in the different cities.

Figure 33:
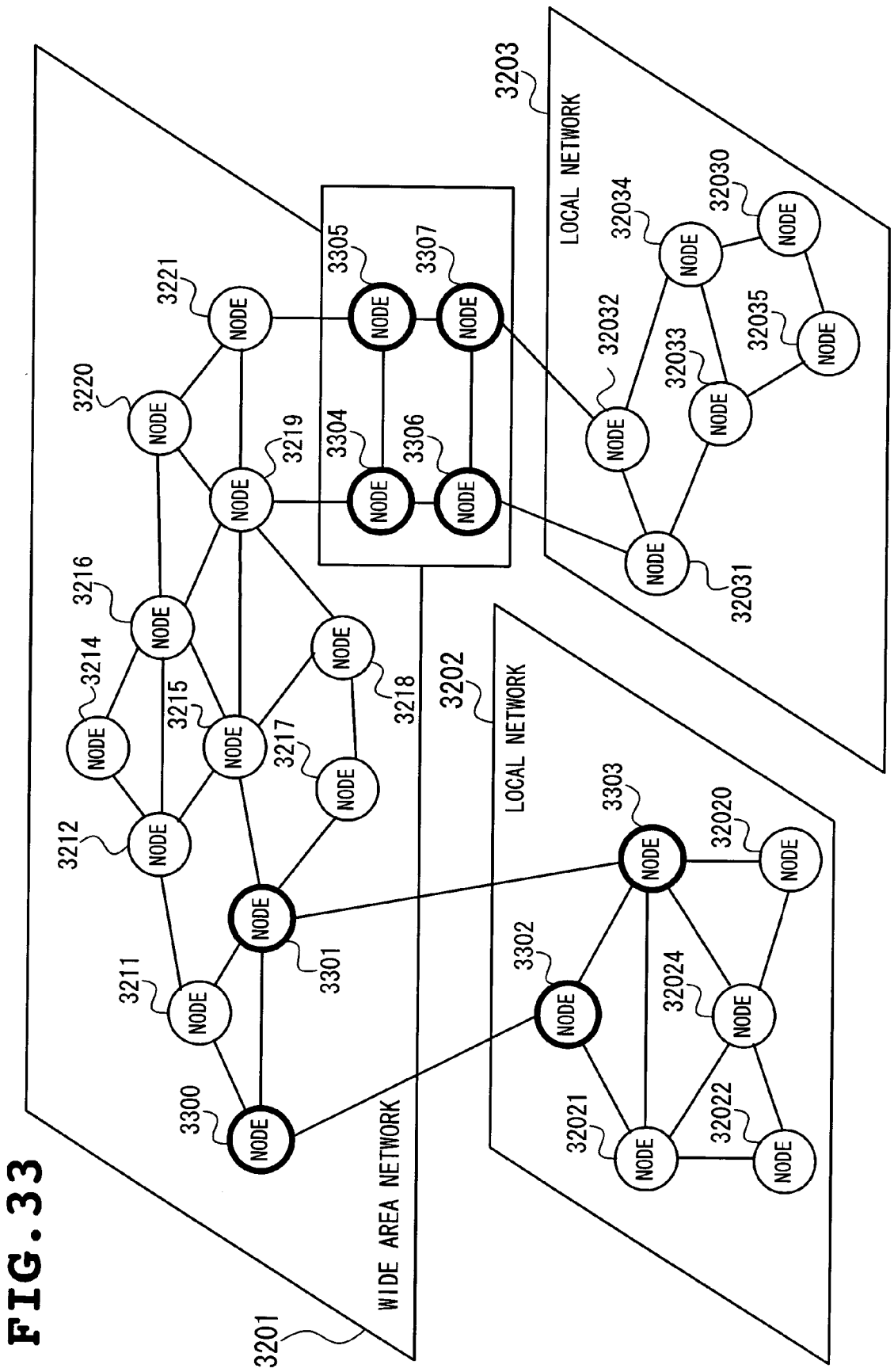
FIG. 33 is a view showing an example in the case of connecting the above three networks by application of the invention, shown in FIG. 32.

By way of example, the case of connecting these three networks by the application of the invention is described in FIG. 33.

Two examples of connection by the nodes according to the invention are shown in FIG. 33.

In the first connection example, the wide area network 3201 and the local network 3202 are connected to each other in such a way that the respective existing nodes 3210, 3213, 32023, and 32025 are replaced with the nodes 3300, 3301, 3302, and 3303 according to the invention.

In the second connection example, the wide area network 3201 and the local network 3203 are connected to each other in such a way that the respective nodes 3304, 3305, 3306, and 3307 are newly provided to connect with the respective existing nodes 3219, 3221, 32031, and 32032.

When configuring the spanning tree in the networks connected with each other by using the nodes according to the invention, the spanning trees are configured at first in the network formed by the nodes 3300, 3301, 3302, and 3303 and the network formed by the nodes 3304, 3305, 3306, and 3307, as shown below. Subsequently, the spanning trees are respectively configured in the wide area network 3201, and the local networks 3202 and 3203. Thus, in the stage of configuring the spanning tree, the spanning tree is configured in every network.

Although the frame transfer is performed along the path on the configured spanning trees, a frame will be transferred as if only one spanning tree is configured on the whole network, without consciousness that the spanning trees divided are configured, at the frame transfer time.

The operation of spanning tree configuration is the same as the operation having been described in the first to the fifth embodiments. The nodes 3300 to 3307 are formed as shown in FIG. 25. In the case where the configured spanning tree is on one phase, the multiphase tree managers 104G and 108G may be replaced with the tree managers 104 and 108 in FIG. 2, and further the tree manager 104A of FIG. 13 may be used depending on the function of the spanning tree. The nodes other than the nodes 3300 to 3307 have only to be the conventional spanning tree-compatible nodes and they do not have to be the nodes of the invention necessarily.

The operation of spanning tree configuration will be summed up hereinafter. At first, in the nodes 3300 to 3307, the tree manager 108 is used to configure the spanning tree in a partial network formed by the nodes 3300 to 3304 and the spanning tree in a partial network formed by the nodes 3304 to 3307.

After the states of these spanning trees have got stable, the respective tree managers 104 of the nodes 3300 to 3307 and the other tree manager of the other nodes are used to configure the spanning trees respectively in the wide area network 3201 and the local networks 3202 and 3203.

In the above description, although the case where the spanning tree is on one phase has been described, it is also possible to configure the multiphase spanning tree when the nodes 3300 to 3307 are the nodes having the tree managers 104G and 108G. At this time, however, the other nodes have to be the nodes corresponding to the multiphase spanning tree. By way of example of the structure for conforming to the multiphase spanning tree, the structure having the same number of the tree managers as the number of the phases of the spanning tree in the node can be considered. When the respective spanning trees are managed by the respective corresponding tree managers, the above structure can cope with the multiphase spanning tree. At this time, when the same number of the spanning trees as the number of all the nodes are configured and the respective configured spanning trees are formed with the respective nodes as the root nodes, it is possible to realize the frame transfer on the shortest path effectively at the transfer time by using the frame described in FIG. 31.

By thus configuring the spanning trees step by step, it is possible to shorten the time of the spanning tree configuration even in a large-sized network connecting the wide area network 3201 and the local networks 3202 and 3203.

Reconfiguration of the spanning tree at a time of failure occurrence will be performed in the same operations as those described in the first to the fifth embodiments. By performing the failure recovering operation, namely, the reconfiguration of the spanning tree, only on a network where a failure has occurred, it is possible to recover the failure without affecting the other network within the large sized network. Accordingly, a rapid failure recovery becomes possible.

The operation of transferring a frame by using thus configured spanning trees in the large sized network will be described, this time.

The basic concept is the same as the fifth embodiment. An example of the case of transferring a frame by using the spanning tree having the node accommodating the destination terminal as the root will be described by using the frame described in FIG. 31.

The node accommodating the source terminal of the frame inserts the node ID of the node accommodating the destination terminal into the expansion tag storing area 2301 and transmits the frame to the port corresponding to the above node ID with reference to the corresponding table.

A relay node transfers the frame according to the node ID written in the expansion tag storing area 2301. The node accommodating the destination terminal transmits the frame to the terminal having the MAC address written in the area of the destination MAC address 2201 of the frame. By these operations of the respective nodes, the frame transfer can be realized.

Although the size of the expansion tag storing area 2301 of the frame of FIG. 31 is not restrictive, when transferring the frame by using the frame described in FIG. 31, it is preferable that the size of the expansion tag storing area 2301 is the same as the size of the VLAN tag area 2203 (four bites) in order to enable the transfer even in the case where there also exist the nodes capable of handling only the frames of the conventional Ethernet in a mixed way within the network.

While, in the case where the size of the expansion tag storing area 2301 is four bites, there is a possibility of failing to cope with the frame transfer when the network is enlarged and the number of the nodes is increased.

As countermeasures against this case, the network is logically divided into every domain and this use of the domain ID in addition to the node ID enables the frame transfer. Namely, as shown in FIG. 34 and FIG. 35, by using the frame of the structure with an expansion tag information area 2602-1 for inserting the domain ID added in front of an expansion tag information area 2602-2 for inserting the node ID of the frame, frame transfer can be realized even in a large sized network.

Figure 34:
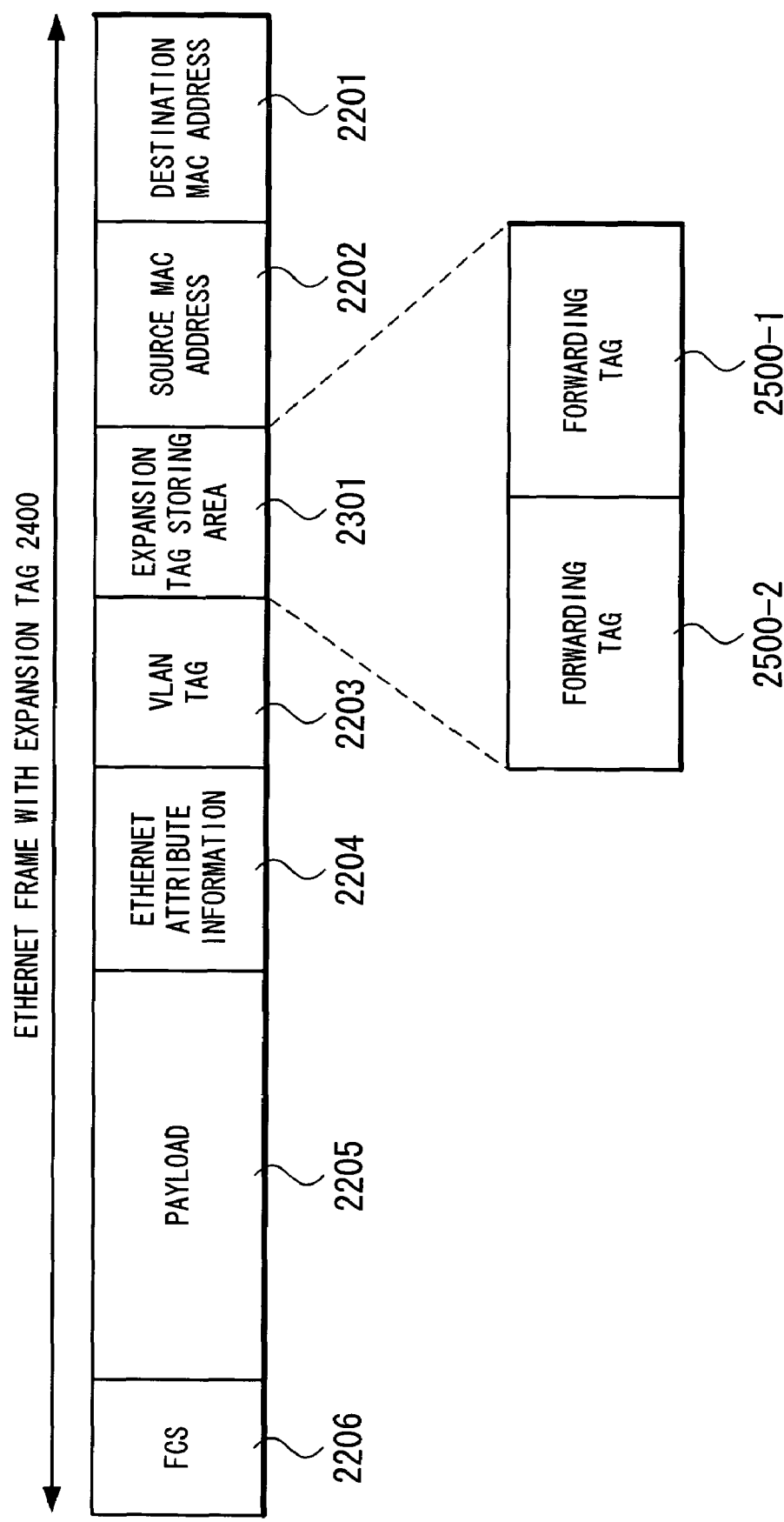
FIG. 34 is a view showing the frame format example in a hierarchical network of the invention.

FIG. 35 shows the structural example of forwarding tags 2500-1 and 2500-2 stored in the expansion tag storing area 2301 of FIG. 34. Of the components, address type areas 2901-1 and 2901-2 are areas for describing the type whether the address written in the address area 2902-1 and 2902-2 indicates the node ID or the domain ID. With reference to the address type, the respective nodes can know the type of each address written in the address areas 2902-1 and 2902-2, refer to the proper corresponding table, and determine the output destination port of the frame.

As one example, the case of transmitting a frame from the terminal accommodated in the node 32034 in FIG. 33, to the terminal accommodated in the node 32021, will be described.

Upon receipt of the frame from the source terminal, the node 32034 inserts the node ID of the node 32021 accommodating the destination terminal and the domain ID of the logical network 3202 including this node, into the expansion tag storing area 2301 of the frame, and transmits the frame to the node 33032 with reference to the corresponding table within the node.

The node 33032 transmits the frame to the node 3307 with reference to only the domain ID written in the expansion tag storing area 2301. In the wide area network 3201, similarly, the frame is transferred to the node 3301 with reference to only the domain ID written in the expansion tag storing area 2301 of the frame. Since the node 3301 knows that the domain ID written in the expansion tag storing area 2301 is adjacent to itself, it deletes the expansion tag storing area 2301 having the domain ID written, from the frame and transfers the same frame to the node 3303. The node 3303 transfers the frame to the node 32021 with reference to the node ID information of the expansion tag storing area 2301 and the corresponding table. Since the node 32021 finds that the node ID written in the expansion tag storing area 2301 of the received frame is the self-node, it deletes the expansion tag storing area 2301 from the frame and transfers the frame to the terminal. According to this, it becomes possible to transfer a frame by using the spanning tree configured by using the invention.

The corresponding table to which the node refers at the frame transfer time shows each correspondence between each node ID or domain ID of the destination and each destination port, and it can be created based on the information from the server for managing the network.

As mentioned above, although the invention has been described by citing the preferred embodiments and examples, the invention is not restricted to the above embodiments and the examples, but various modifications may be made without departing from the spirit and the scope of the technique.

As set forth hereinabove, the following effects can be achieved by the invention.

At first, by dividing the spanning tree into every domain (into every network), it is possible to shorten the configuration time of the spanning tree drastically.

Accordingly, even when the size of a network is enlarged, it is possible to shorten the time required to configure the spanning tree to a high degree.

Even when configuring the spanning tree on the multiphase, it is possible to shorten the configuration time of the spanning tree.

At second, when changing the configuration of the spanning tree owing to a failure, the conventional technique changes the configuration gradually, while stopping one of the network locally, and in order to reconfigure the whole network, it stops the network temporarily even in a place distant from the failure occurring position. This embodiment, however, can restrict the failure affecting area to a minimum by dividing the spanning tree into every domain.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A network system for setting a transfer path according to a spanning tree on a network connecting a plurality of nodes, wherein
two different networks are connected by a self-configuring partial network comprising at least four nodes accommodating no terminal, and
each node belonging to said self-configuring partial network configures and manages a spanning tree for at least one other network adjacent to the self-configuring partial network, according to a spanning tree protocol,
wherein each said node belonging to said self-configuring partial network comprises:
a plurality of transfer units which determines an output destination port in said self-configuring partial network, based on a destination MAC address of an input frame; and
a plurality of tree managers which configures a spanning tree for said self-configuring partial network and said adjacent network, according to the spanning tree protocol and transfers a frame,
wherein each tree manager comprises:
a tree controller which determines a state of a port according to the spanning tree protocol;
a BPDU transmitter/receiver which transmits and receives one or more control signals of the spanning tree protocol; and
a port blocking unit which closes or opens a port.

2. The network system as set forth in claim 1, where said self-configuring partial network is formed by a link connecting opposite nodes, and
each said different network is connected to a pair of nodes forming said self-configuring partial network.

3. The network system as set forth in claim 1, wherein said node comprises:
said tree manager which manages the spanning tree of the self-configuring partial network; and
a virtual port which packs into one of the output ports to said self-configuring partial network which connects to said transfer unit.

4. The network system as set forth in claim 3, wherein said node comprises:
transfer units which determine an output destination port in said self-configuring partial network, based on a destination MAC address of an input frame;
an RPR frame transfer unit which determines a destination RPR address, a ring ID, and an output destination port, based on the destination MAC address of the input frame;
tree managers which configure a spanning tree for said self-configuring partial network, according to the spanning tree protocol and transfer a frame;
a TTL manager which performs subtraction of TTL and discards the frame by the TTL; and
the virtual port, which connects together said tree manager for managing the spanning tree of the self-configuring partial network and said RPR frame transfer unit and puts the output port toward the self-configuring partial network.

5. The network system as set forth in claim 4, wherein said TTL manager comprises:
a TTL checker which discards the frame with reference to a TTL value; and
a TTL controller which performs addition and subtraction of the TTL value.

6. The network system as set forth in claim 3, wherein said node comprises:
an address learning unit which creates a table, based on an input port and a source MAC address of the received frame; and
a table which determines an output destination port by using the destination MAC address as a key.

7. The network system as set forth in claim 6, wherein said table comprises:
a destination MAC address field which describes the destination MAC address; and
an output port field which describes an output destination port corresponding to the destination MAC address.

8. The network system as set forth in claim 1, wherein said node comprises:
the plurality of transfer units which determines an output destination port in said self-configuring partial network, based on a destination MAC address of an input frame;
the plurality of tree managers which configures a spanning tree for said self-configuring partial network, according to the spanning tree protocol and transfers a frame; and
a BPDU identifying unit which determines a tree manager of an output destination of an input BPDU frame according to an identifier.

9. The network system as set forth in claim 8, wherein said BPDU identifying unit comprises:
an identifier inserting unit which inserts a tag or a bit (tags or bits) for identifying the tree manager; and
an identifier deleting unit which deletes the tag or the bit (tags or bits) used for identifying the tree manager.

10. The network system as set forth in claim 1, wherein said node comprises:
the plurality of transfer units which determines an output destination port in said self-configuring partial network, based on an identification tag of an input frame;
a multiphase tree manager which configures a spanning tree for said self-configuring partial network, according to the spanning tree protocol used in the identification tag of the input frame; and
a virtual port which connects together said multiphase tree manager and said transfer unit and puts the output destination port toward the self-configuring partial network.

11. The network system as set forth in claim 1, wherein said node comprises a failure detector which detects a failure through transmission and receipt of keep alive frames.

12. The network system as set forth in claim 11, wherein said failure detector comprises:
a signal separator which separates the keep alive frames from the other frame; and
a keep alive signal transmitter/receiver which transmits and receives the keep alive frames.

13. The network system as set forth in claim 11, wherein said node comprises a frame blocking unit which cuts off the port at a time of double failure.

14. The network system as set forth in claim 1, wherein said node comprises:
the plurality of transfer units which determines an output destination port in said self-configuring partial network, based on an identification tag of the input frame;
a multiphase tree manager which configures a spanning tree for said self-configuring partial network, according to the spanning tree protocol in the identification tag of the input frame; and
a tag operation unit which inserts and deletes an identification tag.

15. The network system as set forth in claim 1, wherein, when transmitting a control signal (control signals) of said spanning tree protocol to a node adjacent to the self-node and connected to both said self-configuring partial network and said other adjacent network, a coherent MAC address of the above node is transmitted as a destination of the control signal (control signals) of said spanning tree protocol.

16. A node that forms a spanning tree on a network connecting a plurality of nodes, the forming of the spanning tree comprising:
configuring a self-configuring partial network which connects two different networks by, at least, four nodes accommodating no terminal; and
configuring and managing a spanning tree for every other network adjacent to the self-configuring partial network, according to a spanning tree protocol,
wherein said node comprises:
a plurality of transfer units which determines an output destination port in said self-configuring partial network, based on a destination MAC address of an input frame; and
a plurality of tree managers which configures a spanning tree for said self-configuring partial network and at least one of said networks, according to the spanning tree protocol, and transfers a frame,
wherein said tree manager comprises:
a tree controller which determines a state of a port according to the spanning tree protocol;
a BPDU transmitter/receiver which transmits and receives one or more control signals of the spanning tree protocol; and
a port blocking unit which closes or opens a port.

17. The node as set forth in claim 16, wherein said configuring the self-configuring partial network comprises:
configuring said self-configuring partial network by a link connecting opposite nodes; and
connecting each pair of the nodes for a same number as forming said self-configuring partial network to each different network.

18. The node as set forth in claim 17, comprising:
the plurality of transfer units which determines an output destination port in said self-configuring partial network, based on a destination MAC address of the input frame;
the plurality of tree managers which configures a spanning tree for said self-configuring partial network, according to the spanning tree protocol, and transfers a frame; and
a BPDU identifying unit which determines a tree manager of an output destination of an input BPDU frame according to an identifier.

19. The node as set forth in claim 18, wherein said BPDU identifying unit comprises:
an identifier inserting unit which inserts a tag or a bit (tags or bits) for identifying the tree manager; and
an identifier deleting unit which deletes the tag or the bit (tags or bits) used for identifying the tree manager.

20. The node as set forth in claim 17, comprising:
the plurality of transfer units which determines an output destination port in said self-configuring partial network, based on an identification tag of an input frame;
a multiphase tree manager which configures the spanning tree for said partial network, according to the spanning tree protocol in an identification tag of the input frame; and
a virtual port which connects together said multiphase tree manager and said transfer unit and puts the output port toward the self-configuring partial network.

21. The node as set forth in claim 17, comprising:
a plurality of transfer units which determines an output destination port in said self-configuring partial network, based on an identification tag of the input frame;
a multiphase tree manager which configures a spanning tree for said self-configuring partial network, according to the spanning tree protocol in an identification tag of the input frame; and
a tag operation unit which inserts and deletes an identification tag.

22. The node as set forth in claim 16, said node comprising:
said tree manager which manages the spanning tree of the self-configuring partial network; and
a virtual port which packs into one the output ports to said self-configuring partial network which connects said transfer unit.

23. The node as set forth in claim 16, said node comprising:
the transfer units which determine an output destination port in said self-configuring partial network, based on a destination MAC address of an input frame;
an RPR frame transfer unit which determines a destination RPR address, a ring ID, and an output destination port, based on the destination MAC address of the input frame;
the tree managers which configure a spanning tree for said self-configuring partial network, according to the spanning tree protocol, and transfer a frame;
a TTL manager which performs a subtraction of TTL and discards the frame by the TTL; and
the virtual port for connecting together said tree manager which manages the spanning tree of the self-configuring partial network and said RPR frame transfer unit and for putting an output port toward the self-configuring partial network.

24. The node as set forth in claim 23, wherein said TTL manager comprises:
a TTL checker which discards the frame with reference to a TTL value; and
a TTL controller which performs addition and subtraction of the TTL value.

25. The node as set forth in claim 16, comprising:
an address learning unit which creates a table, based on an input port and a source MAC address of the received frame; and
a table which determines an output destination port by using the destination MAC address as a key.

26. The node as set forth in claim 25, wherein said table comprises:
a destination MAC address field which describes the destination MAC address; and
an output port field which describes an output destination port corresponding to the destination MAC address.

27. The node as set forth in claim 16, comprising a failure detector which detects a failure through transmission and receipt of keep alive frames.

28. The node as set forth in claim 27, wherein said failure detector comprises:
- a signal separator which separates the keep alive frames from the other frame; and
- a keep alive signal transmitter/receiver which transmits and receives the keep alive frames.

29. The node as set forth in claim 27, comprising a frame blocking unit which cuts off the port at a time of double failure.

30. A spanning tree configuration method of configuring a spanning tree on a network connecting a plurality of nodes, said method comprising:
- configuring a self-configuring partial network which connects two different networks by, at least, four nodes accommodating no terminal;
- configuring and managing a spanning tree for every other network adjacent to the self-configuring partial network, according to a spanning tree protocol;
- a transfer step of determining an output destination port in every said self-configuring partial network, based on a destination MAC address of an input frame; and
- a tree manager step of configuring a spanning tree for every said self-configuring partial network, according to the spanning tree protocol and transferring a frame,
- wherein said tree manager step comprises:
  - a tree controller step of determining a state of a port according to the spanning tree protocol;
  - a BPDU transmitting/receiving step of transmitting and receiving one or more control signals of the spanning tree protocol; and
  - a port blocking step of closing or opening a port.

31. The spanning tree configuration method as set forth in claim 30, comprising:
- said tree manager step managing the spanning tree of the self-configuring partial network,
- connecting a virtual port which packs into one the output ports to said self-configuring partial network.

32. The spanning tree configuration method as set forth in claim 31, comprising:
- said transfer step of determining an output destination port in said self-configuring partial network, based on a destination MAC address of the input frame;
- said tree manager step of configuring a spanning tree for every said partial network, according to the spanning tree protocol, and transferring a frame; and
- a BPDU identifying step of determining a tree manager step of an output destination of an input BPDU frame according to an identifier.

33. The spanning tree configuration method as set forth in claim 32, wherein said BPDU identifying step comprises:
- an identifier inserting step of inserting a tag or a bit (tags or bits) for identifying said tree manager step; and
- an identifier deleting step of deleting the tag or the bit (tags or bits) used for identifying said tree manager step.

34. The spanning tree configuration method as set forth in claim 30, comprising:
- said transfer step of determining an output destination port in said self-configuring partial network, based on a destination MAC address of an input frame;
- an RPR frame transfer step of determining a destination RPR address, a ring ID, and an output destination port, based on the destination MAC address of the input frame;
- said tree manager step of configuring a spanning tree for said self-configuring partial network, according to the spanning tree protocol, and transferring a frame;
- a TTL manager step of performing subtraction of TTL and discarding the frame by the TTL; and
- a step of connecting together said tree manager step of managing the spanning tree of the self-configuring partial network and said RPR frame transfer step through a virtual port for putting the output port toward the self-partial network.

35. The spanning tree configuration method as set forth in claim 30, wherein said TTL manager step comprises:
- a ITL checker step of discarding the frame with reference to a TTL value; and
- a TTL controller step of performing addition and subtraction of the TTL value.

36. The spanning tree configuration method as set forth in claim 30, comprising:
- an address learning step of creating a table for determining an output destination port by using the destination MAC address as a key, based on an input port and a source MAC address of the received frame.

37. The spanning tree configuration method as set forth in claim 36, wherein said table comprises:
- a destination MAC address field which describes the destination MAC address; and
- an output port field which describes an output destination port corresponding to the destination MAC address.

38. The spanning tree configuration method as set forth in claim 30, comprising:
- a transfer step of determining an output destination port in said self-configuring partial network, based on an identification tag of an input frame;
- a multiphase tree manager step of configuring a spanning tree for every said self-configuring partial network, according to the spanning tree protocol in every identification tag of the input frame; and
- a step of connecting said multiphase tree manager step and said transfer step through a virtual port for putting the output port toward the self-configuring partial network together.

39. The spanning tree configuration method as set forth in claim 30, comprising a failure detecting step of detecting a failure through transmission and receipt of keep alive frames.

40. The spanning tree configuration method as set forth in claim 39, wherein said failure detecting step comprises:
- a signal separating step of separating the keep alive frames from the other frame; and
- a keep alive signal transmitting/receiving step of transmitting and receiving the keep alive frames.

41. The spanning tree configuration method as set forth in claim 39, comprising a blocking step of cutting off the port at a time of double failure.

42. The spanning tree configuration method as set forth in claim 30, comprising:
- a transfer step of determining an output destination port in every said partial network, based on an identification tag of the input frame;
- a multiphase tree manager step of configuring a spanning tree for every partial network, according to the spanning tree protocol in every identification tag of the input frame; and
- a tag operating step of inserting and deleting an identification tag.

43. The spanning tree configuration method as set forth in claim 30, wherein said multiphase tree manager step comprises:
- a tree controller step of determining a state of a port according to the spanning tree protocol;

a BPDU transmitting/receiving step of transmitting and receiving a control signal (control signals) of the spanning tree protocol; and a port blocking step of closing or opening a port.

44. A spanning tree configuration program comprising a sequence of machine-readable instructions encoded on a machine-readable medium for running on each node forming a spanning tree on a network connecting a plurality of nodes, said sequence of instructions comprising the following functions of:

configuring a self-configuring partial network which connects two different networks, said self-configuring partial network comprising, at least, four nodes accommodating no terminal;

configuring and managing a spanning tree for every other network adjacent to the self-configuring partial network, according to a spanning tree protocol;

a transfer function of determining an output destination port in said self-configuring partial network, based on a destination MAC address of an input frame; and a tree manager function of configuring a spanning tree for every said self-configuring partial network, according to the spanning tree protocol and transferring a frame;

wherein said tree manager function comprises:

a tree controller function of determining a state of a port according to the spanning tree protocol;

a BPDU transmitting/receiving function of transmitting and receiving one or more control signals of the spanning tree protocol; and a port blocking function of closing or opening a port.

45. The spanning tree configuration program as set forth in claim 44, comprising a function of connecting together said tree manager function of managing the spanning tree of the self-configuring partial network and said transfer function through a virtual port for putting the output port toward the self-configuring partial network.

46. The spanning tree configuration program as set forth in claim 45, comprising:

the transfer function of determining an output destination port in every said partial network, based on a destination MAC address of the input frame;

the tree manager function of configuring a spanning tree for every said partial network, according to the spanning tree protocol and transferring a frame; and a BPDU identifying function of determining a tree manager function of an output destination of an input BPDU frame according to an identifier.

47. The spanning tree configuration program as set forth in claim 46, wherein said BPDU identifying function comprises:

an identifier inserting function of inserting a tag or a bit (tags or bits) for identifying said tree manager function; and an identifier deleting function of deleting the tag or the bit (tags or bits) used for identifying said tree manager function.

48. The spanning tree configuration program as set forth in claim 44, comprising:

the transfer function of determining an output destination port in every said partial network, based on a destination MAC address of an input frame;

an RPR frame transfer function of determining a destination RPR address, a ring ID, and an output destination port, based on the destination MAC address of the input frame;

the tree manager function of configuring a spanning tree for every said partial network, according to the spanning tree protocol and transferring a frame;

a TTL manager function of performing subtraction of TTL and discarding the frame by the TTL; and a function of connecting together said tree manager function of managing the spanning tree of the self-configuring partial network and said RPR frame transfer function through a virtual port for putting the output port toward the self-configuring partial network.

49. The spanning tree configuration program as set forth in claim 44, wherein said TTL manager function comprises a TTL checker function of discarding the frame with reference to a TTL value, and a TTL controller function of performing addition and subtraction of the TTL value.

50. The spanning tree configuration program as set forth in claim 44, comprising an address learning function of creating a table for determining an output destination port by using the destination MAC address as a key, based on an input port and a source MAC address of the received frame.

51. The spanning tree configuration program as set forth in claim 50, wherein said table comprises:

a destination MAC address field which describes the destination MAC address; and an output port field which describes an output destination port corresponding to the destination MAC address.

52. The spanning tree configuration program as set forth in claim 44, comprising:

the transfer function of determining an output destination port in every partial network, based on an identification tag of an input frame;

the multiphase tree manager function of configuring a spanning tree for every partial network, according to the spanning tree protocol in every identification tag of the input frame; and a function of connecting said multiphase tree manager function and said transfer function through a virtual port for putting the output port toward the self-partial network together.

53. The spanning tree configuration program as set forth in claim 44, comprising a failure detecting function of detecting a failure through transmission and receipt of keep alive frames.

54. The spanning tree configuration program as set forth in claim 53, wherein said failure detecting function comprises:

a signal separating function of separating the keep alive frames from the other frame; and a keep alive signal transmitting/receiving function of transmitting and receiving the keep alive frames.

55. The spanning tree configuration program as set forth in claim 53, comprising a blocking function of cutting off the port at a time of double failure.

56. The spanning tree configuration program as set forth in claim 53, comprising:

a transfer function of determining an output destination port in every said partial network, based on an identification tag of the input frame;

a multiphase tree manager function of configuring a spanning tree for every said partial network, according to the spanning tree protocol in every identification tag of the input frame; and a tag operating function of inserting and deleting an identification tag.

* * * * *